United States Patent
DeFrancesco et al.

(10) Patent No.: US 7,181,427 B1
(45) Date of Patent: Feb. 20, 2007

(54) AUTOMATED CREDIT APPLICATION SYSTEM

(75) Inventors: James R. DeFrancesco, Columbia, MD (US); Scott L. Freiman, Potomac, MD (US); James C. Alsobrook, Jr., Lutherville, MD (US); Steven M. Terpening, Laurel, MD (US); Andrew L. Mayers, Glyndon, MD (US); Edward T. Mullin, Hampstead, MD (US); Brian S. Fritsche, Columbia, MD (US); Michael C. DiClaudio, Baltimore, MD (US); Michael D. Brune, Jr., Timonium, MD (US); Kristie W. Scott, Elkridge, MD (US)

(73) Assignee: JP Morgan Chase Bank, N.A., Houston, TX (US)

( * ) Notice: Subject to any disclaimer, the term of this patent is extended or adjusted under 35 U.S.C. 154(b) by 0 days.

(21) Appl. No.: 08/922,462

(22) Filed: Sep. 3, 1997

Related U.S. Application Data

(63) Continuation-in-part of application No. 08/526,776, filed on Sep. 12, 1995, now Pat. No. 5,878,403.

(51) Int. Cl.
G06Q 40/00 (2006.01)

(52) U.S. Cl. ............... 705/38; 705/35; 705/36; 705/37; 705/39

(58) Field of Classification Search ........... 705/38, 705/32, 35, 39, 36, 37, 26, 27, 14, 1
See application file for complete search history.

(56) References Cited

U.S. PATENT DOCUMENTS

| | | | |
|---|---|---|---|
| 3,970,992 A | 7/1976 | Boothroyd et al. | 340/172.5 |
| 4,017,835 A | 4/1977 | Randolph | 340/152 R |
| 4,491,725 A | 1/1985 | Pritchard | 235/375 |
| 4,600,828 A | 7/1986 | Nogami et al. | 235/379 |
| 4,642,768 A | 2/1987 | Roberts | 364/408 |
| 4,646,250 A | 2/1987 | Childress | 364/518 |
| 4,648,037 A | 3/1987 | Valentino | 364/408 |
| 4,649,037 A | 3/1987 | Marsh et al. | |
| 4,649,832 A | 3/1987 | Hain et al. | 109/24.1 |
| 4,675,815 A | 6/1987 | Kuroki et al. | 379/37 |
| 4,683,536 A | 7/1987 | Yamamoto | 364/408 |
| 4,722,055 A | 1/1988 | Roberts | 364/408 |
| 4,730,252 A | 3/1988 | Bradshaw | 364/403 |

(Continued)

FOREIGN PATENT DOCUMENTS

EP     0 774 725 A2     5/1997

(Continued)

OTHER PUBLICATIONS

"Re-Engineering Update: Where Banks are Going to Fit Along the Information Highway," American Banker, p. 7, vol. 159, No. 98, Apr. 1994.*

(Continued)

Primary Examiner—Nga Nguyen
(74) Attorney, Agent, or Firm—Goodwin Procter, LLP

(57) ABSTRACT

A computer based credit application processing system provides a graphical user interface, automatic software update downloading, lender to lender routing of credit applications, and integration with in-house finance and insurance systems and third party data entry facilities, among other features. Web site linkage is also accommodated.

8 Claims, 21 Drawing Sheets

U.S. PATENT DOCUMENTS

| | | | |
|---|---|---|---|
| 4,736,294 A | 4/1988 | Gill et al. | |
| 4,752,877 A | 6/1988 | Roberts et al. | 364/408 |
| 4,772,055 A | 9/1988 | Fang | |
| 4,774,664 A | 9/1988 | Campbell et al. | 364/408 |
| 4,814,587 A | 3/1989 | Carter | |
| 4,890,228 A | 12/1989 | Longfield | 364/408 |
| 4,914,587 A | 4/1990 | Clouse | |
| 4,947,028 A | 8/1990 | Gorog | 235/381 |
| 4,949,028 A | 8/1990 | Brune | |
| 4,958,368 A | 9/1990 | Parker | 379/91 |
| 4,965,821 A | 10/1990 | Bishop et al. | 379/91 |
| 4,992,939 A | 2/1991 | Tyler | 364/401 |
| 5,023,904 A | 6/1991 | Kaplan et al. | 379/91 |
| 5,025,138 A | 6/1991 | Cuervo | 235/379 |
| 5,025,373 A | 6/1991 | Keyser, Jr. et al. | 364/408 |
| 5,049,862 A | 9/1991 | Dao et al. | 340/706 |
| 5,083,270 A | 1/1992 | Gross et al. | 364/408 |
| 5,120,906 A | 6/1992 | Protheroe et al. | 178/18 |
| 5,126,936 A | 6/1992 | Champion et al. | 364/408 |
| 5,126,939 A | 6/1992 | Carpentier et al. | |
| 5,198,642 A | 3/1993 | Deniger | 235/375 |
| 5,202,825 A | 4/1993 | Miller et al. | 364/405 |
| 5,202,826 A | 4/1993 | McCarthy | |
| 5,206,803 A | 4/1993 | Vitagliano et al. | 364/408 |
| 5,212,789 A | 5/1993 | Rago | |
| 5,213,571 A | 5/1993 | Fujio et al. | |
| 5,218,539 A | 6/1993 | Elphick et al. | 364/419 |
| 5,220,501 A | 6/1993 | Lawlor et al. | 364/408 |
| 5,231,571 A | 7/1993 | D'Agostino | |
| 5,239,462 A * | 8/1993 | Jones et al. | 364/408 |
| 5,241,620 A | 8/1993 | Ruggiero | 395/22 |
| 5,262,941 A | 11/1993 | Saladin et al. | |
| 5,274,547 A | 12/1993 | Zoffel et al. | |
| 5,287,268 A | 2/1994 | McCarthy | |
| 5,297,202 A | 3/1994 | Kapp et al. | 380/9 |
| 5,301,320 A | 4/1994 | McAtee et al. | 395/650 |
| 5,361,201 A | 11/1994 | Jost et al. | 364/401 |
| 5,369,570 A | 11/1994 | Parad | 364/401 |
| 5,383,113 A | 1/1995 | Kight et al. | |
| 5,537,315 A | 7/1996 | Mitcham | 364/408 |
| 5,559,895 A | 9/1996 | Lee et al. | 382/119 |
| 5,576,951 A | 11/1996 | Lockwood | 395/227 |
| 5,604,341 A | 2/1997 | Grossi et al. | 235/379 |
| 5,611,052 A * | 3/1997 | Dykstra et al. | 395/238 |
| 5,627,978 A | 5/1997 | Altom et al. | 395/330 |
| 5,699,527 A | 12/1997 | Davidson | 395/238 |
| 5,734,837 A | 3/1998 | Flores et al. | 395/207 |
| 5,744,882 A | 4/1998 | Teshima et al. | |
| 5,774,882 A | 6/1998 | Keen et al. | 705/38 |
| 5,794,133 A | 8/1998 | Kashima | |
| 5,797,133 A * | 8/1998 | Jones et al. | 705/38 |
| 5,870,721 A | 2/1999 | Norris | 705/38 |
| 5,878,403 A * | 3/1999 | DeFrancesco et al. | 705/38 |
| 5,893,128 A | 4/1999 | Nauckhoff | 707/511 |
| 5,930,776 A * | 7/1999 | Dykstra et al. | 705/38 |
| 5,940,811 A | 8/1999 | Norris | 705/38 |
| 5,940,812 A | 8/1999 | Tengel et al. | 705/38 |
| 5,940,829 A | 8/1999 | Tsuiki et al. | 707/10 |
| 5,950,169 A | 9/1999 | Borghesi et al. | 705/4 |
| 5,960,404 A | 9/1999 | Chaar et al. | 705/8 |
| 5,966,699 A | 10/1999 | Zandi | 705/38 |
| 5,974,392 A | 10/1999 | Endo | 705/38 |
| 6,105,007 A | 8/2000 | Norris | 705/38 |
| 6,135,349 A | 10/2000 | Zirkel | 235/375 |
| 6,611,052 B2 | 8/2003 | Poo et al. | |

FOREIGN PATENT DOCUMENTS

| | | |
|---|---|---|
| EP | 0774725 A2 | 5/1997 |
| JP | 5-101250 | 4/1993 |
| JP | 101250 | 4/1993 |

OTHER PUBLICATIONS

"Barnett arm links with auto dealers", Bank Systems & Technology, v34, n4, p. 14, Apr. 1997.*

Baljko, Jennifer, "Automated review system drives BB&T's subprime loan business". Bank Systems & Technology, v34, n7, p. 62, Jul. 1997.*

"The Lure of the subprime", Automotive News, n 5673, p. li, Aug. 12, 1996.*

"Opportunities, Obstacles in Suprime Loan Market", Credit Risk Management Report, Feb. 26, 1996, vol. 6, Issue: 4.*

Berzof, Ken, "Kiosk Issues Bank Cards for Those Dashing Through Dough," *The Courier-Journal*, vol. 269, No. 155, p. 12, Dec. 2, 1989.

*Capstone Decision Manager: Application Decision Management*, HNC Software, 28 pages, Publication date unknown. (Missing Pages 8, 12, 22, and 28).

"Car loans in minutes," *Bank Management*, Bank Administration Institute, vol. 69, No. 4, Apr. 1993, p. A23.

E-mail Message from Michael J. McEnvoy, Tower Group, to Dennis Warnke, CMSINC, Nov. 5, 1998, 3 pages.

Evans, Steve, "No Longer Processing Just Plastic," *SNLSecurities*, Jan. 2000, pp. 39-40.

Lawrence, Jeanette, "(Part 1 of 3) Untangling Neural Nets (When is one model better than another?)," *Dr. Dobbs Journal*, Miller Freeman Inc., Apr. 1990, 3 pages, printed from Internet (http address unclear).

Marjanovic, Steven, "Investors Shrink as Fair, Isaac Grows," 1 page, Publication date and source unknown.

*Product Description: StrategyWare® Version 1.2*, Fair, Isaac and Company, Incorporated, 1998, 60 pages. (Missing Pages 44 and 48).

*RiskWise Products and Services*, 2 page brochure, Publication date and source unknown.

*RiskWise Technology Overview*, 4 page brochure, Publication date and source unknown.

"Atlanta-based COIN Banking Systems signs alliance with NCR for credit authorization solution," Business Wire, Business Wire, Inc., Apr. 3, 1991.

Jason, Rich, "Software;for loan processing;column," Mortgage Banking, Mortgage Association of America, vol. 50, No. 11, Aug. 1990.

Joe Kolman, "Ten Technologies Ahead of the Curve," Institutional Investor, vol. 24, No. 16, p. 123-124, Dec. 1990.

"Application Processing for Credit Programs," The Magazine of Bank Management, Bank Administrative Institute, p. 75, Nov. 1988.

Bill Atkinson, "Columbia Firm Helps Banks Ring Up Loans on Telephone," Baltimore Business Journal, Baltimore Business Publications, Inc., vol. 6, No. 19, Sec. 2, p. 7B, Oct. 17, 1988.

Patrick Haverson, A man with Grand Visions, Banking Technology, pp. 30-32, dated May 1993.

Richard Read, Crossing the Track to Success, Euromoney, p. 177-180, Jun. 1988.

Anonymous, MortgageWare Resource guide, Interling Software Corp, Nov. 1992 (best available copy).

David O. Tyson, Interling Mortgage Software Hits Big Time with Prudential Real Estate Subsidiary Deal, American Banker, p. 12, Nov. 18, 1987.

Anonymous, "Barnett arm links with auto dealers," Bank Systems & Technology, Gralla Publications, vol. 34, No. 4, p. 14, Apr. 1997.

Conroy, Bill, "Citicorp test-markets device that simplifies home banking," The Business Journal, p. 16, Oct. 29, 1990.

Day, Kathleen, "Cutting Corners at the Kiosk: New services Widen Use of Electronic Devices," The Washington Post, Jul. 22, 1994, p. A1.

Fortunato, Laura, "Loan Lending Magic," Winter 1996/97, vol. 13, No. 4, p. 12-15.

Jost, Allen, "Neural Networks: A logical progression in credit and marketing decision systems," Credit World, International Credit Association, Mar./Apr. 1993, p. 26-33.

Kantrow, Yvette D., "Electronic Network Will Link Car Dealers to Many Lenders: Goal is to Create a Form of EFT Transfer System," American Banker Weekly Review, Feb. 8, 1988, pp. 5 & 10.

Karson, Daniel, "Tactical Field Strategies to Trace and Recover Assets in the United States," A practical Guide to Asset Tracing and Recovery: Sure-Fire Strategies to turn hollow judgements into Litigation Victories, The Canadian Institute, Section VII, p. 1-22, Apr. 3 & 4, 1997.

McCall, William, "Microsoft, Banks Team Up to Provide Home Banking," Associated Press, Aug. 3, 1994.

Radding, Alan, "A View of Technology in '92," Bank Management, Bank Administration Institute, p. 28-35, Jan. 1992.

Sugawara, Sandra, "Stocking Up at the ATM: Citibank Machines to Allow Customers to Trade Shares," The Washington, Post, Oct. 6, 1994, p. D11.

Thornton, Emily, "Going Belly-Up in Japan: Bankruptcies are soaring as consumers binge on borrowing," Business Week, The McGraw-Hill Companies, Inc., p. 54, May 5, 1997.

Wilmsen, Steven, "Home-banking service adding Denver to financial network," The Denver Post, p. A-2, Jun. 8, 1989.

"New Paradigms in Retail Banking: The RDS Report on the Future of Retail Banking Delivery," Bank Administrative Institute, 88 Pages, 1994.

Barchard, David, "Cautious mortgage lenders redo their sums," Financial Times, Weekend Jun. 20/Jun. 21, 1992.

Fix, Janet L., "Shopping list: Car loan, canned corn," USA Today, Jul. 20, 1994, p. 68.

"Interactive Banking Gets a Push Up North," Bank Systems and Technology, Mill Freeman, Inc., Mar. 1994, p. 6.

Rothfeder, Jeffrey, "Electronics Bill-Paying for the Little Guy," Business Week, McGraw-Hill, Sep. 25, 1989.

Tauhert, Christy, "Commerce Branches off into PC Banking," Bank Systems and Technology, Miller Freeman, vol. 33, No. 4, p. 34-35, Apr. 1996.

Eckerson, W., Network automates auto loan application process; Speeds loan Oks, helps buyers find best rates, Network World, Network World, Inc., available at http://www.lexis.com, 2 pages (Mar. 6, 1989).

Factory Communications for Toyota AS/400 Dealerships.

Network World.

DealerTrack v. RouteOne Declaration of Dr. George T. Liger.

DealerTrack v. RouteOne Memorandum of Claim Construction Concerning Patents 5,878,403 and 6,588,841.

Dealer Track v. RouteOne GMAC 000001.

RTC002341—COINLink Team Projects.
RTC002303—COINLink Feature/Benefit Analysis.
RTC002240—Business Plan 1987.
RTC002316—Memo re: New Name for COINLink.
RTC002320—Memo Re: New Name for COINLink.
RTC002326—COINLink Meeting May 13, 1988.
RTC002330—Steering Committee handwritten notes.
RTC002331—Preparations for Pilot and Immediately Thereafter.
RTC002334—Tab—Project Statuses.
RTC002335—COINLinks Team Projects.
RTC002337—COINLinks Team Projects.
RTC002340—Memo re: Project Statuses.
RTC092343—COINLinks Team Projects.
RTC002344—COINLinks Team Projects.
RTC002345—COINLinks Team Projects.
RTC002346—COINLinks Team Projects.
RTC002347—COINLinks Team Projects.
RTC002348—COINLinks Team Projects.
RTC002349—COINLinks Team Projects.
RTC002350—COINLinks Team Projects.
RTC002351—COINLinks Team Projects.
RTC002352—COINLinks Team Projects.
RTC002353—COINLinks Team Projects.
RTC002357—Tab—Chrysler.
RTC002358—Memorandum re: Chrysler Credit Funding Program.
RTC002359—Request for Pricing.
RTC002362—Hand written letter to Mr. Nichols Simonds.
RTC002363—Hand written letter to Mr. Nichols Simonds (mirror image).
RTC002364—Chrysler Credit Pilot.
RTC002366—Presentation present to cc Aug. 24, 1989.
RTC002372—Business Cards.
RTC002373—Summary of COIN's Proposal to Chrysler Credit.
RTC002374—The COIN Proposal.
RTC002376—Technical Aspects of Pilot Project.
RTC002377—Chrysler Credit.
RTC002378—Analysis of Chrysler Needs.
RTC002379—Presentation Continued.
RTC002380—Presentation Continued.
RTC002381—Presentation Continued.
RTC002382—Presentation Presented to MIS Aug. 25, 1989.
RTC002383—Visio.
RTC002384—Memorandum re: Summary of notes from phone conversation with Jack Godwin of Chrysler Credit.
RTC002386—Tab EDI Law.
RTC002387—Memorandum re: Marketing of Electronic Services.
RTC002389—Memorandum re: Marketing of electronic Services.
RTC002390—Memorandum continued.
RTC002391—Correspondence to G.J. Maloney from J.R. Godwin.
RTC002393—Draft EDI Law.
RTC002413—An Introduction to Electronic Data Interchange.
RTC002438—Flow Diagram of the Statute of Frauds.
RTC002440—Draft Discussion Paper on EDI Signatures Issues.
RTC002463—Article 4A—Funds Transfers.
RTC002469—Limitations on Liability.
RTC002477—Press Release Sep. 19, 1989.
RTC002485—Tab Generic Ap.
RTC002486—Notes.
RTC002487—Applicant Data.
RTC002488—Customer's Statement.
RTC002489—Dealer's Work Sheet.
RTC002490—Complete Application.
RTC002491—TRWCredentials Service.
RTC002505—Credit Application.
RTC002506—Omni Auto Confidential Client Statement.
RTC002507—Customer Confidential Statement.
RTC002508—Questions for F&I Managers.
RTC002509—Questions continued.
RTC002510—Customer's Statement.
RTC002511—STD APP Fields.
RTC002512—Notes.
RTC002513—Dealer Information.
RTC002533—Credit Net Survey.
RTC002535—Credit Net Survey—Al Long Ford.
RTC002537—New York Credit Net Survey—Smith-Norwich.
RTC002539—Credit Net Survey—Mike Shad Ford.
RTC002541—Credit Net Survey—Adamson Ford.
RTC002543—Credit Net Survey—Terry Ford.
RTC002545—Credit Net Survey—Don Dan Ford.
RTC002547—Credit Net Survey—Bill Brown.
RTC002549—Credit Net Survey—Morris Ford.
RTC002551—Credit Net Survey—North Park L/M.
RTC002553—Credit Net Survey—Country Ford.
RTC002555—Credit Net Survey—Hilltop L/M.
RTC002557—New York Credit Net Survey—West Seneca.
RTC002559—New York Credit Net Survey—Scarsdale Ford.
RTC002561—Credit Net Survey—Bruckman Ford.
RCT002563—Credit Net Survey—Bill Russell Ford.
RTC002565—Credit Net Survey—Jack Demmer.
RTC002567—Credit Net Survey—Dobbs Ford.
RTC002569—Draft Creditnet Survey Questions.
RTC002570—Draft Credinet Survey Questions.
RTC002571—Automation Status, Credit Scoring.
RTC002572—Table 89 Automation Status of Customer Service.
RTC002573—Tab—Satellites/Communications.
RTC002574—Missing Link: ADCS Standard.
RTC002577—The Gateway Connection.
RTC002584—COINLink Customer Number.
RT41989-RTE41990—web site articel re: Bank Systems and Technology.
RTE41991-RTE41993—Network World, vol. 6. No. 9, Mar. 6, 1999.

RTE41994-RTE41995—Article titled "Network automates auto loan application process".
RTE41996-RTE42000—Article titled, "Kiosk issues bank cards for those dashing through dough".
RTE42001-RTE42016—Bank Management.
RTE42017-RTE42020—American Banker, vol. CLXIV, No. 49, Mar. 15, 1999.
RTE42021-RTE42030—Mortgage Banking articles, Aug. 1990.
RTE42031-RTE42034—Bank Administration article, Nov. 1988.
RTE42035-RTE42037—Baltimore Business Journal, Oct. 17-23, 1988.
RTE42030-RTE42047—Banking Technology, May 1993.
RTE42048-RTE42062—American Banker, Nov. 28, 1987.
Cross Sections Winter 1996/97 vol. 13 No. 4.
RTE42069-RTE42078—Credit World, Mar./Apr. 1993.
RTE42079-RTE42081—American Banker, Feb. 8, 1988.
RTE42082-RTE42105—A Practical guide to Asset Tracing and Recovery, Apr. 3 & 4, 1997.
RTE42106-RTE42114—web site article Team Up to Provide Home Banking.
RTE42115-RTE42124—The Washinton Post, Oct. 6, 1996.
RTE42125-RTE42216—BAI, Final Report, "The RDS Report on the Future of Retail Banking Delivery", 1994.
RTE42217-RTE42224—Financial Times, 1992.
RTE42225-RTE42227—Bank Systems and Technology, Apr. 1984, vol. 31, No. 4.
RTE42228-RTE42229—Business Week, Sep. 25, 1989.
RTE42230-RTE42232—Bank Systems and Technology, Apr. 1996.
RTE44431-RTE44431—Certificate of Correction for US Patent No. 6,208,979.
RTE44857-RTE44859—Reseller News, Jun. 20, 1988.
RTE44860-RTE44860—News & views.
RTE44861-RTE44863—Vendor Progress Report GSI (UK).
RTE44864-RTE44865—Annual USA systems developments update, Part 2.
RTE44866-RTE44871—CIS-Commercial Inventory Services.
RTE44872-RTE44876—Auto-Dealer systems in the UK & Update on European Strategies, 2$^{nd}$ Quarter Update, 1992.
RTE44877-RTE44882—Profiting from Computers.
RTE44883-RTE44885—Annual USA systems developments update, Part 2.
RTE44886-RTE44890—Vendor Progress Report GSI (UK).
RTE44891-RTE44900—web site article "Metroteller Hears the Pleasant Jungle of Coins"; Banking Systems and Equipment, May 1988; Business Journal, vol. 3, No. 32, Feb. 22-28, 1988; and Electronic Banking & Finance.
ADP000001-000500 ADP Information Services Host Systems Detailed Specifications Sections 1-2 Product Requirements.
ADP000501-001335 Sections 2-8 of ADP Information Services Host Systems Detailed Specifications Requirements Product Requirements.
ADP001336-001667 ADP Information Services Host Systems Detailed Specifications Product Requirements Sections 1-3.
ADP001668-002083 Section 3 Program Specifications.
ADP002084-002342 Section 3 Program Specifications.
ADP002343-002654 Financial File Application Maintenance, Section 3 Program Specifications.
ADP002655-002973 PC Locator List Maintenance, Section 3 Program Specifications.
ADP002974-ADP003202—Program Secifications.
ADP00001-ADP00012—ADP Information Services Host Systems Detailed Specifications.
RTW00001-RTW00174—Chemical Bank.
RTW00175-RTW00250—Metroteller Dean Miller Referees.
RTW00251-RTW00335—Dean Miller "At a glance" 1990 calendar.
RTW00336—U-Link.
RTW00337-RTW00342—"The Future is Here Why is Elextronic Access Important?".
RTW00343-RTW00349—Coin and Metroteller to Market Elextronic Link Between Auto Dealers and Lenders.
RTW00347 RTW00348—Corres. to B. Shah from J. Palmer.
RTW00349-RTW00351—Corres. to M. Singleton from B. Hill.
RTW00352-RTW00376—Corres. to J. Wolfson from J. Palmer.
RTW00377-RTW00390—V-Link Analysis.
RTW00391-RTW00423—V-Link Product Analysis.
RTW00424-RTW00429—Coinlink Project Status Report.
RTW00430-RTW00431—Memo to J. Wolfson from Moot et al.
RTW00432—V-Link Current.
RTW00433—V-Link Logo.
RTW00434—V-Link Update.
RTW00435—Key Bank V-Link Presentation.
RTW00436-RTW00439—Article *Marine Midland pland auto loan venture with giants* with; Corres.
RTW00440—Article *Marine forms venture to expant auto financing*.
RTW00444-RTW00445—Memo to J. Wolfson & C. McIntyre from S. Sterman.
RTW00446-RTW00448—Minutes to NFADA Committee Meeting.
RTW00449—Memo re: Marine Involvement in Coinlink Project.
RTW00450-RTW00453—Coinlink Financial Proforma—with Marine Volume.
RTW00454—Memo re: Marine Involvement in Coinlink Project.
RTW00455-RTW00456—Coinlink Financial Proforma.
RTW00457—Corres. re: Coinlink.
RTW00458—Corres. to M. Love from C. Procknal.
RTW00459-RTW00461—System 88—Comparison Sheet.
RTW00462-RTW00463—Memor re: Coinlink Capitalization.
RTW00464-RTW00466—Coinlink Financial Proforma.
RTW00468-RTW00470—Cost Summary.
RTW00471—Corres to M. Singleton re: Metroteller Systems Inc.
RTW00472-RTW00473—Coinlink Functional Specification Outline.
RTW00474—Metroteller Systems Inc. Written notes.
RTW00475-RTW00484—Coinlink Project.
RTW00485-RTW00487—Corres. to P. Willax from J. Willis.
RTW00488—Status.
RTW00489-SRT00492—Corres. to T. Kress from S. Sterman.
RTW00493—V-Link Diagram.
RTW00494-RTW00519—V-Link Program Functional Specification.
RTW00520-RTW00523—Coinlink Technical Specifications Manual.
RTW00524-RTW00617—Coinlink Technical Specifications Manual.
RTW00618—Metroteller Logo.
RTW00619-RTW00646—CoinLink Diagram & Corres. to M. Love.
RTW00647-RTW00651—Concurrent Computer Corp.
RTW00652-RTW00654—Overview of SDM International.
RTW00655-RTW00657—Corres. to M. Love & S. Sterman.
RTW00658-RTW00661—Metroteler Systems—Coinlink spreadsheet.
RTW00662-RTW00665—Metroteler Systems—Coinlink spreadsheet.
RTW00666-RTW00669—Metroteler Systems—Coinlink spreadsheet.
RTW00670-RTW00672—Metroteler Systems—Coinlink spreadsheet.
RTW00673—Metroteller Systems Inc.
RTW00674-RTW00675—Coinlink Project.
RTW00676-RTW00677—Memo to J. Wolfson, C. McIntyre from S. Stermen.
RTW00678-RTW00681—Subscription Agreement for the Purchase of Shares of Common Stock.
RTW00682-RTW00685—Subscription Agreement for the Purchase of Shares of Common Stock.
RTW00686—Written notes.
RTW00687—Memo re: Coinlink Project Update.
RTW00689-RTW00705—Orig. MSI/Coin Agreement.
RTW00706-RTW00799—Metroteller Systems Inc. Binder.
RTW00800-RTW00898—Integrated Delivery Technologies/ 1988 Business Plan.
RTW00899-RTW00924—V-Link Program Functional Specification.
RTW00925-RTW00983—NFADA Project Planning Meeting.

RTW00984-RTW00985—Article *Banks entering race for quick credit ok*; Corres. to M. Singleton.
RTW0986-RTW001023—Comerica Acceptance Corp. ALPS Project.
RTW01024-RTW001027—Indiana Center for Telecommunication.
RTW01028-RTW01039—Certified Collateral Corp. CARX-OTC.
RTW01040-RTW01055—Coinlink Corres. & Agreement.
RTW01056—Written Notes.
RTW01060-RTW01061—Written Notes.
RTW01062-RTW01064—Coin Contacts with written notes.
RTW01065—Empire Bank Phase I.
RTW01067—written notes.
RTW01068-RTW01071—Accounting Statement of Daniel Gordon.
RTW01072-RTW01073—Written notes.
RTW01074-RTW01089—Outline for Empire Bank Meeting.
RTW01090-RTW01092—Agenda Automation of Auto Financing.
RTW01093-RTW01094—Application to Approval/Decline Flow.
DCS000001—Dealer Ace Development Manual (Copy Cover Page).
DCS000002—Dealer Ace Project Participants.
DCS000003—Dealer Ace Project.
DCS000004—Contents.
DCS000005—Project Leaders.
DCS000006—Application Development Committee.
DCS000007—Automated Credit Application.
DCS000008—Implementation Committee.
DCS000009—System Features Committee.
DCS000010—Off-Hours Service Committee.
DCS000011—Scope.
DCS000012—General Business Requirements.
DCS000013—Business Requirements.
DCS000014—Simware Network Overview.
DCS000015—Tab—Field Notes.
DCS000016—Memo re: Dealer A.C.E.—Rollout progress.
DCS00017—General Doc Form—App ID Dup. Check in Batch.
DCS000018—General Doc Form—Discounted Indicator.
DCS000019—General Doc Form—Weekly Hardcopy Report.
DCS000020—General Doc Form—Dealer Number Changes.
DCS000021—General Doc Form—Weekly Hardcopy Report.
DCS000022—General Doc Form—Weekly Hardcopy Report.
DCS000023—General Doc Form—Weekly Hardcopy Report.
DCS000024—General Doc Form—Refinement to the Send Function.
DCS000026—General Doc Form—Preliminary Notes for Tech Team.
DCS000030—General Doc Form—What to do if the Branches want to use A.C.E. on Sunday.
DCS000047—General Doc Form—NADA UVG Available Indicator.
DCS000049—Report.
DCS000076—General Doc Form Auditing for Product changes, Including UVG.
DCS000082—General Doc Form Branch Ace used Vehicle Guide Processing.
DCS000085—General Doc Form Expanded Transaction type change Capability.
DCS000089—General Doc Form Summary of Changes to the Branch System.
DCS000091—General Doc Form Changes to UVG Processing for Vehicles Not Funded.
DCS000098—Used Vehicle Scenarios.
DCS000100—Dealer System Interface for Branch-Entered Apps.
DCS000106—General Doc Form System Test Plan.
DCS000112—General Doc Form Financial Information Screen.
DCS000114—Branch Ace Collateral Screen.
DCS000123—Memo re Summary of Jul. 15, 1994 Core Team Meeting.
DCS000125—General Doc Form Dealer Ace Data Retention.
DCS000128—General Doc Form Current Development Activity Form.
DCS000130—General Doc form Dealer A.C.E. DB2 Table Identification.
DCS000131—General Doc Form Exit to Use Vehicle Guide from the Applicant Screen.
DCS000133—Interface to the Used Vehicle Guide System.
DCS000136—General Doc Form Branch Ace Properties.
DCS000138—General Doc Form New Work Queues in Branc ACE Revised.
DCS000140—Memo re Dealer Ace application Development Priorities.
DCS000148—General Doc Form System Test.
DCS000149—Dealer Ace Test Plan.
DCS000152—More Changes to the Branch System.
DCS000153—General Doc Form CFC Dealer Mainframe Menu.
DCS000155—General Doc Form Changes to Branch Table Maintenace.
DCS000161—General Doc Form New Work Queues in Branch Ace.
DCS000163—General Doc Form Application Statuses—Internal Codes.
DCS000165—General Doc Form Send Comand with Comments.
DCS000171—General Doc Form Dealer to Branch Messages.
DCS000173—General Doc Form Comments on Current Minutes.
DCS000177—General Doc Form Changes to the Dealer Log.
DCS000180—General Doc Form Two Problems to Solve.
DCS000185—Dealer 3270 Access Via Simware.
DCS000187—General Doc Form Batch Requirements for Dealer & Branch A.C.E.
DCS000189—General Doc Form History & Auditing.
DCS000191—Dealer ACE Data Change fields (continued).
DCS000193—General Doc Form History & Auditing.
DCS000199—Applications in the ACE System.
DCS000202—Dealer ACE Application Development Team Meeting Notes.
DCS000203—General Doc Form Product Change Function.
DCS000205—General Doc Form Delete Function.
DCS000207—Dealer ACE Application Development Sub-Committee Meeting Notes.
DCS000208—General Doc Form System Weekend Hours.
DCS000209—General Doc Form Dealer/Branch Interface—Revised.
DCS000213—General Doc Form Dealer/Branch Interface.
DCS000217—General Doc Form Dealer/Branch Interface.
DCS000219—General Doc Form "Preferred Prospect" Recognition.
DCS000220—General Doc Form Application Development Team Status.
DCS000222—Full Service System.
DCS000224—Process Flow Diagrams.
DCS000234—Financial Information (GK Lease).
DCS000236—Financial Information (GK Plus).
DCS000238—Financial Information (Retail).
DCS000240—Applicant Information.
DCS000242—Spouse Information.
DCS000243—Cobuyer Informtion.
DCS000245—Decision Information.
DCS000247—Main Menu.
DCS000258—Dealer A.C.E. System Test Control.
DCS000260—Dealer A.C.E. System Test Control.
DCS000269—Dealer A.C.E. system Test Control.
DCS000277—Dealer A.C.E. System Test Control.
DCS000284—Dealer A.C.E. System Test Control.
DCS000293—Chryster Financial Corporate Deal Direct.
DCS000358—Dear Ace Dealer Information.
DCS000673—Ace Automated Credit Evaluation System.
DCS000681—Dealer Ace—Chrysler Credit's Automated Credit.
DCS000649—Exhibit B—Schedule of Fees and Charges—Electronic Credit Applications.
DT022652—License Agreement between DealerTrack and CarMax.
DT022667—DealerTrack Holding Consolidated Financial Statemetns Dec. 31, 2002 and 2001.
FRD000118—Creditnet Bulletin.
FRD000193—Ford Credit Operators Guide.
FRD000810—Creditnet Status Report.

FRD001104—Creditnet Enrollment Form.
FRD001105- Creditnet Enrollment Form.
FRD001106- Creditnet Enrollment Form.
FRD001107- Creditnet Enrollment Form.
FRD001108- Creditnet Enrollment Form.
FRD001109- Creditnet Enrollment Form.
FRD001110- Creditnet Enrollment Form.
FRD001111- Creditnet Enrollment Form.
FRD001112- Creditnet Enrollment Form.
FRD001113- Creditnet Enrollment Form.
FRD001114- Creditnet Enrollment Form.
FRD001115- Creditnet Enrollment Form.
FRD001116—Acknowledgment.
FRD001117- Creditnet Enrollment Form.
FRD001118- Creditnet Enrollment Form.
FRD001119- Creditnet Enrollment Form.
FRD001120- Creditnet Enrollment Form.
FRD001121- Creditnet Enrollment Form.
FRD001122- Creditnet Enrollment Form.
FRD001123- Creditnet Enrollment Form.
FRD001124- Creditnet Enrollment Form.
FRD001125- Creditnet Enrollment Form.
FRD001126- Creditnet Enrollment Form.
FRD001127- Creditnet Enrollment Form.
FRD001128- Creditnet Enrollment Form.
FRD001129- Creditnet Enrollment Form.
FRD001130- Creditnet Enrollment Form.
FRD001131- Creditnet Enrollment Form.
FRD001132- Creditnet Enrollment Form.
FRD001133- Creditnet Enrollment Form.
FRD001134- Creditnet Enrollment Form.
FRD001135- Creditnet Enrollment Form.
FRD001136- Creditnet Enrollment Form.
FRD001137- Creditnet Enrollment Form.
FRD001138- Creditnet Enrollment Form.
FRD001139- Creditnet Enrollment Form.
FRD001140- Creditnet Enrollment Form.
FRD001141- Creditnet Enrollment Form.
FRD001142- Creditnet Enrollment Form.
FRD001143- Creditnet Enrollment Form.
FRD001144- Creditnet Enrollment Form.
FRD001145- Creditnet Enrollment Form.
FRD001146- Creditnet Enrollment Form.
FRD001147- Creditnet Enrollment Form.
FRD001148- Creditnet Enrollment Form.
FRD001149- Creditnet Enrollment Form.
FRD001150- Creditnet Enrollment Form.
FRD001151- Creditnet Enrollment Form.
FRD001152- Creditnet Enrollment Form.
FRD001153- Creditnet Enrollment Form.
FRD001154—Creditnet Enrollment Form.
FRD001155- Creditnet Enrollment Form.
FRD001156- Creditnet Enrollment Form.
FRD001157- Creditnet Enrollment Form.
FRD001158- Creditnet Enrollment Form.
FRD001159- Creditnet Enrollment Form.
FRD001160- Creditnet Enrollment Form.
FRD001161- Creditnet Enrollment Form.
FRD001162- Creditnet Enrollment Form.
FRD001163- Creditnet Enrollment Form.
FRD001164- Creditnet Enrollment Form.
FRD001165- Creditnet Enrollment Form.
FRD001166- Creditnet Enrollment Form.
FRD001167- Creditnet Enrollment Form.
FRD001168- Creditnet Enrollment Form.
FRD001169- Creditnet Enrollment Form.
FRD001170- Creditnet Enrollment Form.
FRD001171- Creditnet Enrollment Form.
FRD001172- Creditnet Enrollment Form.
FRD001174- Creditnet Enrollment Form.
FRD001175- Creditnet Enrollment Form.
FRD001176- Creditnet Enrollment Form.
FRD001177- Creditnet Enrollment Form.
FRD001178- Creditnet Enrollment Form.
FRD001181- Creditnet Enrollment Form.
FRD001180- Creditnet Enrollment Form.
FRD001182- Creditnet Enrollment Form.
FRD001183- Creditnet Enrollment Form.
FRD001184- Creditnet Enrollment Form.
FRD001186- Creditnet Enrollment Form.
FRD001188- Creditnet Enrollment Form.
FRD001189- Creditnet Enrollment Form.
FRD001190- Creditnet Enrollment Form.
FRD001191- Creditnet Enrollment Form.
FRD001192- Creditnet Enrollment Form.
FRD001193- Creditnet Enrollment Form.
FRD001195- Creditnet Enrollment Form.
FRD001196- Creditnet Enrollment Form.
FRD001197- Creditnet Enrollment Form.
FRD001198- Creditnet Enrollment Form.
FRD001199- Creditnet Enrollment Form.
FRD001200—Creditnet Enrollment Form.
FRD001201—Creditnet Enrollment Form.
FRD001202—Creditnet Enrollment Form.
FRD001203—Creditnet Enrollment Form.
FRD001204—Creditnet Enrollment Form.
FRD001205—Creditnet Enrollment Form.
FRD001206—Creditnet Enrollment Form.
FRD001207—Creditnet Enrollment Form.
FRD001208—Creditnet Enrollment Form.
FRD001209—Creditnet Enrollment Form.
FRD001210—Creditnet Enrollment Form.
FRD001211—Creditnet Enrollment Form.
FRD001212—Creditnet Enrollment Form.
FRD001213—Creditnet Enrollment Form.
FRD001214—Creditnet Enrollment Form.
FRD001215—Creditnet Enrollment Form.
FRD001216—Creditnet Enrollment Form.
FRD001218—Creditnet Enrollment Form.
FRD001219—Creditnet Enrollment Form.
FRD001220—Creditnet Enrollment Form.
FRD001221—Creditnet Enrollment Form.
FRD001222—Creditnet Enrollment Form.
FRD001223—Creditnet Enrollment Form.
FRD001224—Creditnet Enrollment Form.
FRD001226—Creditnet Enrollment Form.
FRD001227—Creditnet Enrollment Form.
FRD001228—Creditnet Enrollment Form.
FRD001229—Creditnet Enrollment Form.
FRD001230—Creditnet Enrollment Form.
FRD001231—Creditnet Enrollment Form.
FRD001232—Creditnet Enrollment Form.
FRD001233—Creditnet Enrollment Form.
FRD001234—Creditnet Enrollment Form.
FRD001235—Creditnet Enrollment Form.
FRD001236—Creditnet Enrollment Form.
FRD001237—Creditnet Enrollment Form.
FRD001238—Creditnet Enrollment Form.
FRD001240—Creditnet Enrollment Form.
FRD001242—Creditnet Enrollment Form.
FRD001243—Creditnet Enrollment Form.
FRD001244—Creditnet Enrollment Form.
FRD001245—Creditnet Enrollment Form.
FRD001246—Creditnet Enrollment Form.
FRD001247—Creditnet Enrollment Form.
FRD001249—Creditnet Enrollment Form.
FRD001250—Creditnet Enrollment Form.
FRD001251—Creditnet Enrollment Form.
FRD001252—Creditnet Enrollment Form.
FRD001253—Creditnet Enrollment Form.
FRD001254—Creditnet Enrollment Form.
FRD001255—Creditnet Enrollment Form.
FRD001256—Creditnet Enrollment Form.
FRD001257—Creditnet Enrollment Form.
FRD001258—Creditnet Enrollment Form.
FRD001259—Creditnet Enrollment Form.

FRD001261—Creditnet Enrollment Form.
FRD001263—Creditnet Enrollment Form.
FRD001264—Creditnet Enrollment Form.
FRD001265—Creditnet Enrollment Form.
FRD001266—Creditnet Enrollment Form.
FRD001267—Creditnet Enrollment Form.
FRD001270—Creditnet Enrollment Form.
FRD001271—Creditnet Enrollment Form.
FRD001272—Creditnet Enrollment Form.
FRD001273—Creditnet Enrollment Form.
FRD001274—Creditnet Enrollment Form.
FRD001275—Creditnet Enrollment Form.
FRD001276—Creditnet Enrollment Form.
FRD001277—Creditnet Enrollment Form.
FRD001278—Creditnet Enrollment Form.
FRD001279—Creditnet Enrollment Form.
FRD001280—Creditnet Enrollment Form.
FRD001281—Creditnet Enrollment Form.
FRD001282—Creditnet Enrollment Form.
FRD001283—Creditnet Enrollment Form.
FRD001284—Creditnet Enrollment Form.
FRD001285—Creditnet Enrollment Form.
FRD001286—Creditnet Enrollment Form.
FRD001287—Creditnet Enrollment Form.
FRD001288—Creditnet Enrollment Form.
FRD001289—Creditnet Enrollment Form.
FRD001290—Creditnet Enrollment Form.
FRD001291—Creditnet Enrollment Form.
FRD001292—Creditnet Enrollment Form.
FRD001293—Creditnet Enrollment Form.
FRD001294—Creditnet Enrollment Form.
FRD001295—Creditnet Enrollment Form.
FRD001296—Creditnet Enrollment Form.
FRD001297—Creditnet Enrollment Form.
FRD001298—Creditnet Enrollment Form.
FRD001299—Creditnet Enrollment Form.
FRD001300—Creditnet Enrollment Form.
FRD001301—Creditnet Enrollment Form.
FRD001302—Creditnet Enrollment Form.
FRD001303—Creditnet Enrollment Form.
FRD001304—Creditnet Enrollment Form.
FRD001305—Creditnet Enrollment Form.
FRD001306—Creditnet Enrollment Form.
FRD001307—Creditnet Enrollment Form.
FRD001308—Creditnet Enrollment Form.
FRD001309—Creditnet Enrollment Form.
FRD001310—Creditnet Enrollment Form.
FRD001311—Creditnet Enrollment Form.
FRD001312—Creditnet Enrollment Form.
FRD001313—Creditnet Enrollment Form.
FRD001314—Creditnet Enrollment Form.
FRD001315—Creditnet Enrollment Form.
FRD001316—Creditnet Enrollment Form.
FRD001317—Creditnet Enrollment Form.
FRD001318—Creditnet Enrollment Form.
FRD001320—Creditnet Enrollment Form.
FRD001321—Creditnet Enrollment Form.
FRD001322—Creditnet Enrollment Form.
FRD001323—Creditnet Enrollment Form.
FRD001324—Creditnet Enrollment Form.
FRD001325—Creditnet Enrollment Form.
FRD001326—Creditnet Enrollment Form.
FRD001327—Creditnet Enrollment Form.
FRD001328—Creditnet Enrollment Form.
FRD001329—Creditnet Enrollment Form.
FRD001330—Creditnet Enrollment Form.
FRD001331—Creditnet Enrollment Form.
FRD001332—Creditnet Enrollment Form.
FRD001333—Creditnet Enrollment Form.
FRD001334—Creditnet Enrollment Form.
FRD001335—Creditnet Enrollment Form.
FRD001336—Creditnet Enrollment Form.
FRD001337—Creditnet Enrollment Form.
FRD001338—Creditnet Enrollment Form.
FRD001339—Creditnet Enrollment Form.
FRD001340—Creditnet Enrollment Form.
FRD001341—Creditnet Enrollment Form.
FRD001342—Creditnet Enrollment Form.
FRD001343—Creditnet Enrollment Form.
FRD001345—Creditnet Enrollment Form.
FRD001346—Creditnet Enrollment Form.
FRD001347—Creditnet Enrollment Form.
FRD001348—Creditnet Enrollment Form.
FRD001349—Creditnet Enrollment Form.
FRD001350—Creditnet Enrollment Form.
FRD001351—Creditnet Enrollment Form.
FRD001352—Creditnet Enrollment Form.
FRD001353—Creditnet Enrollment Form.
FRD001354—Creditnet Enrollment Form.
FRD001355—Creditnet Enrollment Form.
FRD001356—Creditnet Enrollment Form.
FRD001357—Creditnet Enrollment Form.
FRD001358—Creditnet Enrollment Form.
FRD001359—Creditnet Enrollment Form.
FRD001360—Creditnet Enrollment Form.
FRD001361—Creditnet Enrollment Form.
FRD001362—Creditnet Enrollment Form.
FRD001363—Creditnet Enrollment Form.
FRD001365—Creditnet Enrollment Form.
FRD001366—Creditnet Enrollment Form.
FRD001367—Creditnet Enrollment Form.
FRD001368—Creditnet Enrollment Form.
FRD001369—Creditnet Enrollment Form.
FRD001370—Creditnet Enrollment Form.
FRD001371—Creditnet Enrollment Form.
FRD001372—Creditnet Enrollment Form.
FRD001373—Creditnet Enrollment Form.
FRD001374—Creditnet Enrollment Form.
FRD001375—Creditnet Enrollment Form.
FRD001376—Creditnet Enrollment Form.
FRD001377—Creditnet Enrollment Form.
FRD001378—Creditnet Enrollment Form.
FRD001379—Creditnet Enrollment Form.
FRD001380—Creditnet Enrollment Form.
FRD001381—Creditnet Enrollment Form.
FRD001382—Creditnet Enrollment Form.
FRD001383—Creditnet Enrollment Form.
FRD001384—Creditnet Enrollment Form.
FRD001385—Creditnet Enrollment Form.
FRD001386—Creditnet Enrollment Form.
FRD001387—Creditnet Enrollment Form.
FRD001388—Creditnet Enrollment Form.
FRD001389—Creditnet Enrollment Form.
FRD001390—Creditnet Enrollment Form.
FRD001391—Creditnet Enrollment Form.
FRD001392—Creditnet Enrollment Form.
FRD001393—Creditnet Enrollment Form.
FRD001394—Creditnet Enrollment Form.
FRD001395—Creditnet Enrollment Form.
FRD001396—Creditnet Enrollment Form.
FRD001397—Creditnet Enrollment Form.
FRD001398—Creditnet Enrollment Form.
FRD001399—Creditnet Enrollment Form.
FRD001400—Creditnet Enrollment Form.
FRD001401—Creditnet Enrollment Form.
FRD001402—Creditnet Enrollment Form.
FRD001403—Creditnet Enrollment Form.
FRD001404—Creditnet Enrollment Form.
FRD001405—Creditnet Enrollment Form.
FRD001406—Creditnet Enrollment Form.
FRD001407—Creditnet Enrollment Form.
FRD001408—Creditnet Enrollment Form.
FRD001409—Creditnet Enrollment Form.
FRD001410—Creditnet Enrollment Form.
FRD001411—Creditnet Enrollment Form.
FRD001412—Creditnet Enrollment Form.

FRD001413—Creditnet Enrollment Form.
FRD001414—Creditnet Enrollment Form.
FRD001415—Creditnet Enrollment Form.
FRD001416—Creditnet Enrollment Form.
FRD001417—Creditnet Enrollment Form.
FRD001418—Creditnet Enrollment Form.
FRD001419—Creditnet Enrollment Form.
FRD001420—Creditnet Enrollment Form.
FRD001421—Creditnet Enrollment Form.
FRD001422—Creditnet Enrollment Form.
FRD001423—Creditnet Enrollment Form.
FRD001424—Creditnet Enrollment Form.
FRD001425—Creditnet Enrollment Form.
FRD001426—Creditnet Enrollment Form.
FRD001427—Creditnet Enrollment Form.
FRD001428—Creditnet Enrollment Form.
FRD001429—Creditnet Enrollment Form.
FRD001430—Creditnet Enrollment Form.
FRD001431—Creditnet Enrollment Form.
FRD001432—Creditnet Enrollment Form.
FRD001433—Creditnet Enrollment Form.
FRD001434—Creditnet Enrollment Form.
FRD001435—Creditnet Enrollment Form.
FRD001436—Creditnet Enrollment Form.
FRD001437—Creditnet Enrollment Form.
FRD001438—Creditnet Enrollment Form.
FRD001439—Creditnet Enrollment Form.
FRD001440—Creditnet Enrollment Form.
FRD001441—Creditnet Enrollment Form.
FRD001442—Creditnet Enrollment Form.
FRD001443—Creditnet Enrollment Form.
FRD001444—Creditnet Enrollment Form.
FRD001445—Creditnet Enrollment Form.
FRD001446—Creditnet Enrollment Form.
FRD001447—Creditnet Enrollment Form.
FRD001448—Creditnet Enrollment Form.
FRD001449—Creditnet Enrollment Form.
FRD001450—Creditnet Enrollment Form.
FRD001451—Creditnet Enrollment Form.
FRD001452—Creditnet Enrollment Form.
FRD001453—Creditnet Enrollment Form.
FRD001454—Creditnet Enrollment Form.
FRD001455—Creditnet Enrollment Form.
FRD001456—Creditnet Enrollment Form.
FRD001457—Creditnet Enrollment Form.
FRD001458—Creditnet Enrollment Form.
FRD001459—Creditnet Enrollment Form.
FRD001460—Creditnet Enrollment Form.
FRD001461—Creditnet Enrollment Form.
FRD001462—Creditnet Enrollment Form.
FRD001463—Creditnet Enrollment Form.
FRD001464—Creditnet Enrollment Form.
FRD001465—Creditnet Enrollment Form.
FRD001466—Creditnet Enrollment Form.
FRD001467—Creditnet Enrollment Form.
FRD001469—Corres. to Glen Pellock.
FRD001470—Creditnet Enrollment Form.
FRD001471—Creditnet Enrollment Form.
FRD001472—Creditnet Enrollment Form.
FRD001473—Creditnet Enrollment Form.
FRD001474—Creditnet Enrollment Form.
FRD001475—Creditnet Enrollment Form.
FRD001476—Additional Creditnet system for North Florida Lincoln-Mercury.
FRD001477-FRD001478—Creditnet Enrollment Form.
FRD001479—Creditnet Enrollment Form.
FRD001480—Creditnet Enrollment Form.
FRD001481—Creditnet Enrollment Form.
FRD001482—Creditnet Enrollment Form.
FRD001483—Creditnet Enrollment Form.
FRD001484—Creditnet Enrollment Form.
FRD001485—Creditnet Enrollment Form.
FRD001486—Creditnet Enrollment Form.
FRD001487—Creditnet Enrollment Form.
FRD001488—Creditnet Enrollment Form.
FRD001489—Creditnet Enrollment Form.
FRD001490—Creditnet Enrollment Form.
FRD001491—Creditnet Enrollment Form.
FRD001492—Creditnet Enrollment Form.
FRD001493—Creditnet Enrollment Form.
FRD001494—Creditnet Enrollment Form.
FRD001495—Creditnet Enrollment Form.
FRD001496—Creditnet Enrollment Form.
FRD001497—Creditnet Enrollment Form.
FRD001498-FRD001499—Creditnet Enrollment Form.
FRD001500—Creditnet Enrollment Form.
FRD001501—Creditnet Enrollment Form.
FRD001502-FRD001503—Creditnet Enrollment Form.
FRD001504—Creditnet Enrollment Form.
FRD001505—Creditnet Enrollment Form.
FRD001506—Creditnet Enrollment Form.
FRD001507—Creditnet Enrollment Form.
FRD001508—Creditnet Enrollment Form.
FRD001509—Creditnet Enrollment Form.
FRD001510-FRD001511—Creditnet Enrollment Form.
FRD001512—Creditnet Enrollment Form.
FRD001513—Creditnet Enrollment Form.
FRD001514—Creditnet Enrollment Form.
FRD001515—Creditnet Enrollment Form.
FRD001516—Creditnet Enrollment Form.
FRD001517—Creditnet Enrollment Form.
FRD001518—Creditnet Enrollment Form.
FRD001519—Creditnet Enrollment Form.
FRD001520—Creditnet Enrollment Form.
FRD001521—Creditnet Enrollment Form.
FRD001522—Creditnet Enrollment Form.
FRD001523-FRD001524—Creditnet Enrollment Form.
FRD001525—Creditnet Enrollment Form.
FRD001526—Fax Regarding Stand Alone Terminal.
FRD001527—Letter requesting Approval.
FRD001528—Creditnet Enrollment Form.
FRD001529—Creditnet Enrollment Form.
FRD001530—Creditnet Enrollment Form.
FRD001531—Memo regarding Stand Alone Equipment.
FRD001532-FRD001533—Creditnet Enrollment Form.
FRD001534-FRD00'1535—Creditnet Enrollment Form.
FRD001536—Creditnet Enrollment Form.
FRD001537-FRD001538—Request for replacement of stand alone terminal.
FRD001539—Creditnet Enrollment Form.
FRD001540—Creditnet Enrollment Form.
FRD001541—Creditnet Enrollment Form.
FRD001542—Creditnet Enrollment Form.
FRD001543—Creditnet Enrollment Form.
FRD001544—Creditnet Enrollment Form.
FRD001545—Creditnet Enrollment Form.
FRD001546—Creditnet Enrollment Form.
FRD001547-FRD001549—Creditnet Enrollment Form.
FRD001550—Creditnet Enrollment Form.
FRD001551—Creditnet Enrollment Form.
FRD001552—Creditnet Enrollment Form.
FRD001553—Creditnet Enrollment Form.
FRD001554—Creditnet Enrollment Form.
FRD001546-FRD001557—Creditnet Enrollment Form.
FRD001558—Creditnet Enrollment Form.
FRD001559—Creditnet Enrollment Form.
FRD001560—Creditnet Enrollment Form.
FRD001561—Creditnet Enrollment Form.
FRD001562—Souteastern Region 12/7.
FRD001563—Corres. From Ford Motor Credit Co. to Mr. A. Wagner.
FRD001564—Creditnet Enrollment Form.
FRD001565—Creditnet Enrollment Form.
FRD001566—Dealer info re: Harold Skinner.
FRD001567—Creditnet Enrollment Form.
FRD001568—Two Way Memo to Credit-Net.

FRD001569—Creditnet Enrollment Form.
FRD001570—Creditnet Enrollment Form.
FRD001571—Creditnet Enrollment Form.
FRD001572—Creditnet Enrollment Form.
FRD001573—Creditnet Enrollment Form.
FRD001574—Creditnet Enrollment Form.
FRD001575—Corres. From Ford Motor Credit Co. to L. Adamus.
FRD001576—Creditnet Enrollment Form.
FRD001577—Corres. From Ford Motor Credit Co. to Linda.
FRD001578—Creditnet Enrollment Form.
FRD001579—Creditnet Enrollment Form.
FRD001580—Creditnet Enrollment Form.
FRD001581—Creditnet Enrollment Form.
FRD001582—Corres. from Ford Motor Credit to George.
FRD001583—Creditnet Enrollment Form.
FRD001584—Creditnet Enrollment Form.
FRD001585—Corres from Ford Motor Credit to Mr. Fitzgerald.
FRD001586—Creditnet Enrollment Form.
FRD001587—Corres. from Ford Motor Credit to Mr. Kozel.
FRD001588—Creditnet Enrollment Form.
FRD001589—Corres. from Ford Motor Credit to Mr. Kozel.
FRD001590—Creditnet Enrollment Form.
FRD001591—Creditnet Enrollment Form.
FRD001592—Creditnet Enrollment Form.
FRD001593—Corres. From Ford Motor Credit Co. to Mr. A. Wagner.
FRD001594—Creditnet Enrollment Form.
FRD001595—Creditnet Enrollment Form.
FRD001596—Creditnet Enrollment Form.
FRD001597—Corres. From Ford Motor Credit Co. to Mr. A. Wagner.
FRD001598—Creditnet Enrollment Form.
FRD001599—Creditnet Enrollment Form.
FRD001600—Creditnet Enrollment Form.
FRD001601—Corres. from Ford Motor Credit to A. Wagner.
FRD001602—Creditnet Enrollment Form.
FRD001603—Creditnet Enrollment Form.
FRD001604—Creditnet Enrollment Form.
FRD001605—Creditnet Enrollment Form.
FRD001606—Corres. from Ford Motor Credit to A. Wagner.
FRD001607—Corres. from Ford Motor Credit to A. Wagner.
FRD001608—Creditnet Enrollment Form.
FRD001609—Creditnet Enrollment Form.
FRD001610—Memo to L. Adamus.
FRD001611—Memo to L. Adamus.
FRD001612—Creditnet Enrollment Form.
FRD001613—Fax cover to L. Adamus.
FRD001614—Creditnet Enrollment Form.
FRD001615—Creditnet Enrollment Form.
FRD001616—Creditnet Enrollment Form.
FRD001617—Creditnet Enrollment Form.
FRD001618—Creditnet Enrollment Form.
FRD001619—Creditnet Enrollment Form.
FRD001620—Creditnet Enrollment Form.
FRD001621—Creditnet Enrollment Form.
FRD001622—Creditnet Enrollment Form.
FRD001623—Creditnet Enrollment Form.
FRD001624—Creditnet Enrollment Form.
FRD001625—Two Way Memo to M. Kozel.
FRD001626—Creditnet Enrollment Form.
FRD001627—Creditnet Enrollment Form.
FRD001628—Dealer info. Re: H. Hopkins.
FRD001629—Creditnet Enrollment Form.
FRD001630—Creditnet Enrollment Form.
FRD001631—Corres. from Ford Motor Credit to Mr. Kozel.
FRD001632—Creditnet Enrollment Form.
FRD001633—Creditnet Enrollment Form.
FRD001634—Creditnet Enrollment Form.
FRD001635—Creditnet Enrollment Form.
FRD001636—Creditnet Enrollment Form.
FRD001637—Creditnet Enrollment Form.
FRD001638—Creditnet Enrollment Form.
FRD001639—Two Way Memo to M. Kozel.
FRD001640—Creditnet Enrollment Form.
FRD001641—Corres. From Ford Motor Credit Co. to L. Adamus.
FRD001642—Creditnet Enrollment Form.
FRD001643—Corres. From Ford Motor Credit Co. to L. Adamus.
FRD001644—Creditnet Enrollment Form.
FRD001645—Two Way Memo to M. Kozel.
FRD001646—Creditnet Enrollment Form.
FRD001647—Creditnet Enrollment Form.
FRD001648—Creditnet Enrollment Form.
FRD001649—Creditnet Enrollment Form.
FRD001650—Written notes from Jul. 12, 1993.
FRD001651—Memo to J. Wardwell.
FRD001652—Creditnet Enrollment Form.
FRD001653—Two Way Memo to J. Chadwick.
FRD001654—Creditnet Enrollment Form.
FRD001655—Creditnet Enrollment Form.
FRD001656—Creditnet Enrollment Form.
FRD001657—Creditnet Enrollment Form.
FRD001658—Two Way Memo to L. Adamus.
FRD001659—Creditnet Enrollment Form.
FRD001660—Creditnet Enrollment Form.
FRD001661—Creditnet Enrollment Form.
FRD001662—Creditnet Enrollment Form.
FRD001663—Creditnet Enrollment Form.
FRD001664—Creditnet Enrollment Form.
FRD001665—Corres. from Ford Motor Credit Co. to A. Wagner.
FRD001666—Creditnet Enrollment Form.
FRD001667—Creditnet Enrollment Form.
FRD001668—Creditnet Enrollment Form.
FRD001669—Creditnet Enrollment Form.
FRD001670—Creditnet Enrollment Form.
FRD001671—Creditnet Enrollment Form.
FRD001672—Creditnet Enrollment Form.
FRD001673—Creditnet Enrollment Form.
FRD001674—Creditnet Enrollment Form.
FRD001675—Creditnet Enrollment Form.
FRD001676—Creditnet Enrollment Form.
FRD001677—Creditnet Enrollment Form.
FRD001678—Creditnet Enrollment Form.
FRD001679—Creditnet Enrollment Form.
FRD001680—Creditnet Enrollment Form.
FRD001681—Creditnet Enrollment Form.
FRD001682—Creditnet Enrollment Form.
FRD001683—Creditnet Enrollment Form.
FRD001684—Creditnet Enrollment Form.
FRD001685—Creditnet Enrollment Form.
FRD001686—Creditnet Enrollment Form.
FRD001687—Creditnet Enrollment Form.
FRD001688—Creditnet Enrollment Form.
FRD001689—Creditnet Enrollment Form.
FRD001690—Creditnet Enrollment Form.
FRD001691—Creditnet Enrollment Form.
FRD001692—Dealer Info. Re: Cisco Ford Inc.
FRD001693—Creditnet Enrollment Form.
FRD001694—Creditnet Enrollment Form.
FRD001695—Creditnet Enrollment Form.
FRD001696—Creditnet Enrollment Form.
FRD001697—Creditnet Enrollment Form.
FRD001698—Creditnet Enrollment Form.
FRD001699—Creditnet Enrollment Form.
FRD001700—Memo from Ford Motor Credit Co. to A. Wagner.
FRD001701—Creditnet Enrollment Form.
FRD001702—Two Way Memo to A. Wagner.
FRD001703—Creditnet Enrollment Form.
FRD001704—Creditnet Enrollment Form.
FRD001705—Two Way Memo to A. Wagner.
FRD001706—Creditnet Enrollment Form.
FRD001707—Creditnet Enrollment Form.
FRD001708—Creditnet Enrollment Form.
FRD001709—Creditnet Enrollment Form.
FRD001710—Creditnet Enrollment Form.
FRD001711—Creditnet Enrollment Form.
FRD001712—Creditnet Enrollment Form.

FRD001713—Creditnet Enrollment Form.
FRD001714—Creditnet Enrollment Form.
FRD001715—Creditnet Enrollment Form.
FRD001716—Creditnet Enrollment Form.
FRD001717—Creditnet Enrollment Form.
FRD001718—Creditnet Enrollment Form.
FRD001719—Creditnet Enrollment Form.
FRD001720—Creditnet Enrollment Form.
FRD001721—Fax Cover Sheet to L. Adamus.
FRD001722—Memo to A. Wagner.
FRD001723—Creditnet Enrollment Form.
FRD001724—Memo to Dearman Ford.
FRD001725—Creditnet Enrollment Form.
FRD001726—Two Way Memo to L. Adamus.
FRD001727—Creditnet Enrollment Form.
FRD001728—Creditnet Enrollment Form.
FRD001729—Dealer Buyout, Prior William Mizell.
FRD001730—Creditnet Enrollment Form.
FRD001731—Creditnet Enrollment Form.
FRD001732—Creditnet Enrollment Form.
FRD001733—Creditnet Enrollment Form.
FRD001734—Creditnet Enrollment Form.
FRD001735—Memo From Ford Motor Credit Co. to L. Adamus.
FRD001736—Creditnet Enrollment Form.
FRD001737—Creditnet Enrollment Form.
FRD001738—Creditnet Enrollment Form.
FRD001739—Creditnet Enrollment Form.
FRD001740—Memo from Ford Motor Credit Co. to M. Kozel.
FRD001741—Creditnet Enrollment Form.
FRD001742—Creditnet Enrollment Form.
FRD001743—Creditnet Enrollment Form.
FRD001744—Creditnet Enrollment Form.
FRD001745—Hand written notes.
FRD001746—Creditnet Enrollment Form.
FRD001747—Creditnet Enrollment Form.
FRD001748—Creditnet Enrollment Form.
FRD001749—Creditnet Enrollment Form.
FRD001750—Creditnet Enrollment Form.
FRD001751—Creditnet Enrollment Form.
FRD001752—Hand written notes.
FRD001753—Creditnet Enrollment Form.
FRD001754—Creditnet Enrollment Form.
FRD001755—Creditnet Enrollment Form.
FRD001756—Creditnet Enrollment Form.
FRD001757—Hand written notes.
FRD001758—Creditnet Enrollment Form.
FRD001759—Creditnet Enrollment Form.
FRD001760—Hand written notes.
FRD001761—Creditnet Enrollment Form.
FRD001762—Creditnet Enrollment Form.
FRd001763—Hand written notes.
FRD001764—Creditnet Enrollment Form.
FRD001765—Creditnet Enrollment Form.
FRD001766—Hand written notes.
FRD001767—Creditnet Enrollment Form.
FRD001768—Creditnet Enrollment Form.
FRD001769—Creditnet Enrollment Form.
FRD001770—Creditnet Enrollment Form.
FRD001771—Creditnet Enrollment Form.
FRD001772—Creditnet Enrollment Form.
FRD001773—Creditnet Enrollment Form.
FRD001774—Hand written note.
FRD001775—Hand written letter to Mr. Chadwick.
FRD001776—Creditnet Enrollment Form.
FRD001777—Creditnet Enrollment Form.
FRD001778—Corres from Ford Motor Credit Co. to Mr. Chadwick.
FRD001779—Creditnet Enrollment Form.
FRD001780—Creditnet Enrollment Form.
FRD001781—Creditnet Enrollment Form.
FRD001782—Creditnet Enrollment Form.
FRD001783—Creditnet Enrollment Form.
FRD001784—Creditnet Enrollment Form.
FRD001785—Creditnet Enrollment Form.
FRD001786—Creditnet Enrollment Form.
FRD001787—Hand written notes from S. Charles.
FRD001788—Document cover sheet.
FRD001789—Creditnet Enrollment Form.
FRD001790—Hand written notes from S. Charles.
FRD001791—Creditnet Enrollment Form.
FRD001792—Creditnet Enrollment Form.
FRD001793—Creditnet Enrollment Form.
FRD001794—Creditnet Enrollment Form.
FRD001795—Creditnet Enrollment Form.
FRD001796—Creditnet Enrollment Form.
FRD001797—Creditnet Enrollment Form.
FRD001798—Creditnet Enrollment Form.
FRD001799—Creditnet Enrollment Form.
FRD001800—Creditnet Enrollment Form.
FRD001801—Creditnet Enrollment Form.
FRD001802—Creditnet Enrollment Form.
FRD001803—Creditnet Enrollment Form.
FRD001804—Creditnet Enrollment Form.
FRD001805—Creditnet Enrollment Form.
FRD001806—Creditnet Enrollment Form.
FRD001807—Creditnet Enrollment Form.
FRD001808—Two way memo to A. Wagner.
FRD001809—Hand written notes from L. Woodward.
FRD001810—Creditnet Enrollment Form.
FRD001811—Creditnet Enrollment Form.
FRD001812—Creditnet Enrollment Form.
FRD001813—Creditnet Enrollment Form.
FRD0018144—Creditnet Enrollment Form.
FRD001815—Creditnet Enrollment Form.
FRD001816—Creditnet Enrollment Form.
FRD001817—Creditnet Enrollment Form.
FRD001818—Creditnet Enrollment Form.
FRD001819—Creditnet Enrollment Form.
FRD001820—Creditnet Enrollment Form.
FRD001821—Memo to Mr. Wagner.
FRD001822—Creditnet Enrollment Form.
FRD001823—Memo from COIN Dealership.
FRD001824—Creditnet Enrollment Form.
FRD001825—Memo to J. Chadwick.
FRD001826—Creditnet Enrollment Form.
FRD001827—Creditnet Enrollment Form.
FRD001828—Memo to G. Krucek.
FRD001829—Creditnet Enrollment Form.
FRD001830—Creditnet Enrollment Form.
FRD001831—Creditnet Enrollment Form.
FRD001832—Creditnet Enrollment Form.
FRD001833—Creditnet Enrollment Form.
FRD001834—Creditnet Enrollment Form.
FRD001835—Creditnet Enrollment Form.
FRD001836—Creditnet Enrollment Form.
FRD001837—Creditnet Enrollment Form.
FRD001838—Creditnet Enrollment Form.
FRD001839—Memo to L. Adamus.
FRD001840—Creditnet Enrollment Form.
FRD001841—Creditnet Enrollment Form.
FRD001842—Total Active Dealers by Region.
FRD001843—Creditnet Enrollment Form.
FRD001844—Creditnet Enrollment Form.
FRD001845—Creditnet Enrollment Form.
FRD001846—Creditnet Enrollment Form.
FRD001847—Creditnet Enrollment Form.
FRD001848—Fax Cover from COIN Dealership.
FRD001849—Creditnet Enrollment Form.
FRD001850—Creditnet Enrollment Form.
FRD001851—Creditnet Enrollment Form.
FRD001852—Creditnet Enrollment Form.
FRD001853—Creditnet Enrollment Form.
FRD001854—Creditnet Enrollment Form.
FRD001855—Creditnet Enrollment Form.
FRD001856—Creditnet Enrollment Form.
FRD001857—Creditnet Enrollment Form.
FRD001858—Creditnet Enrollment Form.

FRD001859—Creditnet Enrollment Form.
FRD001860—Memo to G. Kruczek.
FRD001861—Creditnet Enrollment Form.
FRD001862—Creditnet Enrollment Form.
FRD001863—Memo to G. Kruczek.
FRD001864—Creditnet Enrollment Form.
FRD001865—Jan. 8, 1992 fax transmission cover sheet to Linda from R. Moore.
FRD001866—Creditnet Enrollment Form.
FRD001867-FRD001869—Creditnet Enrollment Form—Town & Country Ford.
FRD001870-FRD001871—Creditnet Enrollment Form—Bill Hood Ford.
FRD001872-FRD001873—Creditnet Enrollment Form—Danny Belyeu Ford-Lincoln-Mercury.
FRD001874—Creditnet Enrollment Form—Sunrise Olds-Toyota Inc.
FRD001875-FRD01876—Creditnet Enrollment Form—Griffin Ford Lincoln Mercury Inc.
FRD001877-FRD001878—Creditnet Enrollment Form—Hayden Royan Inc. DBA Flamingo Ford.
FRD001879—Creditnet Enrollment Form—Highlife Ford Inc. DBA Sunshine Ford.
FRD001880—Creditnet Enrollment Form—Baugh Ford-Mercury Inc.
FRD001881—Creditnet Enrollment Form—Havana Ford, Inc.
FRD001882—Creditnet Enrollment Form—Gatorland Motor Company d/b/a Gatorland Toyota.
FRD001883-FRD001884—Creditnet Enrollment Form -Gatorland Motor Company d/b/a Gatorland Toyota.
FRD001885—Creditnet Enrollment Form—Maroone Auto Plaza.
FRD001886-FRD001887—Creditnet Enrollment Form—Deland Toyota.
FRD001888-FRD001891—Creditnet Enrollment Form—Hollywood Ford.
FRD001892—Creditnet Enrollment Form -VIP Lincoln Mercury.
FRD001893—Creditnet Enrollment Form—Quitman Motor Co. Inc.
FRD001894—Creditnet Enrollment Form.
FRD001895—Creditnet Enrollment Form.
FRD001896-FRD001897—Creditnet Enrollment Form—Grubbs Ford Lincoln Mercury Inc.
FRD001898—Creditnet Enrollment Form -Palatka Ford Mercury Inc.
FRD001899—Creditnet Enrollment Form—Faircloth Ford, Inc.
FRD001900—Creditnet Enrollment Form—Tropical Ford Inc.
FRD001901—Creditnet Enrollment Form—Cliff Motor Co. Inc.
FRD001902—Creditnet Enrollment Form—Cazenave Motor Co., Inc.
FRD001903—Creditnet Enrollment Form—Wayne Ford Inc.
FRD001904—Creditnet Enrollment Form—Harold Skinner Ford-Merc Inc.
FRD001905—Creditnet Enrollment Form.
FRD001906—Creditnet Enrollment Form.
FRD001907—Creditnet Enrollment Form.
FRD001908-FRD001911.
FRD001912—Creditnet Enrollment Form.
FRD001913—Creditnet Enrollment Form.
FRD001914—Creditnet Enrollment Form.
FRD001915—Creditnet Enrollment Form.
FRD001916—Creditnet Enrollment Form.
FRD001917-FRD001918—Creditnet Enrollment Form.
FRD001919- Creditnet Enrollment Form.
FRD001920—Creditnet Enrollment Form.
FRD001921—Creditnet Enrollment Form.
FRD001922-FRD001923—Creditnet Enrollment Form.
FRD001924—Creditnet Enrollment Form.
FRD001925—Creditnet Enrollment Form.
FRD001926—Creditnet Enrollment Form.
FRD001927—Creditnet Enrollment Form.
FRD001928—Creditnet Enrollment Form.
FRD001929—Creditnet Enrollment Form.
FRD001930—Creditnet Enrollment Form.
FRD001931-FRD001935—Creditnet Enrollment Form.
FRD001936—Creditnet Enrollment Form.
FRD001937—Creditnet Enrollment Form.
FRD001939—Creditnet Enrollment Form.
FRD001941—Creditnet Enrollment Form.
FRD001942—Creditnet Enrollment Form.
FRD001943—Creditnet Enrollment Form.
FRD001944—Creditnet Enrollment Form.
FRD001945—Creditnet Enrollment Form.
FRD001947—Creditnet Enrollment Form.
FRD001948—Creditnet Enrollment Form.
FRD001949—Creditnet Enrollment Form.
FRD001951—Creditnet Enrollment Form.
FRD001953—Creditnet Enrollment Form.
FRD001954—Creditnet Enrollment Form.
FRD001955—Creditnet Enrollment Form.
FRD001956—Creditnet Enrollment Form.
FRD001958—Creditnet Enrollment Form.
FRD001960—Creditnet Enrollment Form.
FRD001964—Creditnet Enrollment Form.
FRD001965—Creditnet Enrollment Form.
FRD001967—Creditnet Enrollment Form.
FRD001968—Creditnet Enrollment Form.
FRD001969—Creditnet Enrollment Form.
FRD001970—Creditnet Enrollment Form.
FRD001971—Creditnet Enrollment Form.
FRD001972—Creditnet Enrollment Form.
FRD001973—Creditnet Enrollment Form.
FRD001974—Creditnet Enrollment Form.
FRD001975—Creditnet Enrollment Form.
FRD001976—Creditnet Enrollment Form—Bill Elliott Ford Merc.
FRD001977—Creditnet Enrollment Form—J.Williams Nissan.
FRD001978—Creditnet Enrollment Form—Jim Skinner Honda.
FRD001979—Creditnet Enrollment Form—Interstate Ford Inc.
FRD001980—Creditnet Enrollment Form—Sylvania Ford Mercury, Inc.
FRD001981—Creditnet Enrollment Form—Bev Smith Ford.
FRD001982—Creditnet Enrollment Form—Bev Smith Ford.
FRD001984—Creditnet Enrollment Form—Stadcom Lincoln Mercury.
FRD001986—Creditnet Enrollment Form—Frontier Ford L/M.
FRD001988—Creditnet Enrollment Form—Brumfield Motors Inc.
FRD001989—Creditnet Enrollment Form—Woody Anderson Ford.
FRD001990—Creditnet Enrollment Form—Hollywood Lincoln Mercury.
FRD001992—Creditnet Enrollment Form—Fort Myers Lincoln Mercury.
FRD001993—Creditnet Enrollment Form—Bondys Ford.
FRD001994—Creditnet Enrollment Form—Potamkin Toyota.
FRD001996—Creditnet Enrollment Form—Kirby Ford.
FRD001997—Creditnet Enrollment Form—Graham Chrysler Plymouth, Inc.
FRD001998—Two Way Memo re: T&J Ford, Inc.
FRD001999—Creditnet Enrollment Form—Jacky Jones Ford.
FRD002001—Creditnet Enrollment Form—Wayne Akers Ford Inc.
FRD002002—Creditnet Enrollment Form—Jim Quinlan Chevrolet.
FRD002003—Creditnet Enrollment Form—Shetler-Corley Ford, Inc.
FRD002005—Creditnet Enrollment Form—Bartow Ford Company.
FRD002006-Jul. 27, 1992 Interoffice Memo re: Bartow Ford Co.
FRD0020070—Creditnet Enrollment Form—Terry Ford.
FRD002008—Creditnet Enrollment Form—All Star Dodge-Isuzu.
FRD002010—Creditnet Enrollment Form—Paul James Ford.
FRD002011—Creditnet Enrollment Form—Gateway Motor Inc.
FRD002012—Creditnet Enrollment Form—Beaty Ford, Inc.
FRD002013—Creditnet Enrollment Form—Lakes Lincoln-Mercury, Inc.
FRD002014—Creditnet Enrollment Form—Jul. 8, 1993 memo to AJ Wagner re: Lakes Lincoln Mercury.
FRD002015—Creditnet Enrollment Form -Scarbrough Motors.
FRD002016—Creditnet Enrollment Form—Palmetto Ford.

FRD002018—Creditnet Enrollment Form—Capital Lincoln-Mercury.
FRD002020—Creditnet Enrollment Form—Dennis Fronrath Chevrolet, Inc.
FRD002021—Creditnet Enrollment Form—Sam Galloway Ford.
FRD002022—Creditnet Enrollment Form—Supreme Olds-GMC, Chrysler Ply.
FRD002023—Creditnet Enrollment Form—North Palm L/M.
FRD002025—Creditnet Enrollment Form—North Palm Lincoln Mercury.
FRD002026—Creditnet Enrollment Form—Jacky Jones Ford of Blue Ridge.
FRD002027—Creditnet Enrollment Form—Cain Ford Lincoln Mercury.
FRD002028—Creditnet Enrollment Form—Warren Wooten Ford.
FRD002029—Creditnet Enrollment Form—Williams Automotive Inc. DBA Williams Mazda.
FRD002030—Creditnet Enrollment Form—Head Ford Mercury Lincoln Inc.
FRD002031—Creditnet Enrollment Form—Johnson Ford Sales Inc.
FRD002032—Creditnet Enrollment Form—Maroone Dodge, Inc.
FRD002033—Creditnet Enrollment Form—Jim Blackman.
FRD002034—Creditnet Enrollment Form—Dub Herring Ford Inc.
FRD002035—Creditnet Enrollment Form—Dub Herring Ford Inc.
FRD002036—Creditnet Enrollment Form—Lakes Lincoln-Mercury, Inc.
FRD002037—Creditnet Enrollment Form—Hab Ford.
FRD002038—Creditnet Enrollment Form—Black-Jack Inc. DBA Gary Smith Honda.
FRD002039—Creditnet Enrollment Form—Stuard Ford Lincoln Mercury Partners.
FRD002040—Creditnet Enrollment Form—Tom W. Carter Lincoln-Mercury, Inc.
FRD002041—Creditnet Enrollment Form—M.L. Husbands Ford Inc.
FRD002042—Creditnet Enrollment Form—Searritt Motors.
FRD002043—Creditnet Enrollment Form—Newport Lincoln-Mercury.
FRD002044—Creditnet Enrollment Form—Marshall Bros. Lincoln Mercury.
FRD002047—Creditnet Enrollment Form—Hardy Chev-Geo.
FRD002048—Creditnet Enrollment Form—Butler Ford Mercury, Inc.
FRD002049—Creditnet Enrollment Form—Troy Ford Sales Inc.
FRD002051—Creditnet Enrollment Form—Shetler Lincoln Mercury Ltd.
FRD002053—Creditnet Enrollment Form—Kirk Auto Co.
FRD002054—Creditnet Enrollment Form—Tampa Honda Land.
FRD002055—Creditnet Enrollment Form—Resort Ford, Inc.
FRD002056—Creditnet Enrollment Form—Far of AL DBA Auburn Mazda.
FRD002057—Creditnet Enrollment Form—Haralson Ford Company.
FRD002058—Creditnet Enrollment Form—Alex Karras Lin-Mer.
FRD002059—Blank Sheet.
FRD002060—Creditnet Enrollment Form—Sapp Ford Co.
FRD002061—Creditnet Enrollment Form—McGarily Ford Inc.
FRD002062—Creditnet Enrollment Form -Gurdon Ford Inc.
FRD002063—Creditnet Enrollment Form—Noxubee Ford, Inc.
FRD002064—Creditnet Enrollment Form—Duval Acura At Regency.
FRD002065—Creditnet Enrollment Form—Freeway Ford, Inc.
FRD002066—Creditnet Enrollment Form—Germano Toyota.
FRD002067—Creditnet Enrollment Form—Gary Fronrath Chevrolet.
FRD002068—Creditnet Enrollment Form—Don Shetler Ford, Inc.
FRD002070—Creditnet Enrollment Form—Menten Motors, Inc. dba Chrysler Plymouth and Jeep Eagle.
FRD002071—Creditnet Enrollment Form—Gibbs Ford Mercury, Inc.
FRD002072—Creditnet Enrollment Form—Efird Ford Inc.
FRD002073—Creditnet Enrollment Form—Wansley Motor Company, Inc.
FRD002074—Creditnet Enrollment Form—Kelly Ford, Inc.
FRD002075—Creditnet Enrollment Form—Bob Wade Ford Inc.
FRD002076—Creditnet Enrollment Form—Superior Ford.
FRD002078—Creditnet Enrollment Form—Bordelon Motors, Inc.
FRD002080—Creditnet Enrollment Form—Legacy Ford-Mercury, Inc.
FRD002081—Creditnet Enrollment Form—Stadium Lincoln Mercury.
FRD002082—Creditnet Enrollment Form—Delray Lincoln Mercury.
FRD002085—Creditnet Enrollment Form—Jim Quinlan Ford.
FRD002086—Creditnet Enrollment Form—Vickery-Chevrolet-Olds Co.
FRD002087—Creditnet Enrollment Form—Luke Bolton Ford.
FRD002088—Creditnet Enrollment Form—Premiuer Ford Lincoln-Mercury.
FRD002090—Creditnet Enrollment Form—Ward S. Taylor.
FRD002091—Credinet Enrollment Form—D.C. Welch Ford Lincoln Mercury Inc.
FRD002093—Creditnet Enrollment Form—Montezuma Motor Co.
FRD002096—Creditnet Enrollment Form—Superior Ford.
FRD002098—Creditnet Enrollment Form—McGarily Ford Inc.
FRD002100—Creditnet Enrollment Form—Resort Motors.
FRD002101—Creditnet Enrollment Form—Murphy-Graham, Inc.
FRD002102—Creditnet Enrollment Form—North Point Mazda.
FRD002105—Creditnet Enrollment Form—Tim Kratzer.
FRD002106—Creditnet Enrollment Form.
FRD002107—Creditnet Enrollment Form—Kelly Lincoln Mercury.
FRD002108—Creditnet Enrollment Form—Kelly Lincoln Mercury.
FRD002109—Creditnet Enrollment Form—Gateway Ford Mercury Inc.
FRD002110—Creditnet Enrollment Form—Paul West Mitsubishi.
FRD002111—Creditnet Enrollment Form—Duval Honda.
RTC000001—Coinlink.
RTC000002—Coinlink Flowchart and description.
RTC000019—Sheet indicating Doc. Nos. were not used RTC 19-28.
RTC000029—Coinlink/Dealerships/Finance Sources features.
RTC000032—Handwritten Notes To Be Resolved.
RTC000038—Oct. 20, 1987 Memo to Sam Smail from Valerine Cline re: Coinlink equipment loan acknowledgement.
RTC000040—Site Prep/Pilot Implementation.
RTC000042—Coinlink Pilot Implementation.
RTC000044—System Administrator's Installation Guide.
RTC000047—Electrical Contractor's Installation Guide.
RTC000050—CoAmerica file folder label.
RTC000051—Comerica@coin May 7, 1987 notes.
RTC000056—Lender Market Research.
RTC000059—Coinlink Lender Survey.
RTC000071—Coinlink Network Inc. Technical Specifications Manual—Overview.
RTC000120—Metro-teller Indirect Application Master Data Definition.
RTC000126—Coinlink Network Inc. Technical Specifications Manual Message formats.
RTC000188—Presentations file folder label.
RTC000189—Notes—goals of presentation.
RTC000197—Notes—VP commercial loans.
RTC000204—Network Presentation Shot Sheet Feb. 10, 1987.
RTC000205—The Network/Empire Bank Dec. 9, 1986.
RTC000212—Narrative of Empire Bank.
RTC000213—Mar. 9, 1988 Coinlink Manufacturing/Operations Part VI.
RTC000222—Overview Business Mission.
RTC000229—Jun. 23, 1988 memo re: CBA conference Sep. 25-28, 1988.
RTC000230—Program At A Glance.
RTC000232—Project Management file folder label.
RTC000233—Coinlink Project—May 1, 1989.

RTC000255—Feb. 17, 1989 memo to Fran Kooden from Valerie Cline re: status codes from lenders.
RTC000257—Features of Coinlink.
RTC000261—Trainer's training Friday, Jan. 22.
RTC000265—Bank Network News Article—Metroteller: Shifting Gears to Loan Networking.
RTC000267—Feb. 16, 1988 article in The Atlanta Constitution—Electronic network links car dealers, lenders.
RTC000268—Dec. 12, 1986 Notes.
RTC000279—Coinlink Status Log.
RTC000284—CB&T Notes Nov. 9, 1988.
RTC000290—Coinlink Letter dated Jun. 28, 1988 to Bob Divine.
RTC000292—Coinlink Feature/Benefit Analysis Dec. 7, 1987.
RTC000304—Coin news article—Coinlink to change way auto loans are approved.
RTC000307—Coin news article—Application Manager.
RTC000309—Coin business card for Diane Bates.
RTC000310—Coinlink Functional Specification Feb. 1988.
RTC000321—Gateway Terminal Functional Specifications Jun. 17, 1988.
RTC000324—Dealer Systems.
RTC000353—Jun. 29, 1988 Memo to John Hiemstra & Jim Javors re: ILS/Coinlink Gateway Terminal.
RTC000357—Coinlink Flowchart/features/pictures.
RTC000458—Apr. 20, 1988 memo to Richard Calmes from Jim Kiernicki re: Coinlink leads.
RTC000460—Coinlink Functional Specification.
RTC000473—Mar. 21, 1988 Letter to Metroteller Systems Inc. from Coin.
RTC000476—Software info/Dealer flow charts.
RTC000618—Dealer Market [Coinlink] Notes.
RTC000628—Notes 2/12—Empire-Metro Teller.
RTC00639—Product Development Needs.
RTC000643—Notes Mar. 28, 1988—Coinlink Auto/Banking.
RTC000647—Agreement Aug. 28, 1987.
RTC000655—Coinlink network functions—overview.
RTC000657—Coinlink Feature/Benefit Analysis updated Dec. 7, 1987.
RTC000670—Jul. 13, 1987 Comerica letter to Mark Singleton, Coin.
RTC000673—May 22, 1987 Comerica letter to Mark Singleton attaching confidentiality agreement.
RTC000680—Business cards.
RTC000682—Jul. 1986 Public Network Rate Schedule.
RTC000696—Oct. 7, 1988 letter to Thomas E. Kress.
RTC000699—NFADA Dealership Pilot Agreement Outline.
RTC000702—Data Communications Service Agreement.
RTC00717—Dec. 22, 1986 Agreement.
RTC000803—Magazine articles.
RTC000814—Bank Network News Feb. 10, 1988 article.
RTC000816—Automotive News Feb. 8, 1988 article.
RTC000817—The Coin Story.
RTC000819—Various articles.
RTC000829—The Coin Proposal.
RTC000857—Son of Chrysler Pres. File folder label.
RTC000860—Coinlink Gateway Terminal Specifications Jul. 7, 1988.
RTC000884—Network World Articles Mar. 6, 1989.
RTC000889—Dealership Open Systems Coalition May 1993.
RTC000935—Coinlink Flow Charts, articles.
RTC000950—Black box file folder label.
RTC000951—V link project 8/28.
RTC000955—Coinlink file folder label.
RTC000956—Menus for Coinlink dated Jul. 1, 1987.
RTC000960—Sep. 17, 1987 letter to J. Harold Middleton from Coin.
RTC000962—Directions to Fulton Federal dated Sep. 15, 1987.
RTC000963—Sep. 2, 1987 Existing itmes on to do list.
RTC000965—Jul. 7, 1987 Status Report on Coinlink.
RTC000975—Jul. 2, 1987 Notes.
RTC000976—Jun. 26, 1987 Notes.
RTC000977—Jun. 24, 1987 Beta Test Sites for Coinlink.
RTC000980—Project Mangement file folder label.
RTC000981—Tentative agenda for next NFADA meeting.
RTC000983—Feb. 17, 1989 memo re: lease application fields.
RTC000985—Feb. 17, 1989 memo re: status codes from lenders.
RTC000987—Feb. 17, 1989 memo re: lease application fields.
RTC000991—Note Feb. 17, 1989.
RTC000992—Mar. 6, 1989 Memo re: Dealer Visits, Mar. 1-3.
RTC000994—Dec. 15, __Notes.
RTC000995—Chart.
RTC000996—Coinlink Project Status Report Mar. 28, 1988.
RTC001002—Notes.
RTC001008—Meetings in Buffalo—tentative itinerary for New York trip as of Nov. 1, 1988.
RTC001009—Coinlink Project Status Report Mar. 28, 1988.
RTC001015—Coinlink Project Management Plan, dated Feb. 1988.
RTC001023—Deadlines for Coinlink, dated Sep. 3, 1987.
RTC001025—Copy of subfile folder entitled "Status Log".
RTC001026—Status Log.
RTC001027—Copy of subfile folder entitled "Tech Specs & Tech Issues".
RTC001028—Draft letter dated Feb. 2, 1989 to Susan from Valerie.
RTC001029—Copy of subfile folder entitled "Host Systems Coinlink Functionals Specs."
RTC001030—Coinlink Functional Descriptions.
RTC001032—Copy of subfile folder entitled "For The COIN Dealership".
RTC001033—Advertisement For the COIN Dealership.
RTC001034—Advertisement For the COIN Dealership.
RTC001035—Copy of subfile folder entitled "Description".
RTC001036—Advertisement For the Lender.
RTC001037—Copy of subfile folder entitled "COINLink Diagram".
RTC001038—COINLink Automated Credit Approval.
RTC001039—COINLink Dealers.
RTC001040—Chart.
RTC001044—COINLink Worst Case Scenario Chart.
RTC001056—COINLink Best Case Scenario Chart.
RTC001056—Notes.
RTC001062—Notes.
RTC001065—Notes—Primary Market Entry.
RTC001066—Notes.
RTC001067—Notes.
RTC001068—Miscellaneous.
RTC001087—Chart—Coin Customers.
RTC001089—Chart.
RTC001090—Chart.
RTC001091—Chart.
RTC001104—Chart—GM Dealers.
RTC001110—Chart—Ford Dealers.
RTC00114—Chart—MW—Dealers.
RTC001118—Chart—MW/GM Dealers.
RTC001120—Chart—MW/Ford Dealers.
RTC001121—Chart—MW Dealers.
RTC001122—Chart—Total SE—Dealers.
RTC001125—Chart—SE—Coin Dealers.
RTC001126—Chart—SE—COINLink Dealers.
RTC001127—Chart—SE—GM Dealers.
RTC001129—Chart—SE—Ford Dealers.
RTC001130—Chart—SE—C/P Dealers; SE—Toyota Dealers.
RTC001131—Chart—SE Dealers.
RTC001132—Chart—Northeast Region—Dealers.
RTC001135—Chart—NE—Coin Dealers.
RTC001136—Chart—NE—COINLink Dealers.
RTC001137—Chart—NE—GM—Dealers.
RTC001138—Chart—NE—Ford Dealers.
RTC001139—Chart—N.E.—Dealers.
RTC001140—Chart—NE Dealers.
RTC001141—Copy of subfile folder entitled "Dealer Market Research".
RTC001142—COINLink Lease Line Connections.
RTC001144—To Valerie Cline from Paul Woodworth re: COINLink Presentation.
RTC001154—Site Specific Information.
RTC001155—Site Specific Information.

RTC001156—Miscellaneous.
RTC001157—Addendum to Site Prep Form.
RTC001158—Checklists.
RTC001159—Serial Number List.
RTC001160—COINLink Automated Credit Approval System Training Confirmation Agreement.
RTC001161—Credinet Enrollment.
RTC001162—Terminal Installation Check List.
RTC001166—COIN Financial Systems, Inc. Pre-Installation Check List.
RTC001167—COIN Financial Systems, Inc. Site Preparation Check List.
RTC001168—Training Schedule.
RTC001169—Copy of subfile folder entitled "COINLink Business Plans".
RTC001170—COINLink Preliminary Marketing Plan.
RTC001171—Miscellaneous.
RTC001185—COINLink Network Inc. Technical Specifications Manual—Overview.
RTC001297—Copy of subfile folder entitled "C.B. & T."
RTC001298-RTC001303—C.B. &T. notes.
RTC001304—Fax cover sheet to B. Divine.
RTC001305-RTC001306 Corres. from COINLink to Mr. Divine.
RTC001307-RTC001308—Corres. from COINLink to Mr. Divine.
RTC001309-RTC001315—COINLink Master Agreement for Service.
RTC001316-RTC001317—Fax to B. Divine at CB&T.
RTC1318-RTC1319—Corres. from COINLink to Mr. Divine.
RTC001320—Corres. from COINLink to Mr. Divine.
RTC001321—Corres. from CB&T to P. Wills.
RTC001322-RTC001328—Proposed record layout for CBT.
RTC001329-RTC001332—System Diagram.
RTC001333—Applications.
RTC001334-RTC001339—Corres. & Occupation codes.
RTC001340-RTC0013357—Occupation codes.
RTC001358-RTC001359—Buyer & Purchase Information.
RTC001360-RTC001363—Status Log.
RTC001364-RTC001366—Contacts & Price List.
RTC001367-RTC001369—Corres. to T. Kress.
RTC001370-RTC001371—NFDA Dealership Pilot Agreement Outline.
RTC001372-RTC001374—Fax regarding revisions to S. Sterman from V. Cline.
RTC001375-RTC001377—Corres. regarding COINLink.
RTC001378-RTC001382—Corres. regarding COINLink.
RTC001383—Data Communications Service Agreement.
RTC001384—Master Agreement for COINLink Service.
RTC001385-RTC001394—Terms & Conditions.
RTC001395-RTC001396—COINLink Services Price List.
RTC001397—Discount Schedule.
RTC001398—Charter Members Discount Schedule.
RTC001399-RTC001408—Corres. regarding COINLink.
RTC001403-RTC001412—Corres. enclosing Agreement to M. Singleton from J. Wolfson.
RTC001413-RTC001431—COINLink Overheads.
RTC1431-RTC 001446—COINLink Interfaces.
RTC001447-RTC001454Comerica.
RTC001455-RTC001460—Corres. Enclosing Confidentiality Agreement.
RTC001461-RTC001462—COINLink Diagrams.
RTC001463-RTC1466—Frost & Sullivan Information Security Questionnaire.
RTC001467—Memo to S. Langdon.
RTC001468-RTC001473—Directions to Comerica Acceptance Corp. from Metro Airport, MI.
RTC001474-RTC001477—Written notes on Detroit Meeting Jun. 16, 1987.
RTC001478-RTC001479—Comerica's Agenda Jun. 16, 1987.
RTC001408-RTC1488—COINLink Diagrams.
RTC001408—Phone message.
RTC001490—Comeria's Agenda.
RTC001491-RTC001493—Written notes re: Comerica.
RTC001493—Comerica contacts.
RTC001494-RTC001529—Comerica Acceptance Corp.
RTC001530—Comerica Acceptance Corp. ALPS Project Phase 1—Loan Origination System.
RTC001531—Written notes to S. Laydon.
RTC001532-RTC001535—Comerica Communique, Apr. 1987.
RTC001536—Empire.
RTC001537—Contacts of Empire of America.
RTC001538-RTC001539—Article from The Wall Street Journal.
RTC001540—GTE Telenet Telemail Rade Schedule.
RTC001541—Written notes re: Basic Transactions for Typical Deal.
RTC001542—Written notes re: Coinsystem or Dedicated Stand Alone.
RTC001555-RTC001567—Public Network Rate Schedule.
RTC001568—Metroteller Interchange Locations.
RTC001569-RTC001582—Metroteller Update.
RTC001583-RTC001584—List of Fields.
RTC001585-RTC001587—Status Codes from Lenders.
RTC001588-RTC001590—Technical Update.
RTC001591—Update on Status of COINLink Project.
RTC001592-RTC001598—Revised Summary of Changes and Time Estimates.
RTC001599-RTC001630—COINLink Summary of Changes and Time Estimates.
RTC001631-RTC001634—COINLink Survey.
RTC001635-RTC001638—COINLink Lender Survey.
RTC0010639-RTC001642—COINLink Lender Survey.
RTC001643-RTC001646—COINLink Lender Survey.
RTC001647-RTC001650—COINLink Lender Survey.
RTC001651-RTC001654—COINLink Lender Survey.
RTC001655-RTC001658—COINLink Lender Survey.
RTC001659-RTC001662—COINLink Lender Survey.
RTC001663-RTC001666—COINLink Lender Survey.
RTC001667-RTC001670—COINLink Lender Survey.
RTC001671-RTC001001674—COINLink Lender Survey.
RTC001675-RTC001678—COINLink Lender Survey.
RTC001679-RTC001682—COINLink Lender Survey.
RTC001683-RTC001686—COINLink Lender Survey.
RTC001687-RTC001690—COINLink Lender Survey.
RTC001691-RTC001694—COINLink Lender Survey.
RTC001695-RTC001698—COINLink Lender Survey.
RTC001699-RTC001702—COINLink Lender Survey.
RTC001703-RTC001706—COINLink Lender Survey.
RTC001707-RTC001710—COINLink Lender Survey.
RTC001711-RTC001714—COINLink Lender Survey.
RTC001715-RTC0718—COINLink Lender Survey.
RTC001719-RTC001722—COINLink Lender Survey.
RTC001723-RTC001726—COINLink Lender Survey.
RTC001727-RTC001730—COINLink Lender Survey.
RTC001731-RTC001734—COINLink Lender Survey.
RTC001735-RTC001738—COINLink Lender Survey.
RTC001739-RTC001742—COINLink Lender Survey.
RTC001743-RTC001744—COINLink Lender Survey.
RTC001746-RTC001749—COINLink Survey.
RTC001750-RTC001753—COINLink Lender Survey.
RTC001754-RTC001757—COINLink Lender Survey.
RTC001758-RTC001761—COINLink Lender Survey.
RTC001762-RTC001765—COINLink Lender Survey.
RTC001766-RTC001769—COINLink Lender Survey.
RTC001770-RTC001773—COINLink Lender Survey.
RTC001774-RTC001777—COINLink Lender Survey.
RTC001778-RTC001781—COINLink Lender Survey.
RTC001782-RTC001785—COINLink Lender Survey.
RTC001786-RTC001789—COINLink Lender Survey.
RTC001790-RTC001793—COINLink Lender Survey.
RTC001794-RTC001797—COINLink Lender Survey.
RTC001798-RTC001801—COINLink Lender Survey.
RTC001802-RTC001805—COINLink Lender Survey.
RTC001806-RTC1809—COINLink Lender Survey.
RTC001810-RTC001813—COINLink Lender Survey.
RTC001814-RTC001817—COINLink Lender Survey.
RTC001818-RTC001821—COINLink Lender Survey.
RTC001822-RTC001825—COINLink Lender Survey.

RTC001826-RTC001829—COINLink Lender Survey.
RTC001830-RTC001833—COINLink Lender Survey.
RTC001834-RTC001837—COINLink Lender Survey.
RTC001838-RTC001841—COINLink Lender Survey.
RTC001842—Conflict.
RTC001843-RTC001854—Georgia DMV/Microscience.
RTC001855-RTC001880—COIN pictures.
RTC001881-RTC001883—CBI Update.
RTC001884-RTC001887—COINLink Budget.
RTC001888-RTC001891—New Name for COINLink.
RTC001892-RTC001899—Business & Product Plannin and Development team Plan for NADA 1988.
RTC001900-RTC001929—COINLink Plan Spreadsheets.
RTC001930—CBA Annual Show/San Diego.
RTC001931—CBA Auto Finance Show/Tampa.
RTC001932-RTC001964—1989 NADA Budgets.
RTC001965-RTC001970—COIN Data.
RTC001971-RTC002004—Marks Notes.
RTC002005-RTC002007—COIN Bldg. 500.
RTC002008—Oakleaf Convergent.
RTC002009-RTC2015—Coin Memo to J. Maloney.
RTC002016—Written notes.
RTC002017—Son of Chrysler Pres.
RTC002018-RTC002021—Agreement Between Chrysler Credit Corp. & Coin Financial.
RTC002022—Certified Collateral Corp.
RTC002023—Corres. from R. Calmes to H. Tullman.
RTC002024-RTC002031—COINLink System Function Outline.
RTC002032—Corres. from R. Calmes to H. Tullman.
RTC002033-RTC002036—Corres. to J. Hiemstra from K. Wynn.
RTC002037-RTC002063—Metroteller Project Plannin Meeting.
RTC002064-RTC002094—Metroteller History.
RTC002095-RTC002104 Policy Memos.
RTC002105-RTC002114—NFADA.
RTC002115—Fax cover sheet.
RTC002116-RTC002122—Written notes.
RTC002123-RTC002132—NFADA Dealer Survey.
RTC002133-RTC002135—Corres. to R. Welte from J. Wolfson.
RTC002136—Agenda for NFDA Slide Show Planning Meeting.
RTC002137-RTC002138—NFADA Presentation.
RTC002139-RTC002142—NFADA Committee Meeting Agenda.
RTC002143-RTC002146—Discussion Outline.
RTC002147-RTC002155—NFADA Project Planning Session.
RTC002156-RTC002153—NFADA Planning Discussion Outline.
RTC002159—Memo to D. Gordon, M. Singleton, J. Hiemstra.
RTC002160—Fax Cover Sheet.
RTC002161—Memo to S. Sterman from V. Cline.
RTC002162-RTC002164—Memo to Board of Directors from D. Welte.
RTC002165—Marine Midland.
RTC002166—Status.
RTC002167-RTC002170—Corres. to T. Kress from S. Sterman.
RTC002171—Gateway Coinlink.
RTC002172-RTC002178—Corres. to J. Schreiber re: PCR.
RTC002179-RTC002181—Written notes.
RTC002182—Memo re: Gateway Terminal Equipment Requeirments.
RTC002183-RTC002184—Memo re: PC Rental Survey.
RTC002185-RTC002195—Gateway Terminal Functional Specifications.
RTC002196—Lender Gateway Device.
RTC002197-RTC002205—CoinLink Lender Gateway Terminal Functional Specifications.
RTC002206-RTC002223—Product Repackaging Overheads.
RTC002224-RTC002239—Trainer's Training.
The United States District Coourt for the Eastern District of New York; Initial Expert Report of David Klausner for Defendant routeone LLC Concerning U.S. Patent Nos. 5,878,403 and 6,587,841.
File Wrapper for 5,8778,403.
File Wrapper for 6,587,841.
Cassette Tape 1998 Auto Finance Conference.

* cited by examiner

| Regular Charges | | | |
|---|---|---|---|
| Description | Unit Cost | Number of Times | Effective Date |
| Dedicated Leased Line | $550.00 | 1 | 04/01/1996 |
| Subscription Fee | $100.00 | 1 | 06/20/1996 |
| Modem DialUp | $200.00 | 2 | 04/01/1996 |
| Subscription Fee | $50.00 | 1 | 04/01/1996 |

FIG. 4D

| Discount Information | | | |
|---|---|---|---|
| Description | Threshold | Discount | Effective Date |
| Application Send - Success | $3.00 | 20.00% | 04/01/1996 |
| Credit Bureau Call | $1.00 | 5.00% | 04/01/1996 |
| Credit Bureau Call | $5.00 | 10.00% | 04/01/1996 |

FIG. 7 ns, routing and funding, for use in automotive sales, for example.

AUTOMATED CREDIT APPLICATION SYSTEM

CROSS REFERENCE TO RELATED PATENT APPLICATION

This application is a continuation-in-part application of Ser. No. 08/526,776 filed Sep. 12, 1995, now U.S. Pat. No. 5,878,403, entitled "COMPUTER IMPLEMENTED AUTOMATED CREDIT APPLICATION ANALYSIS AND DECISION ROUTING SYSTEM" the subject matter of which is hereby incorporated by reference in its entirety. The benefit of the filing date of the above copending application is claimed herein.

BACKGROUND OF THE INVENTION

1. Field of the Invention

The invention relates to the technical field of data processing, and more particularly to an enhanced computer implemented credit application analysis and decision routing system.

2. Background Information

Before the invention of the subject matter of the above-referenced related co-pending application, obtaining credit and financing of a major consumer purchase had been done manually. Typically, an applicant filled out a credit (loan) application by hand. The process is fully described in the co-pending application, and therefore will not be repeated here.

Certain aspects of the prior loan application process had been automated to a limited extent, for example, according to Jones et al. (U.S. Pat. No. 5,239,462) and Dykstra et al. (U.S. Pat. No. 5,611,052). However, these disclosed systems have somewhat limited functionality in processing loan applications.

The related co-pending application describes a comprehensive automation of the whole credit application process to provide flexibility and functionality in the management of the credit application process. Additional functionality, improvements to the system functionality described in the co-pending application, and aspects of the invention previously fully disclosed but for which additional protection is desired, are therefore the subject of this application.

OBJECTS OF THE INVENTION

It is a principal object of the present invention to provide an enhanced on-line, real time, solution for the entire indirect loan application processing, routing and funding, for use in automotive sales, for example.

It is a further object of the invention to provide an interface with a third party vendor which allows a credit originator to fax an application to the third party vendor for entry into the loan processing system.

It is a further object of the invention to provide super store front end kiosk integration with the loan processing system. Kiosks are used at super stores such as CarMax and DriversMart, for example, and will permit a consumer to fill out an application for credit which will be routed to the central host of the system according to the present invention.

It is a further object of the invention to provide for a lender-to-lender capability, in which an application can be automatically forwarded through the system by a first lender to a second lender with which the first lender has a relationship, if, for example, the first lender has decided not to approve the loan application.

It is a further object of the invention to provide a lender user interface for decisioning in which a lender can receive an application directly through the loan processing system of the invention, view the application on a separate display device, and manually decision the application or manually enter the application into the lender's own credit processing system.

It is a further object of the invention to provide contract validation functionality in which, after loan application approval, a sales contract can be forwarded through the system from a dealer to a lender for numerical (and other) verification prior to funding the loan. Further, if agreed with the lender, the lender can be set up to trigger an automatic disbursement of funds to the dealer account when the contract is approved.

It is a further object of the invention to provide windows based system, enabling a full-color graphical user interface (GUI) in which various icons are used to represent and initiate operations, and wherein color high-lighting indicating important or critical information can be used, and wherein various images can be displayed, for example.

It is a further object of the invention in connection with the GUI, to implement enhanced mega-dealer reporting in which dealers that have multiple dealerships can aggregate data from all of their dealerships into consolidated reports.

It is a further object of the invention to provide an interface with dealer web sites for the exchange of data, the interfacing providing a link between the dealer web site and the credit application routing system central host, and therefore, to the rest of the system to provide for loan processing and routing, for example.

It is a further object of the invention in connection with the dealer web site features, to provide for a "leads" functionality in which information about visitors to a dealer's web site is provided to the dealer.

It is a further object of the invention to provide an interface with in-house systems, such as the ADP Elite software package, or one from U.C.S., for example, so that dealers using such a system can benefit from practically seamless integration of their system with the rest of the loan processing system of the present invention.

It is a further object of the invention in connection with the GUI, to provide an enhanced debt ratio functionality in which what-if scenarios can be explored to find a suitable financing arrangement for a consumer.

It is a further object of the invention in connection with the windows-based (GUI) features, to provide for automatic version (level) checking and updating of the resident software each time a user, e.g., a dealer, connects to the system.

It is a further object of the invention to provide an enhanced gateway CPU at a lender's site, which communicates with the system host, and on which program software of the present invention resides.

The manner of achieving these and other objects of the invention will be clear from this disclosure to one skilled in the art.

SUMMARY OF THE INVENTION

In accordance with the above objects, the present invention provides an enhanced credit application entry and routing system. The following features and advantages are achieved according to the embodiments of the invention which are herein disclosed and claimed.

According to an aspect of the invention, the fax connection provides the advantageous capability to route applications from a third party data entry source through the system to lenders. Dealers can have the third party vendor enter the application data thereby eliminating any need for the dealer to have data entry equipment and/or personnel for entering loan application data into the loan processing and routing system. By having this additional pipeline from the third party vendor to the system, lenders are able to receive electronically applications from multiple sources from whom they might otherwise have to deal with manually. In this regard, disclosed is a method of operating a credit application and routing system, the system including a central processor coupled to a communications medium for communicating with remote application entry and display devices at an application staging facility having fax devices, remote display devices at point of sale locations, remote credit bureau terminal devices, and remote funding source terminal devices, the method comprising receiving a facsimile credit application from a point of sale location at an application staging facility by fax, entering credit application data from the facsimile credit application into a remote application entry and display device, selectively receiving at the central processor the credit application data from the remote application entry and display device, selectively (optionally) obtaining associated credit report data from at least one remote credit bureau terminal device, selectively forwarding the credit application data (and optionally, credit report data) to at least one remote funding source terminal device, and selectively forwarding funding decision data from the at least one remote funding source terminal device to a display device at the respective point of sale location. The remote display devices at the point of sales locations may be fax machines or CRT display devices, for example.

According to another aspect of the invention, the integration of the loan processing and routing system with remote point of sale consumer credit application kiosks, and the like, advantageously allows a consumer to enter an application at a "Super Store" or other location with kiosks, and have the application transmitted electronically to the application processing system host. In this regard, disclosed is a computer based method of operating a credit application and routing system, the system including a central processor coupled to a communications medium for communicating with remote application entry and display devices, the entry and display devices including consumer credit application kiosks, remote credit bureau terminal devices, and remote funding source terminal devices, the method comprising selectively receiving credit application data from a consumer credit application kiosk, (optionally) selectively obtaining credit report data from at least one remote credit bureau terminal device, selectively forwarding the credit application data (and optional credit report data) to at least one remote funding source terminal device, and selectively forwarding funding decision data from the at least one remote funding source terminal device to the respective consumer credit application kiosk. The kiosks may be operating site specific information gathering software.

According to another aspect of the invention, a lender-to-lender functionality is available which advantageously provides that, if an initial lender decides not to approve an application, the initial lender can opt to automatically forward the application through the system to another lender, a "secondary lender," with whom the initial lender has a relationship. In other words, the initial lender has an option other than just to send the application directly back to the dealer unapproved. (In the prior system according to the co-pending application, the application could then have been sent to another lender independently of the initial lender, if specified by the dealer.) Upon the secondary lender issuing a decision, both lender responses are then sent back to the dealer. This entire process advantageously takes place in a matter of typically a few minutes, for example. The lender-to-lender capability provides readily apparent advantages to each of the parties involved, the applicant, the dealer and the lenders, initial and secondary. In this regard, disclosed is a computer based method of operating a credit application and routing system, the system including a central processor coupled to a communications medium for communicating with remote application entry and display devices, remote credit bureau terminal devices, and remote funding source terminal devices, the method comprising selectively receiving credit application data from a remote application entry and display device, selectively obtaining credit report data from at least one remote credit bureau terminal device, selectively forwarding the credit application data, and credit report data if appropriate, to a first remote funding source terminal device, selectively forwarding the credit application data, and credit report data if appropriate, to a second remote funding source terminal device if the funding source associated with the first remote funding source terminal device declines to approve the credit application, and selectively forwarding funding decision data from the first and second remote funding source terminal devices to the respective remote application entry and display device.

According to another aspect of the invention, the lender user interface (LUI) advantageously provides lenders with the capability of manually responding to dealer requests (e.g., loan applications) received electronically over the inventive system. With the LUI, the lender can view on-line the application entered by the dealer. The LUI may be used by lenders, for example, in the case of a communications outage on their in-house credit processing system, to manually process loan application review/approval. Further, with the LUI, lenders can view all the various system requests sent to them and all the referrals they may have made. They can view on-line the parameters of the relationships they have with dealers, and specific details about a particular dealer, e.g., number of loans in a particular time, etc. The lender user interface (LUI) also advantageously allows lenders to enter their own news onto the system themselves rather than through personnel at the system host, if they are announcing special incentives, or rate changes, for example. Lenders may also look at their invoices on-line from within the lender user interface (LUI).

According to another aspect of the invention, the contract validation feature provides contract information electronically to the lender so that the lender can verify the contract data before funding the loan, advantageously reducing the time for funding to be provided to a dealer, for example. Electronic funding automatically upon contract validation can advantageously be implemented. In this regard, disclosed is a computer based method of operating a credit application and routing system, the system including a central processor coupled to a communications medium for communicating with remote application entry and display devices, remote credit bureau terminal devices, and remote funding source terminal devices, the method comprising selectively receiving credit application data from a remote application entry and display device, selectively obtaining credit report data from at least one remote credit bureau terminal device, selectively forwarding the credit application data, and credit report data if appropriate, to at least one remote funding source terminal device, and selectively forwarding funding decision data from the at least one remote funding source terminal device to the respective remote application entry and display device, wherein if the funding decision data is approval of the credit application, selectively forwarding purchase contract data from the remote application entry and display device to the central processor, verifying the purchase contract data in the central processor, forwarding the verified purchase contract data from the central processor to the at least one remote funding source terminal device, and forwarding an indication of purchase contract status from the at least one remote funding source terminal device to the respective remote application entry and display device.

According to another aspect of the invention, the graphical user interface (GUI), which is also commercially known as "CCWIN" or "Credit Connection for Windows" (Credit Connection is a trademark licensed to Credit Management Systems Incorporated (CMSI), all rights therein being reserved), advantageously provides the same functionality as the character based product. The GUI uses the concept of the "deal jacket" (a common term used by dealerships) providing tabs as a selection process. From any tab a dealer can move to another piece of information contained in the deal jacket. The GUI also uses many graphical representations, e.g., icons, for the selection of primary function, i.e., enter a new application, etc. Bank logos are advantageously used in the lender screen so that when a dealer is viewing decisions from each of the lenders, they see a representation of the lender logo. A car picture in the application overview screen is advantageously used to illustrate the collateral a customer may be purchasing. Color can be advantageously used to highlight certain information, e.g., derogatory credit bureau information. In this regard, disclosed is a method for use in a terminal including a visual display and a pointing device, to provide a graphical user interface for graphically depicting credit application operations, the method comprising: displaying on the visual display a graphical depiction of a deal jacket, including graphical depictions of folder tabs, and displaying on the visual display at least one icon for the selection of at least one associated credit application function. According to another aspect of the invention, the at least one credit application function associated with the at least one icon includes one of: enter a new credit application, pull a credit bureau report, select a lender, and numerous other functions. According to another aspect of the invention, the displaying of the graphical depiction of a deal jacket includes displaying at least one of the following folder tabs: public records, applicant, co-applicant, collateral, comments, overview, lenders, credit summary, trades, and bureau data. The lender to lender interface, described above, can be implemented as a "lender link" where a lender user can easily and conveniently link through the GUI with another lender to forward an application.

According to another aspect of the invention, the enhanced mega-dealer reporting allows a large dealership group to view reports from a dealership or group level through the GUI. The dealer may select to see reports on an individual store, or all of their stores at one time. This allows large dealerships to better manage relationships with lenders from a corporate level, not only a store level. In this regard, disclosed is a computer based method of operating a credit application and routing system, the system including a central processor coupled to a communications medium for communicating with remote application entry and display devices, remote credit bureau terminal devices, and remote funding source terminal devices, wherein the system processes credit applications for a dealer having a plurality of dealerships located at different locations, the method comprising aggregating data from each of the plurality of dealerships, and providing the dealer with consolidated reports using the aggregated data. In the enhanced system, the reports and presentations have been modified over those of the previously disclosed system in accordance with the GUI CCWIN enhancements.

According to another aspect of the invention, the interface with dealership web sites advantageously provides a closed loop credit decision process for a consumer on the Internet. In the previous system it was contemplated that dealers and other users could route their messages to and from the system through the Internet, or any other data transfer medium. According to this enhancement, a dealer with a web site can link the consumer credit application processing of the system to the web site so that consumers can browse for a purchase item, and advantageously fill out a credit application at the same time. In this regard, disclosed is a computer based method of operating a credit application and routing system, the system including a central processor coupled to a communications medium for communicating with remote application entry and display devices, remote credit bureau terminal devices, and remote funding source terminal devices, wherein the system processes credit applications for a dealer having a web site, the method comprising receiving credit application data from a consumer through the dealer web site, selectively obtaining credit report data from at least one remote credit bureau terminal device, selectively forwarding the credit application data, and credit report data if appropriate, to at least one remote funding source terminal device, and selectively forwarding funding decision data from the at least one remote funding source terminal device to consumer at the dealer web site. According to another aspect of the invention, a copy of the funding decision data is sent to the dealer directly. According to a further aspect of the invention, the sending a copy of the funding decision data to the dealer directly comprises at least one of: faxing the data to the dealer and providing the data to the dealer on-line. According to another aspect of the invention, when a user shops for an automobile and looks up a vehicle on a dealer's web site, the system provides the dealer with the name and phone number of the user so that the dealer can follow up on the lead.

According to another aspect of the invention, the in-house (e.g., ADP Elite) interface advantageously allows elimination of the need for duplicate data entry at sites where such an in-house finance and insurance (F&I) software system is already installed. Dealers may originate an application on their software and load it to the system Host of the present invention. Dealers can simply "toggle" from their in-house F&I system to the inventive system of the present invention (Credit Connection) where the application is then available to the user. In this regard, disclosed is a computer based method of operating a credit application and routing system, the system including a central processor coupled to a communications medium for communicating with remote application entry and display devices, remote credit bureau terminal devices, and remote funding source terminal devices, wherein the inventive system processes credit applications for a dealer having an in-house finance and insurance system, the method comprising receiving credit application data from remote application entry and display devices of the dealer in-house finance and insurance system, selectively obtaining credit report data from at least one remote credit bureau terminal device, selectively forwarding the credit application data, and credit report data if appropriate, to at least one remote funding source terminal device, and selectively forwarding funding decision data from the at least one remote funding source terminal device to the respective remote application entry and display device of the dealer in-house finance and insurance system.

According to another aspect of the invention, the enhanced manipulation of debt ratio feature disclosed in the prior co-pending application advantageously allows dealers to modify consumer data to work with the consumers debt, car price, loan amount, etc., to help the consumer qualify for a loan, in connection with the GUI CCWIN system enhancements. This aspect provides the dealers with the capability of changing a payment amount, for example, to determine what the new debt ratio will be, doing a "what-if" analysis. This can advantageously aid the consumer in getting the proper loan, and the dealer in making the sale. In this regard, disclosed is a method of analyzing credit application and credit bureau report information, including performing debt ratio computations. The GUI enhancements make for an easier and more aesthetically pleasing operation.

According to another aspect of the invention, the automatic update feature advantageously ensures the dealers are using the most up-to-date versions of the system software resident on their local computers. This feature relates to installations where system software is resident on the remote device, for example, the CCWIN version of the system. According to this aspect of the invention, each time a dealer using the Windows product (CCWIN) connects to the host by means of the Internet, for example, the host checks to make sure that the dealer is using the most recent version of the Credit Connection for Windows software. If not, the host automatically sends a program to the dealer through the Internet to automatically update their resident software. In this regard, disclosed is a method of updating user software in a computer based method of operating a credit application and routing system, the system including a central processor coupled to a communications medium for communicating with remote application entry and display devices, remote credit bureau terminal devices, and remote funding source terminal devices, the method comprising checking the software of a user when the user logs in to the system and if the user software is not the most recent version, automatically forwarding data to use in updating the user software. The software can optionally be automatically updated while the user is on-line, or alternately, the user may opt to update the software at a later time.

According to another aspect of the invention, the gateway CPU at a lender's site is connected to the Credit Connection host by a telecommunications line, e.g., Sprint. Data passes from the host through the line to the gateway CPU and is processed by the software to be converted into a format which the lender credit processing system recognizes, and then transported to the lender credit processing system. It also receives data back from the lender credit processing system, converts it into a format that Credit Connection recognizes, and sends it back to the Credit Connection host. In this regard, disclosed is a credit application and routing system comprising a central processor having and executing a program and further comprising at least one data input terminal for selectively receiving credit application data from respective applicants at remote locations and forwarding the data to the central processor over a communications medium, at least one funding source front end processor for receiving the credit application data from the central processor over a communications medium and sending funding decision data back to the central processor. According to a further aspect of the invention, the front end processor has and executes a program to convert the credit application data received into a format for use by a funding source credit processing system and to convert the funding decision data into a format for use by the central processor.

BRIEF DESCRIPTION OF THE DRAWINGS

The above and other objects, advantages and features of the invention and the disclosed embodiments will become apparent from the following detailed description taken with the drawings in which:

FIGS. 3A to 3K are exemplary graphical user interface data entry screens according to an exemplary embodiment of the invention.

FIGS. 4A to 4F are exemplary graphical user interface setup and information screens according to an exemplary embodiment of the invention.

FIGS. 5A to 5C are additional exemplary graphical user interface screens according to an exemplary embodiment of the invention.

FIG. 7 illustrates an exemplary series of icons forming an animation sequence in a graphical user interface embodiment of the invention.

DETAILED DESCRIPTION OF THE PREFERRED EMBODIMENTS

The invention will now be described in more detail by way of example with reference to the embodiments shown in the accompanying figures. It should be kept in mind that the following described embodiments are only presented by way of example and should not be construed as limiting the inventive concept to any particular physical configuration.

Figure 1:
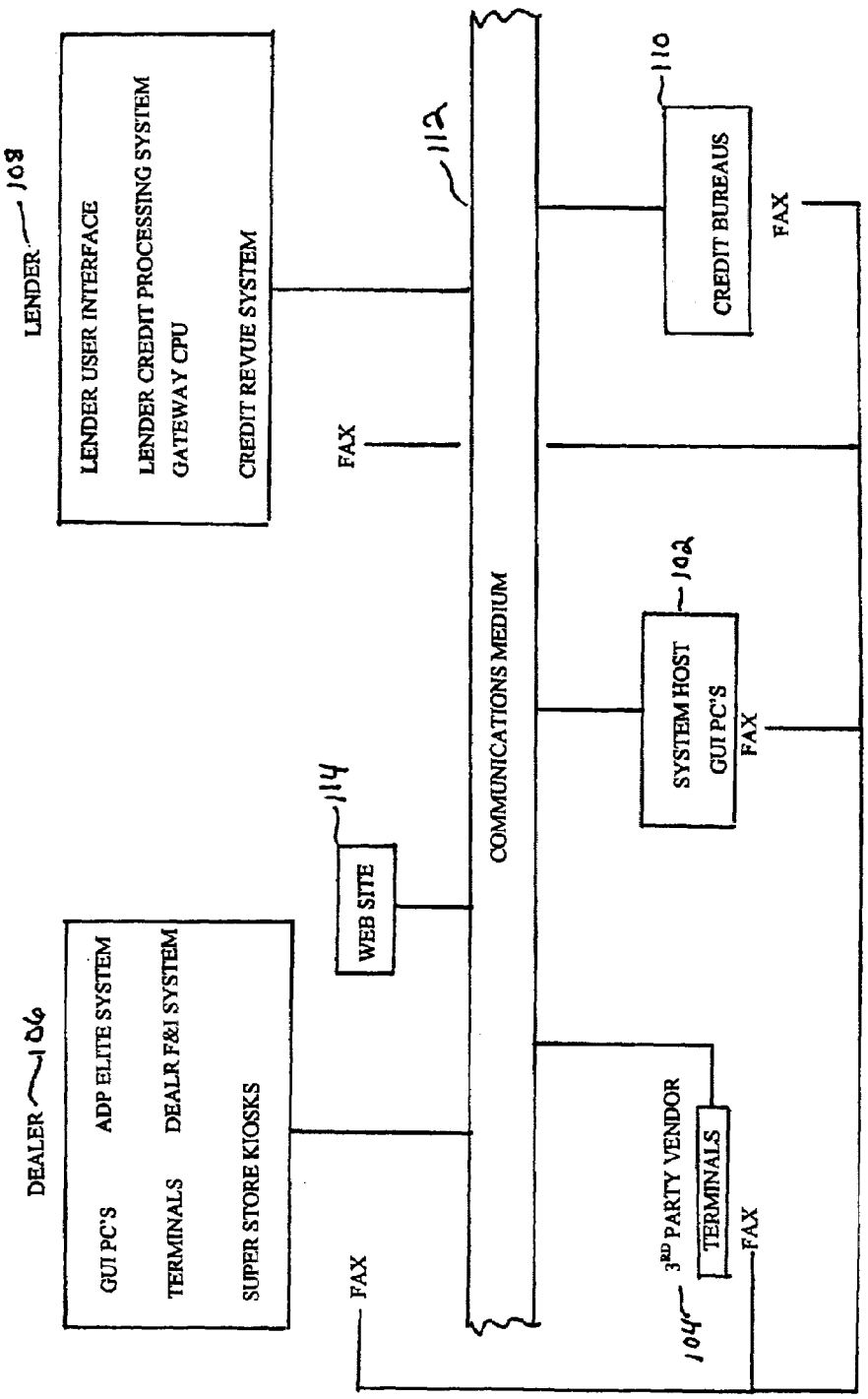
FIG. 1 is an illustration of the functional components of a system according to an exemplary embodiment of the present invention.

With reference to FIG. 1, the third party fax connection, or simply "Fax Connection," aspect of the invention will now be described. The Fig. shows that the host 102 is connected to various users, the third party vendor 104, the dealer 106, the lender 108 and the credit bureaus 110, through a communications medium 112. This medium 112 could include leased lines, telephone lines, local and wide area networks, the Internet, etc., as would be apparent to one skilled in the art, so long as the medium can support the volume and speed of data transmission traffic to meet design requirements.

However, there may be dealers who do not have the capability, personnel, or time to enter the application data directly into the Credit Connection system, or indirectly through an in-house finance and insurance (F&I) system. For these dealers, the fax connection provides an alternative so that the benefits of electronic processing can be obtained.

The fax connection aspect of the invention provides an interface between the Credit Connection system host 102 and a third party vendor 104 (such as Global Fax) which allows a credit originator 106 (dealer) to fax an application to the third party vendor 104 for entry of the data into the Credit Connection system and transmission to the host 102. The fax devices are shown connected by a separate medium, however, this could actually be the same communications medium 112 normally used by the system. The application is manually keyed in by the third party vendor 104 and transmitted electronically to the Credit Connection host 102, for routing to a lender or lenders 108. Credit bureaus 110 are accessible by the host 102 if credit bureau reports are to be pulled. This third party vendor 104 aspect of the invention eliminates any requirement for data entry on the part of both the credit originator, e.g., a dealer 106 with only manual application entry and faxing capabilities and/or personnel, for example, and the lender 108 who is connected to the Credit Connection system, but would otherwise have to deal with faxed applications manually from this dealer 106.

This Fax Connection aspect of the invention therefore provides the advantageous capability for the Credit Connection system to route applications from a third party data entry source 104 through the Credit Connection system to lenders 108. By having one pipeline to the Credit Connection system, lenders 108 are able to receive applications from multiple and varied sources electronically. Besides using third party vendors 104, the Credit Connection host system site may also be provided with the capability through graphical user interface personal computers (GUI PC's), terminals, or the like, and data entry personnel (not shown) to load an application faxed to the host site directly from a dealer 106, into the Credit Connection system and thereby to send the application to a lender 108 on behalf of the dealer 106.

One simple example of a use of this third party faxing capability will now be described. A dealer (Smith Motors) faxes an application to Citizens Bank. However, the faxed application is actually received by a third party vendor (e.g., Fax Pro) and entered into the Credit Connection system. The application data entered is then sent electronically to Citizens Bank through the Credit Connection system. The Credit Connection system, through the third party vendor, is thereby able to electronically process and route the application, originating with Smith Motors, and the decision from Citizens Bank, even though Smith Motors submitted a faxed application originally. Alternately, Smith Motors could fax the application to the Credit Connection host site directly for entry by personnel at the site, and processing in the system.

Super Store integration with kiosks is provided and will now be described. This integration aspect of the present invention allows a consumer to enter an application at a kiosk located at a Super Store (or other location). The application is then transmitted electronically to the Credit Connection host.

Integration of the Credit Connection system to front end Kiosks of Super Stores, e.g., Drivers Mart and Carmax, advantageously allows for the Super Stores to share application and decisioning data with the Credit Connection system. This aspect of the invention provides data conversion between the kiosk system and the Credit Connection host system requirements. In one embodiment, a dynamic link library (.dll) program is used to poll data from the Credit Connection system on a timed basis to populate the kiosk. Other methods would be apparent to one skilled in the art and are dependent on the type of kiosk system being operated.

The just described kiosk integration assumes that the kiosks have some sort of data entry terminal which is used by the consumer to enter application data. However, in some instances, the kiosk may include a telephone line to a third party vendor who takes the application data orally from the kiosk user over the telephone lines and enters the data into the Credit Connection system through a terminal device.

Also contemplated for kiosks is a variation of the above, in which the kiosk may use a touch screen device to interactively respond to a third party vendor providing prompts to the consumer manually or automatically.

Lender-to-lender capability is provided. Co-pending patent application Ser. No. 08/526,776 describes an inventive process according to one embodiment where a credit application is entered by an automobile dealer, for example, into a terminal at the dealership, and is sent through the Credit Connection system to various lenders ("initial lenders") for decisions. In the above-referenced embodiment of the invention described in the co-pending application, the initial lender has the option, after making a decision, to send that decision back through the Credit Connection system to the dealer. If the decision is a decline, i.e., application rejected, the dealer can decide then, or may have decided in advance, that upon decline, the application should be sent to another lender. If the decision was that the application was rejected by the initial lender selected, then a subsequent lender with different criteria may approve the loan, thus providing a better chance that the consumer will be able to make the purchase and the dealer close the deal.

As described more fully below, a direct lender-to-lender process is provided. In this process, if an initial lender decides not to approve an application, the initial lender itself can opt to automatically forward the application through the Credit Connection system to another lender, a "secondary lender," with whom the initial lender has a relationship. In other words, the initial lender now has the option wherein rather than just send the application directly back to the dealer as not approved (rejected), it can be forwarded to another (secondary) lender. Upon the secondary lender issuing a decision, one or both of the lender responses are then sent back to the dealer. This entire process typically takes place in a matter of a few minutes or less. An example of such a relationship between lenders is where one lender is a so-called "prime" lender and the other lender is a so-called "sub-prime" lender. A prime lender would have one set of lending criteria, while the sub-prime lender would make loans of a different grade, and thus employ a different set of lending criteria. If the prime lender decided not to approve a loan, it could send the application directly to the sub-prime lender, which might be more likely to approve the loan since its lending standards would not be as strict as those of the prime lender.

Some of the advantages of providing a lender-to-lender capability are now described. The lender-to-lender capability provides various advantages to each of the parties involved, the applicant, the dealer, the secondary lender, and the initial lender.

The applicant naturally wants his or her application approved, and as quickly as possible. With the lender-to-lender capability, there is a greater likelihood that the application will be approved, since an application rejected by an initial lender will also be sent to a secondary lender which applies different lending criteria to the credit application. Even lenders that make loans of the same grade sometimes use different criteria to evaluate loan applications, which is why a dealer often sends the loan application to more than one lender in the first place. The applicant is also likely to receive his decision more quickly because the application is automatically sent by the initial lender to the secondary lender upon the initial lender's decision to decline the application, and thus, the dealer is not required to resubmit the application upon receiving a decline response from the initial lender. In other words, the secondary lender receives the application directly from the initial lender through the Credit Connection system, and because of the elimination of the transmissions back to the dealer, the entire decisioning process can be completed more quickly. From the dealer's perspective this process is also more efficient.

The dealer also benefits from the lender-to-lender process, because each application has more of a chance of being approved, for the reasons stated above. The dealer's interest is in securing financing for the applicant in the fewest number of steps, and as quickly as possible, so that the dealer can sell an automobile. Therefore, any process which increases the applicant's chances of obtaining a loan benefits the dealer since the applicant cannot purchase an automobile without financing. The lender-to-lender capability of Credit Connection accomplishes this by getting the application to secondary lenders which have been targeted by the initial lenders as more likely to approve the application. The dealer's efforts are also minimized since it does not have to resubmit applications which are denied by the initial lenders.

The secondary lenders benefit by receiving more applications, and thus more revenue generating opportunities. The more credit applications that a lender receives, the more opportunities it has to make loans. Therefore, secondary lenders will benefit from Credit Connection's lender-to-lender capability since they will receive applications from the initial lenders which they might not have received directly from the dealers. In other words, the secondary lenders do not have to establish arrangements with certain dealers to receive applications from them because they can receive the applications indirectly, through the initial lenders.

Similarly, the initial lenders benefit because they receive more applications than they might otherwise receive. A dealer may be more willing to send an application to a lender, despite the fact that the lender may be no more likely than another lender to approve the application itself, because it knows that if the lender declines the loan, it will send the application to a secondary lender who has more of a chance of approving the loan. The initial lender may also have an additional incentive to send the application to a secondary lender(s) because the initial lender can be expected to have established an arrangement which entitles it to receive fees from secondary lenders to which it sends applications.

A lender user interface (LUI) for decisioning is also provided according to an embodiment of the invention. This LUI allows a lender to receive an application through the Credit Connection service, bypassing its own credit processing system, and manually decision the application. The lender user interface serves a number of purposes. One is to provide the lenders the capability of manually responding to dealer requests electronically. Lenders may also use this in the case of a communications outage on their in-house processing system. Lenders can view all the Credit Connection system requests sent to them, all referrals they may have made with the lender to lender aspect just described above. They also may view on-line the applications entered by any dealer, the relationships they have with dealers, and specific details about any dealer. The second purpose of the LUI is to allow lenders to enter their own news onto the system, such as news relating to their loan and lease products. Lenders may also look at their invoices on-line from within the LUI.

A contract validation process is also provided according to an embodiment of the invention. Contract validation allows a dealer, once the customer has agreed on a car, pricing, and loan amount (as approved by a lender), to forward the contract information electronically to the lender so that the lender can verify the contract data, e.g., the terms such as dollar amounts, before funding the loan.

Currently, dealers send hard copies of the contract information to the lenders for validation, by mail or fax for example, so the process generally takes at least a couple of days. If the dealer wants to sell the car before receiving the funds, it can "spot" the vehicle, which means that it lets the customer leave with the vehicle and hopes that the contract information is validated by the lender and not rejected for some reason. If rejected, revision and re-execution of the contract may be required, which of course is inefficient for all parties involved.

Therefore, contract validation allows for a dealer to transmit an "electronic contract" to a lender. If a relationship exists between the lender and dealer, the dealer may load contract data directly to the lender from the funding screen of the Credit Connection system: The data is first checked from within the Credit Connection system to insure that the math is correct and required fields are complete. Upon loading into the lender system, the data is checked to see if it complies with the lender policies. The lender can then return one of three responses: Rejected, Approved, and Pending. Rejected means that the contract was not loaded into the lenders system. Approved means that the contract was accepted and there were no problems. Pending means that the contract was accepted but is still undergoing review. The user of the Credit Connection system, viewing a credit application status screen, for example, sees either "funded" for approved applications/contracts, or the status stays "booked" for rejected/pending applications/contracts. It can be appreciated from the business perspective that this contract validation feature can speed up the funding process for the dealership.

As previously described, the Credit Connection system will support lender specific contract data screens, and the system also has a generic screen to capture primary data for reporting purposes. The basic credit application format is the standard CBA (Consumer Bankers Association) application, however the application can be a full application, or a "quick" application, that is, an abbreviated application where a dealer enters just enough information to call a credit bureau. In contract validation, the dealer can be presented with lender specific contract information screens using the system according to the invention. In contract validation, the system will check the contract for incomplete fields and math errors, and then forward the contract to the associated lender. If the contract is approved, the system will send the dealer an indication of "funded" so that the dealer can confidently give the vehicle to the consumer, as just described.

Additional optional dealer functionality may be provided through the Credit Connection system. For example, links to third party vendors can be used to obtain vehicle registration at the relevant division of motor vehicles (DMV). In the case of a previously owned automobile, vehicle history could be obtained through the system. This could also be used to check trade-in vehicles, as can be imagined. Insurance and warranty functionality can also be provided through the Credit Connection system, through interfaces to the appropriate systems.

A Graphical User Interface (GUI) is provided in the enhanced Credit Connection system windows version (CCWIN). With the GUI, car pictures and bank logos, for example, may be displayed. A "folder metaphor" is also provided. For example, typically dealers keep files relating to their customers in a number of different physical folders containing different documents and information about the particular customer. These folders are stored in file cabinets requiring a great deal of physical space, as well as requiring tracking and filing systems and personnel. The GUI version displays a graphical depiction of a set of "folders" representing data stored on the system. The user points at a displayed folder tab to open-up the appropriate folder, allowing the user to view and modify the information electronically stored therein. This provides immediate access to the desired information from a central location without the costs and inefficiencies of physical paper folders.

The GUI version is also known as CCWIN which stands for Credit Connection for Windows (all rights reserved). The GUI version (CCWIN) functionality was modeled after the character product and, with some exceptions, the resultant functionality is the same as the character product, which was previously described in the co-pending related application. The GUI differs from the character version in that it provides icons for various functions, as will be described in detail below. The GUI version also uses the folder metaphor for processing an application. The metaphor implements electronically the concept of the "deal jacket" with folders and tabs. The deal jacket is a common term used by automobile dealerships for the physical folder containing all the relevant paperwork, forms, etc. Using the deal jacket metaphor, Credit Connection for Windows uses tabs which the user can point and click on as an information selection process. From any tab, a dealer can move to another piece of information contained in the deal jacket.

Figure 2A:
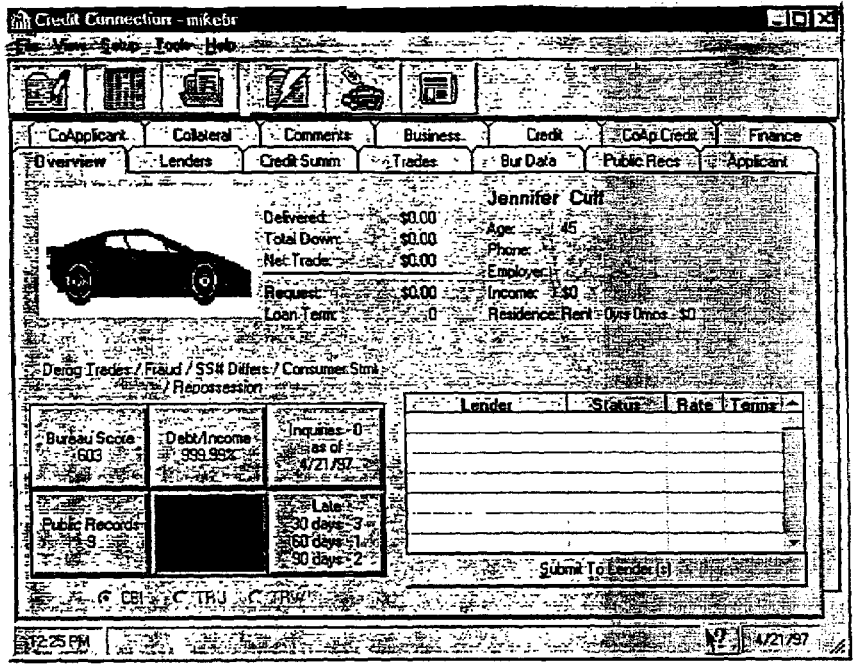
FIGS. 2A to 2N are exemplary graphical user interface deal jacket folder screens including exemplary icons according to an exemplary embodiment of the invention.

FIG. 2A illustrates an exemplary screen showing the deal jacket concept. In FIG. 2A, the "Overview" tab is selected and a screen of overview information is displayed. The other tabs visible include "Lenders", "Credit Summ" (for credit summary), "Trades", Bur Data" (for credit bureau data), "Public Recs" (for public records), and "Applicant" in the first row shown in FIG. 2A. In the second row shown in FIG. 2A, tabs visible include "CoApplicant", "Collateral", "Comments", "Business", "Credit", "CoAp Credit" (for co-applicant credit), and "Finance." The screen shown in FIG. 2A is for illustrative purposes only, and the personal data and dates displayed are purely fictional. Any resemblance to any person living or dead is purely unintentional and coincidental. One skilled in the art would recognize that other data could also be display, and that the data could be displayed in a variety of ways, within the spirit of the invention.

As illustrated, the selected tab word "Overview" is highlighted and the overview tab/folder is displayed "on top" of the set of folders making up the deal jacket. The GUI version uses many graphical representations, e.g., icons, which will now be covered in more detail below, for the selections of primary functions, etc., e.g., enter a new application. The overview screen gives a quick picture of all the components of a given deal. Displayed is applicant information, basic vehicle data, and a snapshot of the customer credit history with possible problems highlighted.

FIG. 2A shows some icons buttons just below the top of the screen. The icon on the far left, which looks like a folder with a writing implement extending up at an angle therefrom, stands for the function of creating a new application. If selected by "depressing" the icon button, i.e., placing the cursor on the icon button and clicking, a new application screen would be displayed, as will be described in more detail below.

The next icon moving to the right in FIG. 2A, represents an application list, and if selected, operates to display a screen with a list of applications, as will be described in more detail below.

The next icon to the right, which appears as an open folder, if selected would perform the function of opening the deal jacket. In FIG. 2A, this button is "depressed" and the deal jacket is displayed.

The next icon button over, which looks like a folder with a lightening bolt across it, stands for quick application, and if selected, would open a quick application screen. A quick application is described in the related co-pending application, and an example of a GUI quick application screen will be described in more detail later herein.

The next icon button over to the right looks like a vehicle with a price tag attached, and if depressed, would display automobile value guide information.

The next icon button over to the right looks like a newspaper and if selected would display news.

A fictional time and date "12:25 PM Apr. 21, 1997" is shown displayed at the bottom of the screen for illustrative purposes only, and in the actual system would display the current time and date to keep the user aware of the current time and date. Next to the date is a button with an arrow and a question mark. In use, this button would be clicked and then the cursor moved to an area of the screen where the user would click again, and as a result, additional information, e.g., detail or help information, about the selected area of the screen would be displayed.

Figure 2B:
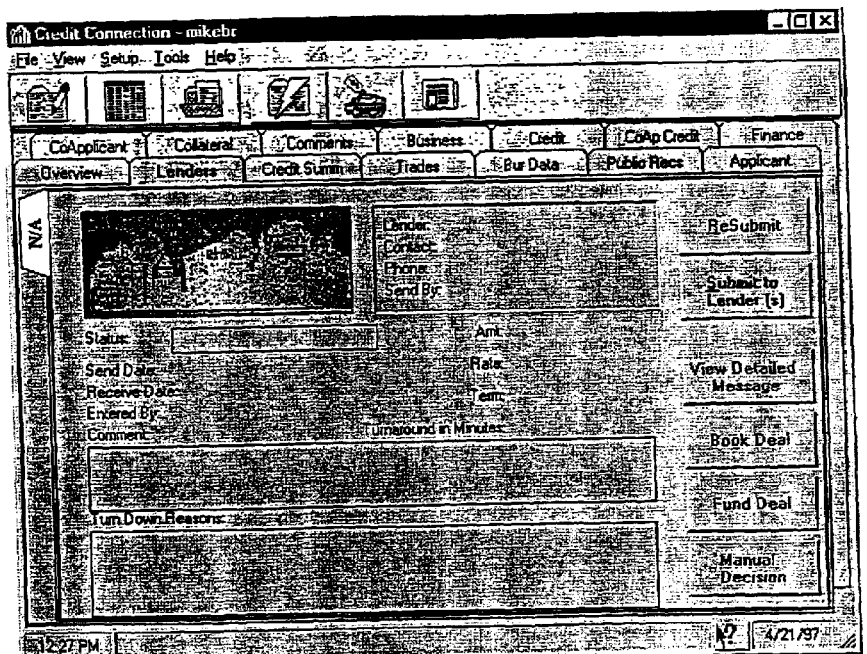

FIG. 2B illustrates the lender screen selected by clicking on the "Lenders" tab, according to an exemplary embodiment of the invention. Along the right edge of the screen are six exemplary function buttons which may be selected. In FIG. 2B, the "Submit to Lender(s)" button is selected, the underlined "S" indicating the control key letter alternative for selecting this function.

Figure 2C:
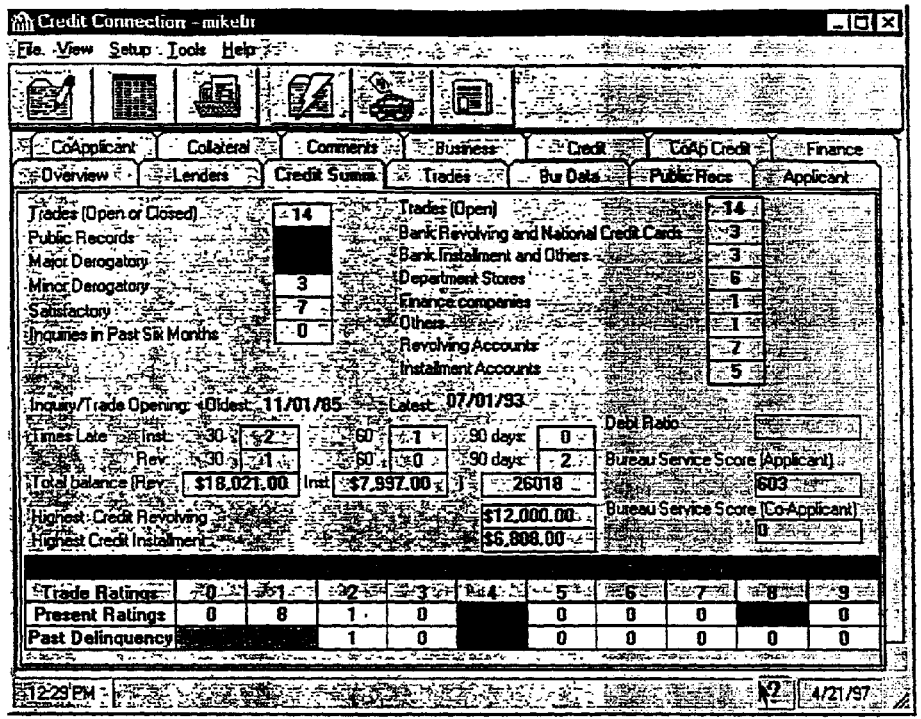

FIG. 2C shows the screen displayed when the "Credit Summ" tab is selected, according to an exemplary embodiment of the invention. The screen is a summary of credit bureau information associated with the applicant. Color highlighting is used to emphasize "derogatory" information at the bottom of the screen, such as "Past Delinquency." A variety of colors can be used to provide a color-coded snapshot of the customer credit history. This credit bureau summary screen gives a more in-depth picture of an applicant's credit status. Major and minor derogatory problems are color-coded for highlighting. All credit bureaus are displayed in a common format, automatically analyzing information like trade history, bureau score, and debt ratio. Once retrieved, the credit information is stored for later access so that there is no chance of losing printed credit reports or paying to retrieve the credit report from the bureau a second time. Further, bureau information is generally retrieved through the Credit Connection system in a matter of seconds due to the high-speed lines used to access the credit bureaus.

Figure 2D:
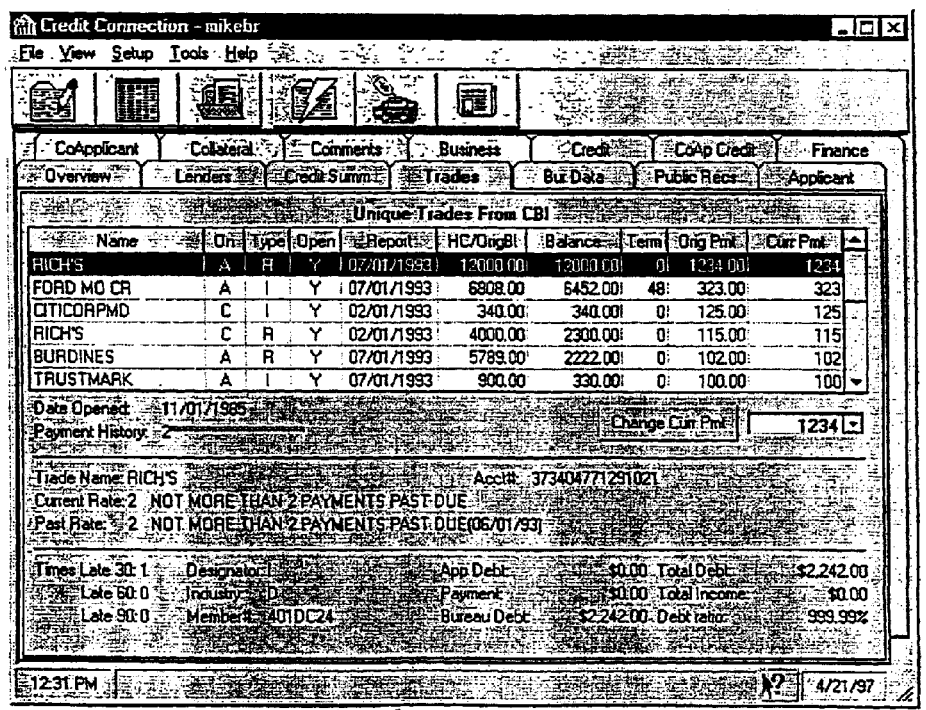

FIG. 2D shows the screen displayed when the "Trades" tab is selected, according to an exemplary embodiment of the invention. The screen presented is a tabular list of "Unique Trades From CBI." CBI is a credit bureau, and the credit bureau report information is formatted on the screen in a user friendly fashion for evaluation with the consumer. Again, the screen is representative and not meant to be limiting of the invention defined in the claims, in that numerous variations are possible within the spirit of the invention.

Figures 2E, 2F:
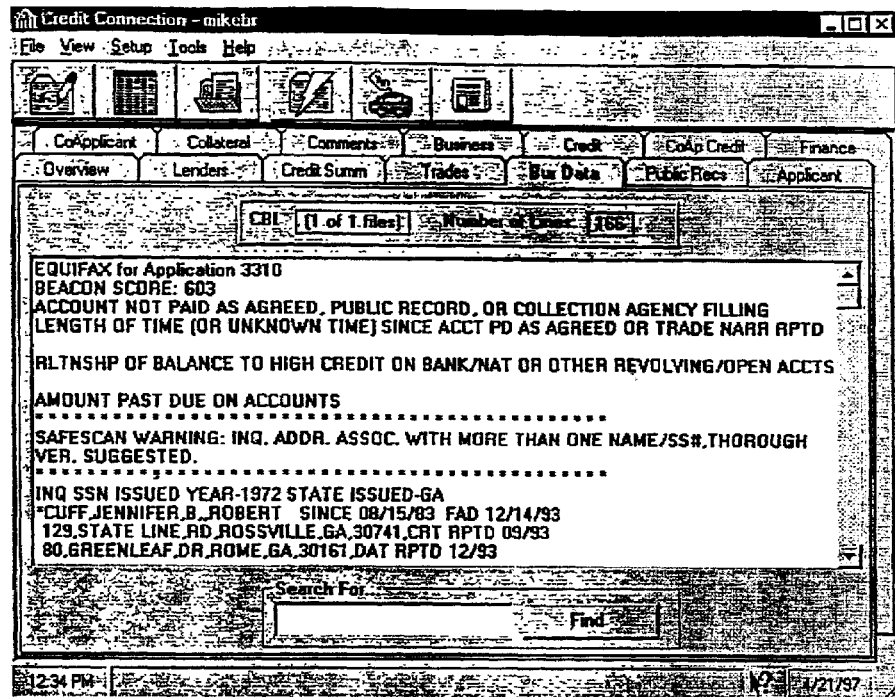

FIG. 2E shows the screen displayed when the "Bur Data" tab is selected, according to an exemplary embodiment of the invention. The raw credit report format provided by the credit bureau, the "Bureau Data," is displayed in the window, and at the bottom, text searching through the credit report is implemented with the "Search For . . . " Box and the "Find" button.

FIG. 2F shows the screen displayed when the "Public Recs" (public records) tab is selected, according to an exemplary embodiment of the invention. These public records relate to tax liens, and the like.

Figure 2G:
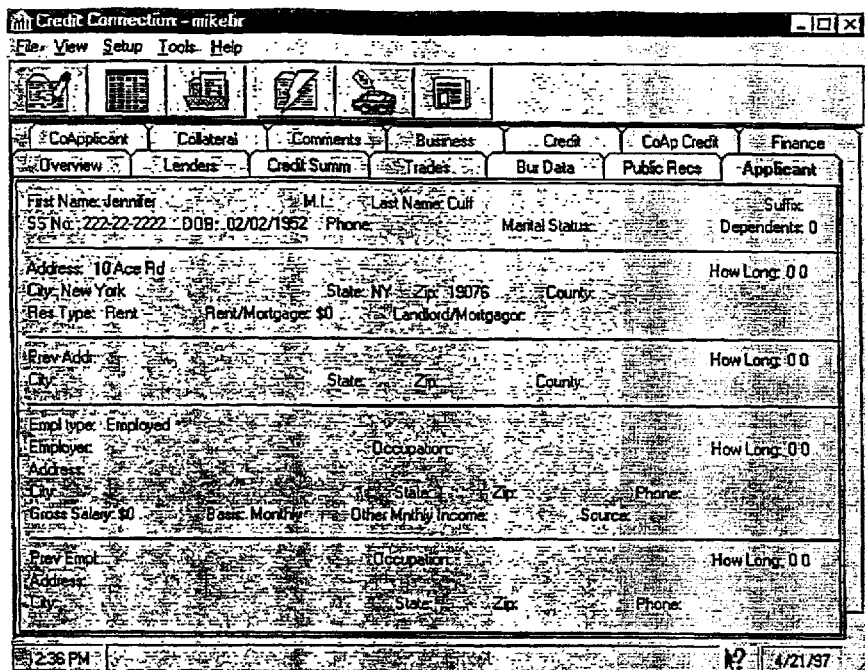

FIG. 2G shows the screen displayed when the "Applicant" tab is selected, according to an exemplary embodiment of the invention. This tab selects a screen of applicant data, such as is shown.

Figure 2H:
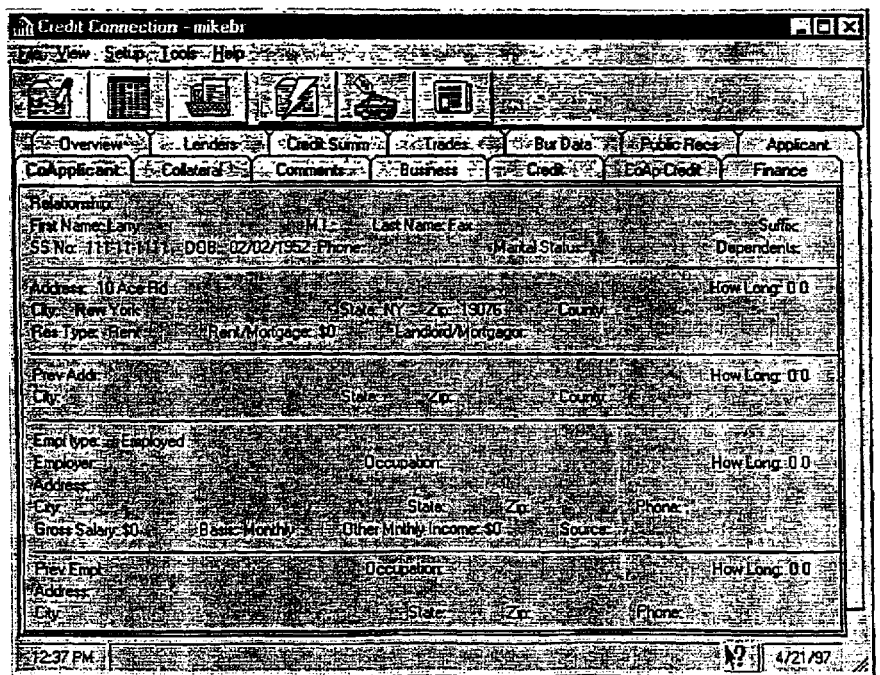

FIG. 2H shows the screen displayed when the "CoApplicant" tab is selected, according to an exemplary embodiment of the invention. This tab selects a screen of co-applicant data, such as is shown. If there is no co-applicant connected with the deal in question, the "CoApplicant" tab would not be displayed.

Figure 2I:
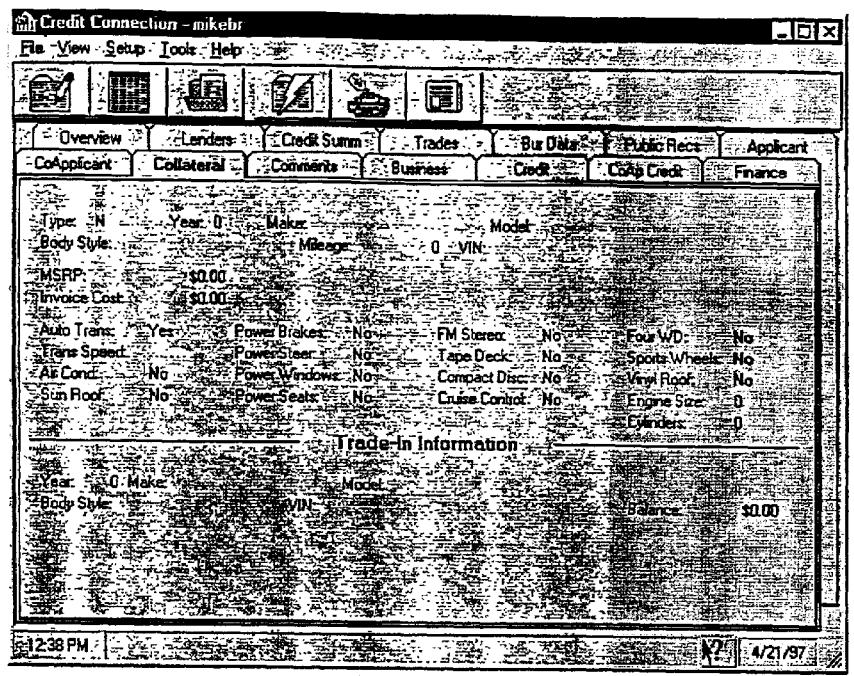

FIG. 2I shows the screen displayed when the "Collateral" tab is selected, according to an exemplary embodiment of the invention. This screen displays collateral connected with the deal.

Figure 2J:
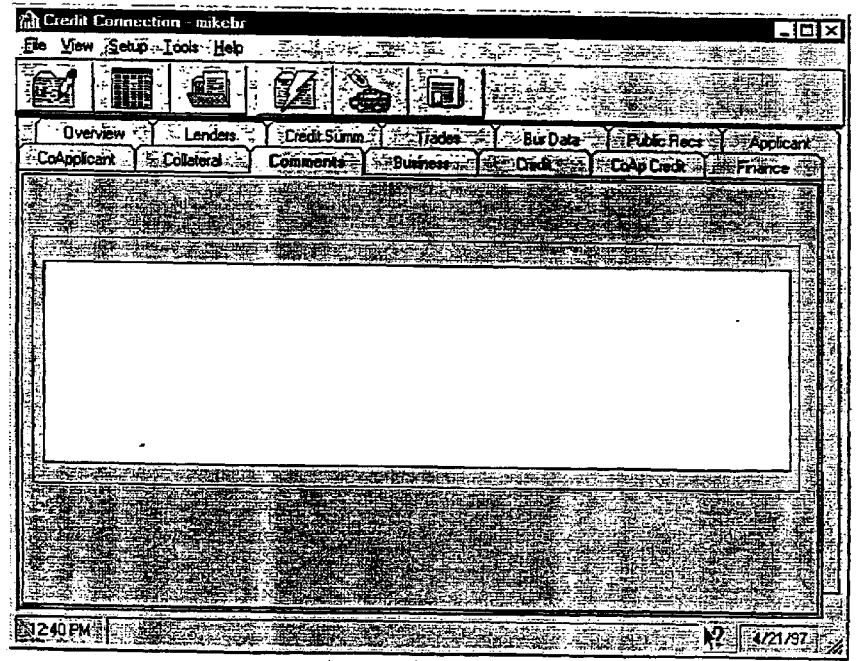

FIG. 2J shows the screen displayed when the "Comments" tab is selected, according to an exemplary embodiment of the invention. In the displayed window in this figure, there are no comments displayed. However, if there were additional comments connected with the deal, they would be viewable here.

Figures 2K, 2L:
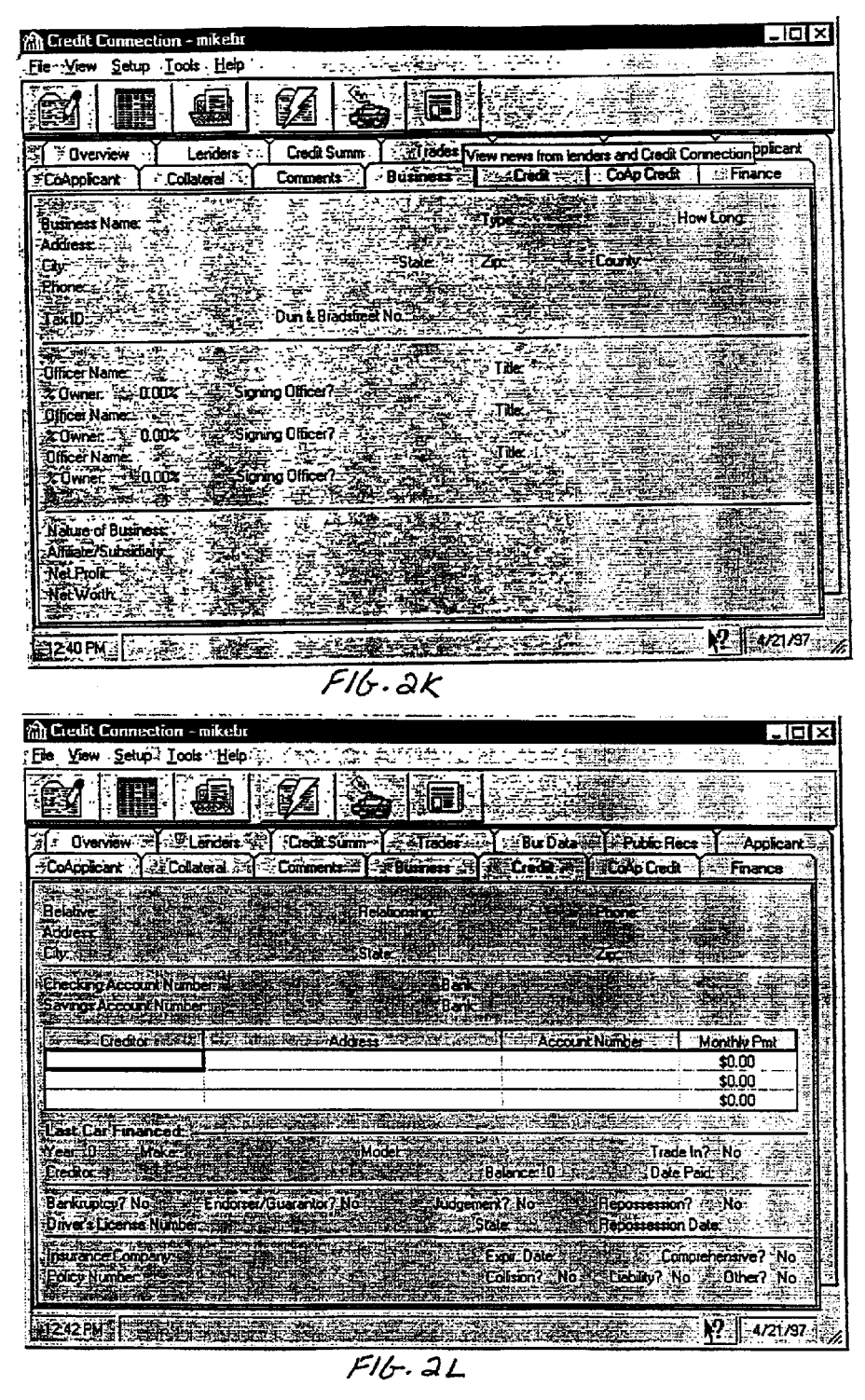

FIG. 2K shows the screen displayed when the "Business" tab is selected, according to an exemplary embodiment of the invention. This tab would only be displayed on the deal jacket if the associated application is a business application. The screen displayed when the tab is selected would have various business related information presented in the format shown.

FIG. 2L shows the screen displayed when the "Credit" tab is selected, according to an exemplary embodiment of the invention. Here credit information would be displayed associated with the deal.

Figures 2M, 2N:
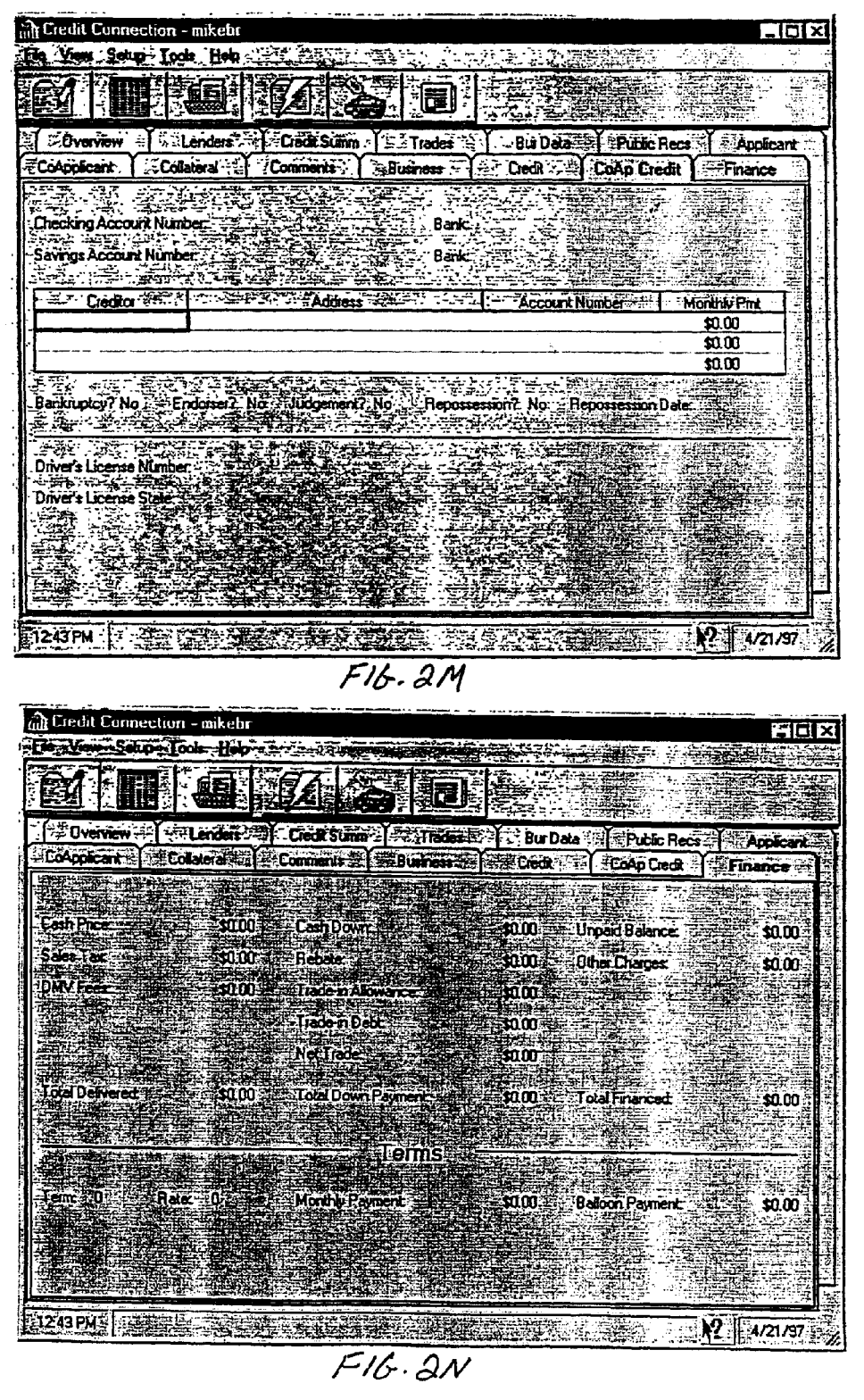

FIG. 2M shows the screen displayed when the "CoAp Credit" (co-applicant credit) tab is selected, according to an exemplary embodiment of the invention. This tab would not be displayed if there were no co-applicant associated with the deal. The screen is similar to the screen displayed when the "Credit" tab is selected, except that it is for displaying the co-applicant credit information.

FIG. 2N shows the screen displayed when the "Finance" tab is selected, according to an exemplary embodiment of the invention. This screen shows the finance information associated with the deal in question.

FIGS. 2A to 2N illustrate a representative deal jacket display on the GUI according to an embodiment of the invention. It should be remembered, however, that these figures and description are presented for illustrative purposes only.

With the GUI, bank logos can be used in the lender screen (see FIG. 2B), for example, so that when a dealer is viewing decisions from each of the lenders, they see a representation of the lender bank logo. The GUI may also use a car picture in the application overview screen (see FIG. 2A), for example, to illustrate the collateral a customer may be purchasing.

Further examples of the various screens provided in an exemplary embodiment of the invention are shown in FIGS. 3A to 3K and will now be described.

Figure 3A:
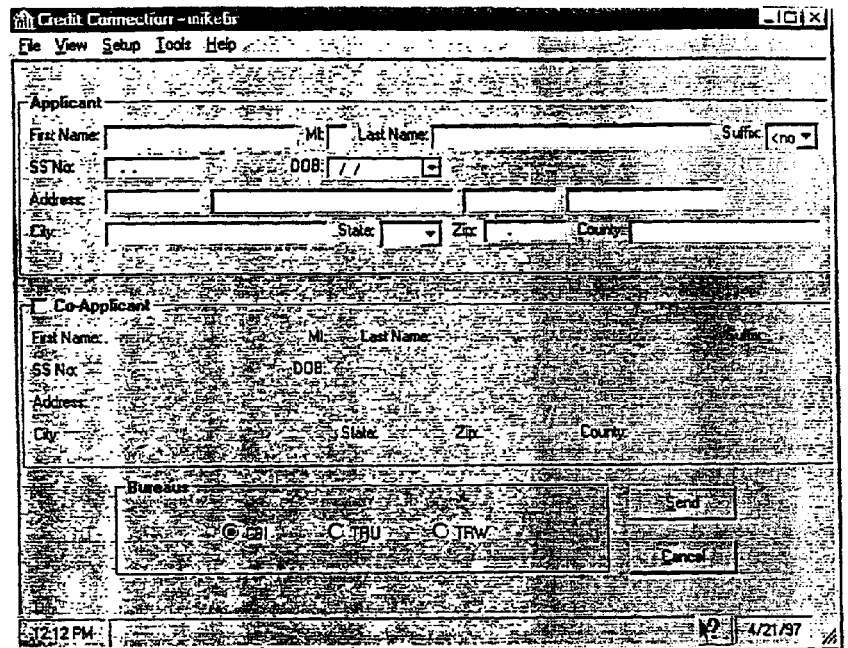

FIG. 3A shows a quick application screen selected when the quick application icon button is depressed in accordance with an embodiment of the invention. On this screen is displayed fields to enter quick application data.

Figure 3B:
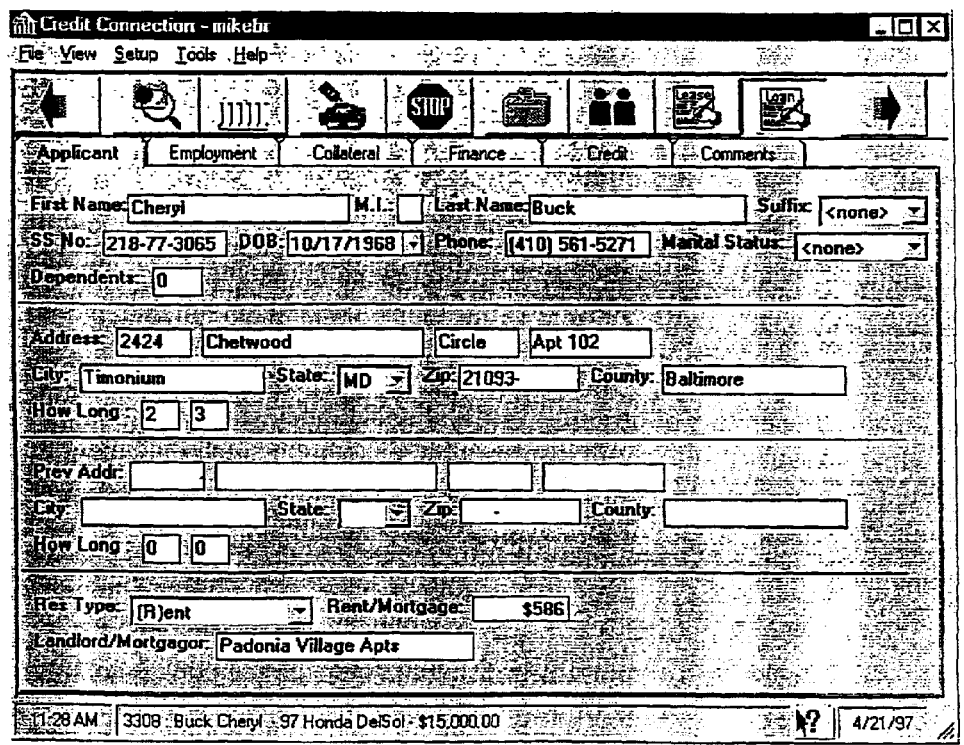

FIG. 3B shows an applicant entry screen selected when the create new application icon button is depressed (the applicant tab is shown selected) in accordance with an embodiment of the invention. On this screen is displayed a screen of fields for entering applicant information. At the top of the screen, some additional icon buttons beyond those already described are displayed, and these will be explained first.

The button on the far left is an arrow pointing to the left which, if depressed, would shift the line of icon buttons to the right so that any icon buttons to the left of those shown are shifted into view. A corresponding arrow is also provided on the far right to shift the icons in the opposite direction.

Next to the left pointing arrow is an icon button which looks like a master card being examined with a magnifying glass. This button selects a call credit bureau function from within the application being entered.

The icon next to the call credit bureau icon looks like the Federal Reserve building, and if selected, starts a send (the current application) to lender function.

The vehicle with price tag icon has already been described. To the right of that icon is a stop sign icon button which has the function of halting the current operation, i.e., the entry of the application data. Data already entered will be saved for future use.

The icon button that looks like a briefcase, when selected, would make the application a business application, and the related screens required for such an application would be available through tab selection.

The next icon button shows two people side by side and if selected, indicates the application is a joint application. If selected, applicant and co-applicant tabs/screens would be available for selection.

The next icon button indicates the application is for a lease, and the one to the right of that one indicates the application is for a loan. When one of these two icon buttons is depressed, the other is automatically un-depressed.

As mentioned, FIG. 3B shows an applicant screen for entry of applicant data in accordance with an embodiment of the invention. The "Loan" icon button is selected for entering loan application data. The additional tabs associated with data entry screens are also shown and these will now be described.

Figures 3C, 3D:
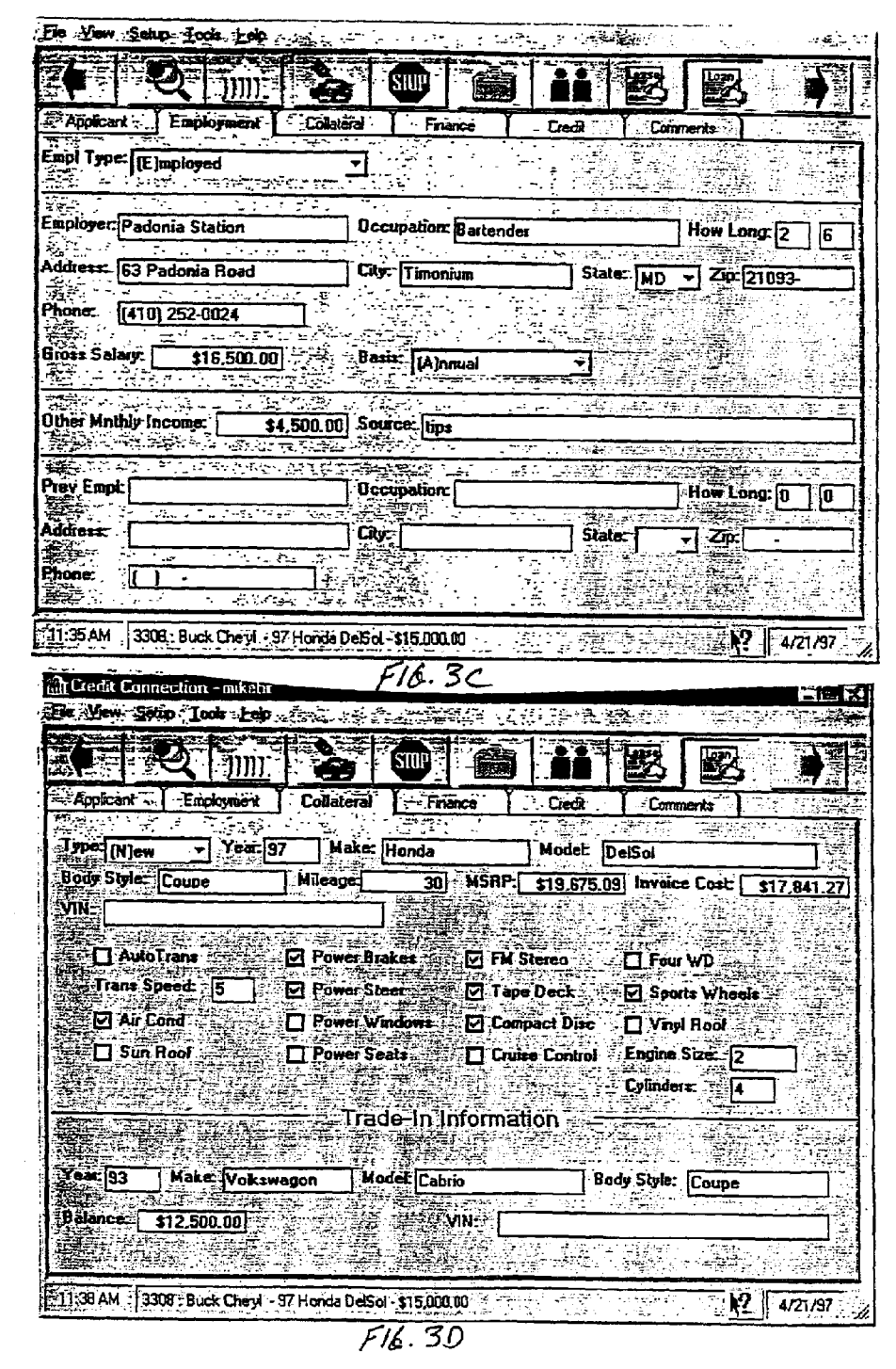

FIG. 3C shows an employment information entry screen selected when the "Employment" tab is selected in accordance with an embodiment of the invention. On this screen are displayed fields for entry of employment and income data.

FIG. 3D shows a collateral screen selected when the "Collateral" tab is selected in accordance with an embodiment of the invention. On this screen are displayed fields for entering collateral associated with the application.

Figures 3E, 3F:
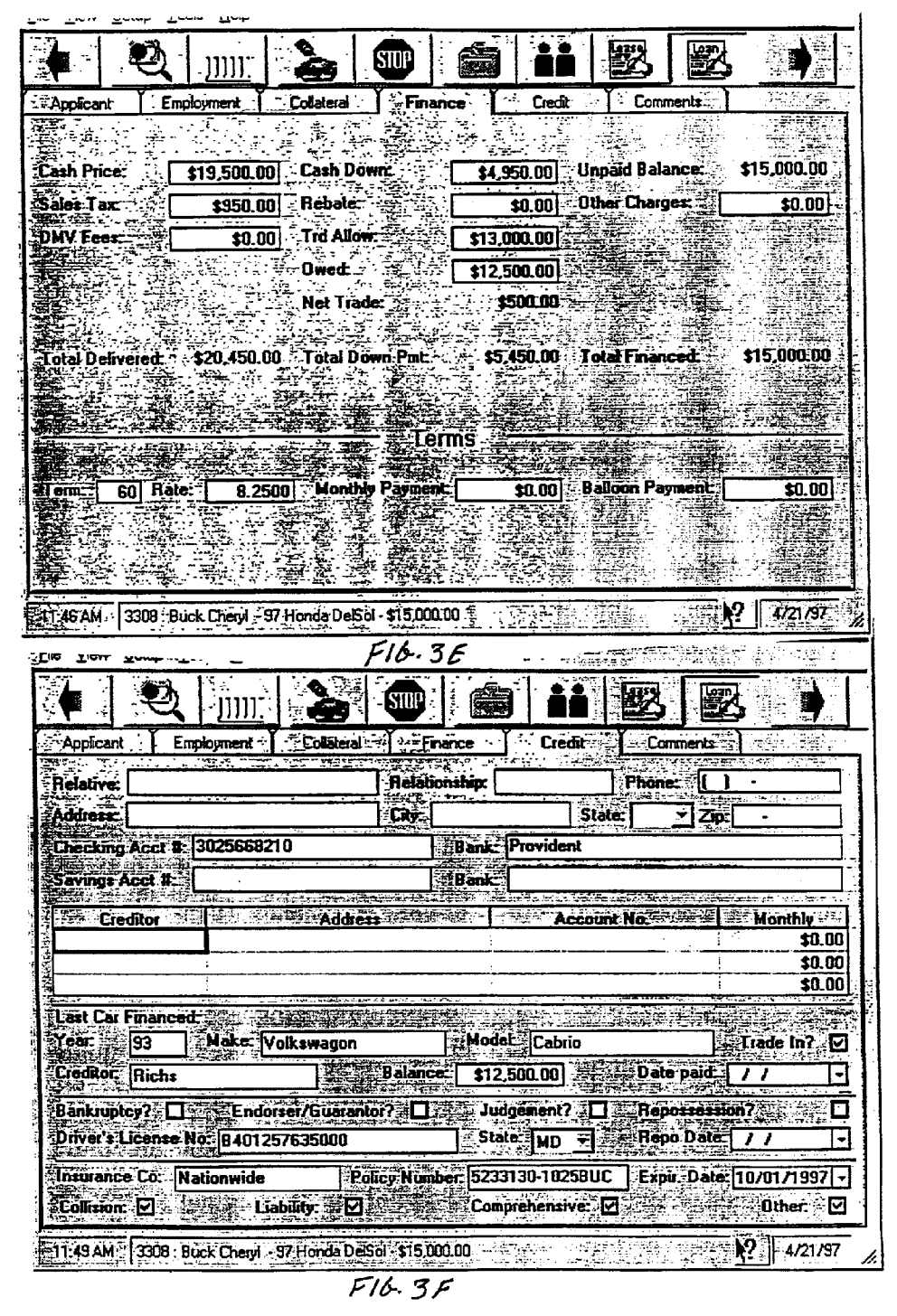

FIG. 3E shows a finance entry screen selected when the "Finance" tab is selected in accordance with an embodiment of the invention. On this screen are displayed fields for entering financial data connected to the loan application.

FIG. 3F shows a credit information entry screen selected when the "Credit" tab is selected in accordance with an embodiment of the invention. On this screen are displayed fields for entry of credit information for the applicant applying for a loan.

Figures 3G, 3H:
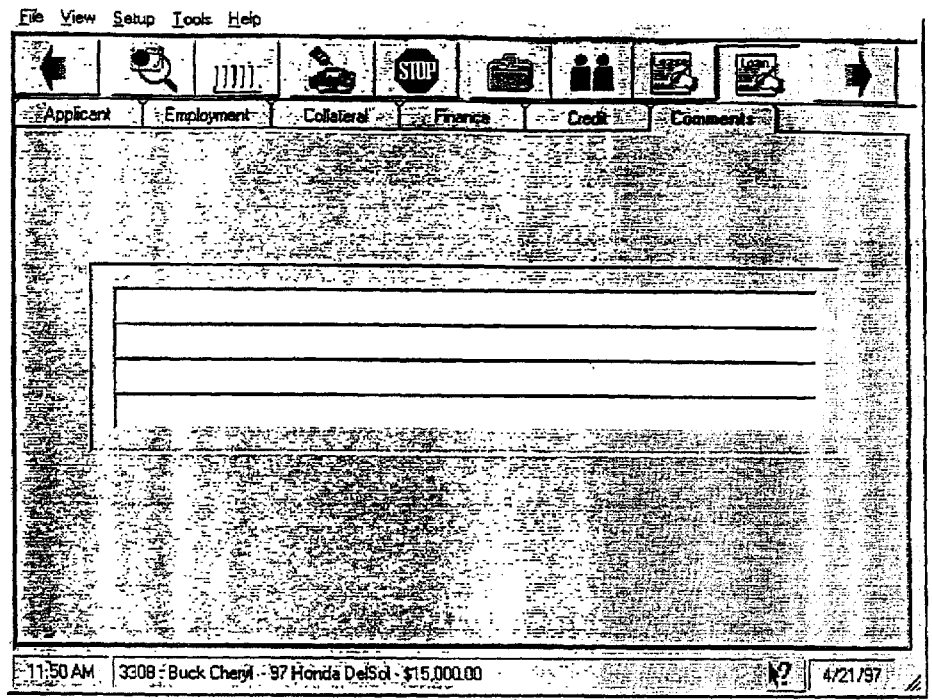

FIG. 3G shows a comments entry screen selected when the "Comments" tabs is selected in accordance with an embodiment of the invention. On this screen is displayed a lined window in which to enter comments about the associated applicant/loan.

In FIG. 3H, the "Lease" icon button is shown depressed, and therefore, a lease tab is shown selected. The applicant, employment and collateral tabs/screens, as well as the credit and comments screens for a lease are the same as for a loan. When this tab is selected, a screen for lease information is displayed in accordance with an embodiment of the invention. On this screen are displayed fields for entering lease information. This essentially takes the place of the finance screen used with the loan application entry, described above.

Figures 3I, 3J:
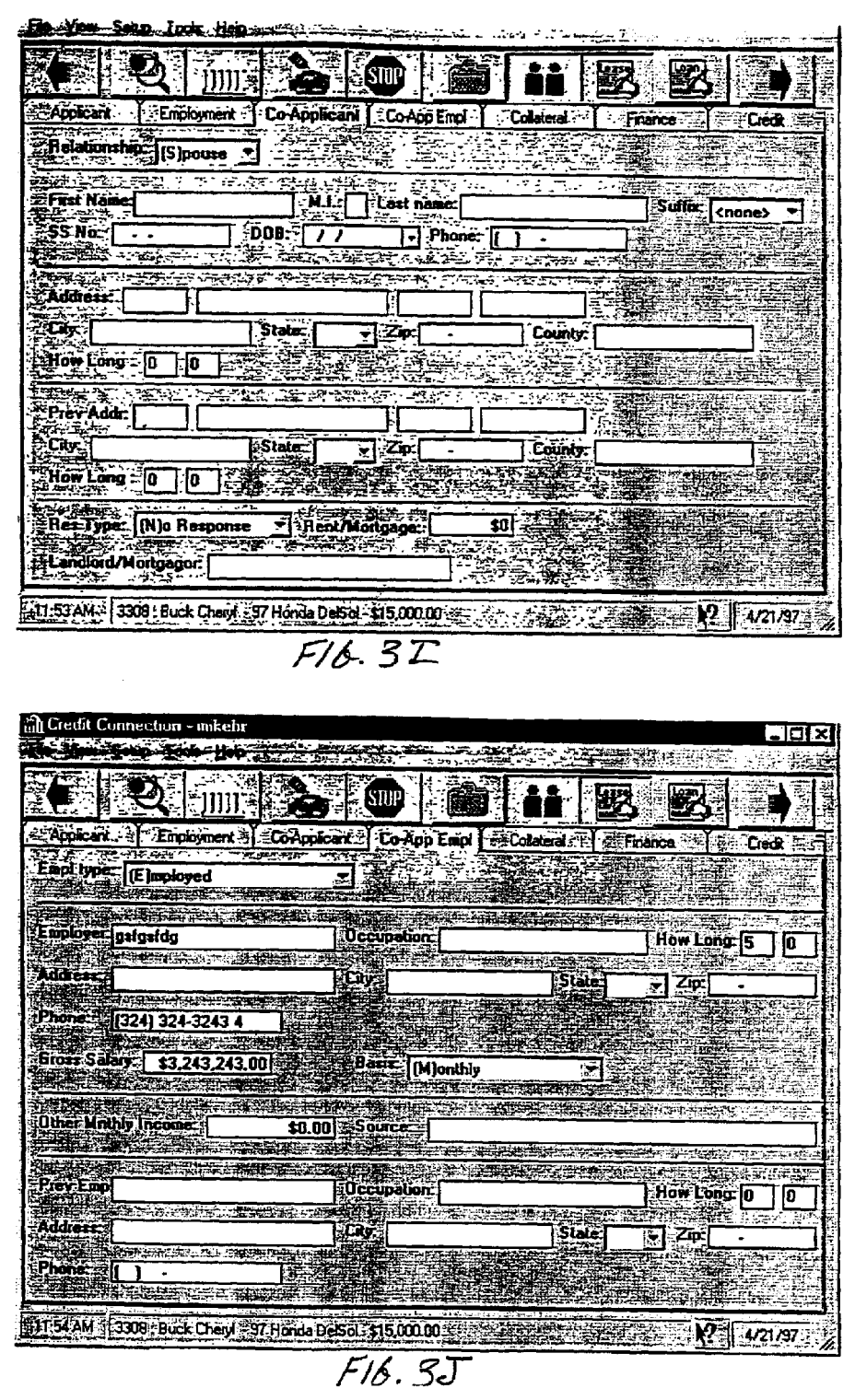

FIG. 3I shows a co-applicant entry screen selected when the co-applicant icon button is depressed in accordance with an embodiment of the invention. On this screen are displayed fields for entry of co-applicant data. In FIG. 3I, the lease icon button is shown depressed, however, the co-applicant screen would be the same if the loan icon button were depressed. Near the top of the screen, on the left, a relationship selection arrow (down-arrow) is provided allowing easy selection of the appropriate relationship, i.e., spouse, parent, child, grand-parent, etc.

FIG. 3J shows a co-applicant employment entry screen selected when the associated "Co-App Empl" tab is selected in accordance with an embodiment of the invention. On this screen are displayed fields for entering co-applicant employment data, if applicable.

Figure 3K:

FIG. 3K shows a co-applicant credit information entry screen selected when the associated "Co-App Cred" tab is selected in accordance with an embodiment of the invention. On this screen are displayed fields for applicable credit data entry. A number of setup screens are used to setup information about a particular installation of the GUI system according to the invention, and some representative screens related to setup and other administrative matters are shown in FIGS. 4A to 4F and will now be described.

Figure 4A:

FIG. 4A shows a dealer setup screen selected in accordance with an embodiment of the invention. On this screen is displayed deal setup information, including fields for first, second, and third lenders.

Figure 4B:
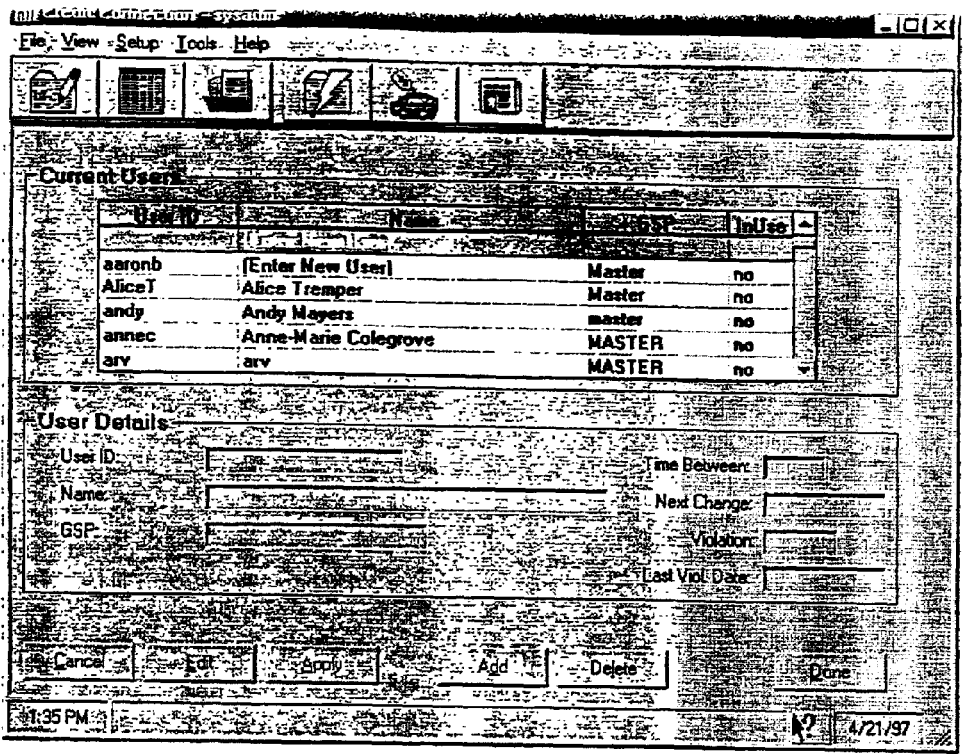

FIG. 4B shows a user setup screen selected in accordance with an embodiment of the invention. On this screen are displayed fields for entering users of the system.

Figure 4C:
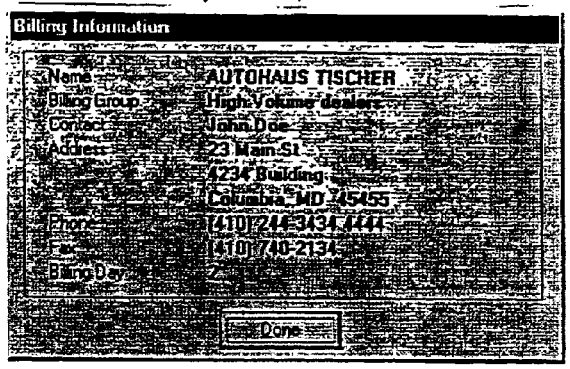

FIG. 4C shows a billing information summary screen selected in accordance with an embodiment of the invention. On this screen is displayed a summary of the billing information for a particular dealer.

FIG. 4D shows a regular charges screen selected in accordance with an embodiment of the invention. On this screen is displayed information associated with charges in connection with use of the system.

FIG. 4E shows a discount information screen selected in accordance with an embodiment of the invention. On this screen is displayed information associated with discounted services in connection with use of the system.

Figures 4F, 5A:
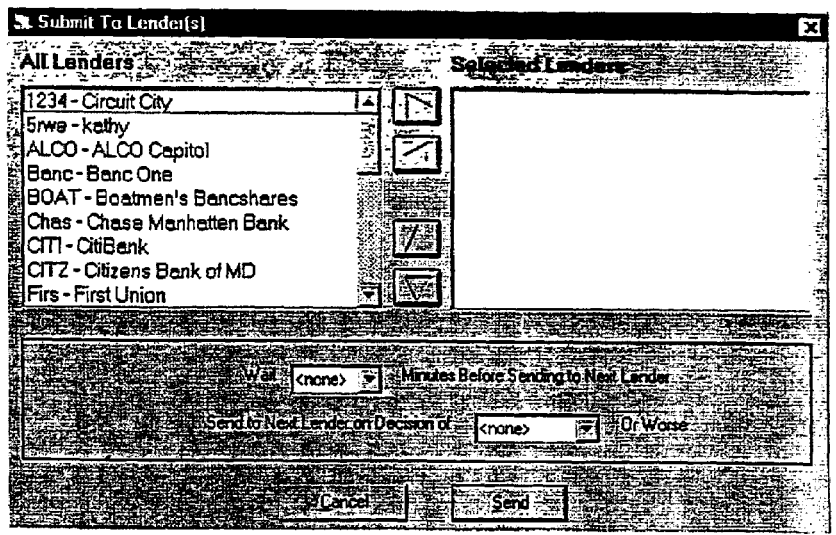

FIG. 4F is a screen showing a display of a list of transactions for a current period.

As mentioned earlier, an icon button is available for sending a application to a lender. FIG. 5A shows a submit to lenders entry screen by which one or more lenders from a list of all lenders can be selected. This selection would typically be made once at login, and not each time an application is submitted to the lender(s).

Figure 5B:
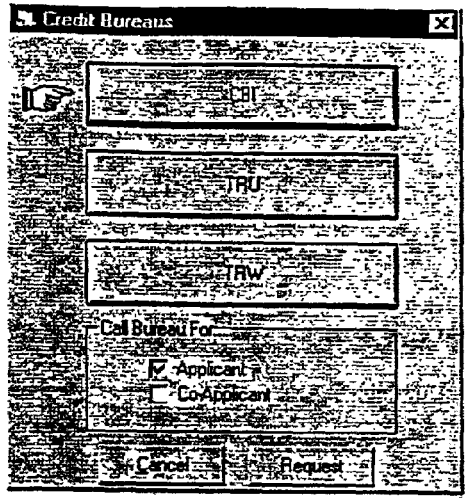

FIG. 5B illustrates a credit bureaus entry screen in which a bureau to call can be selected for the applicant/co-applicant or both.

Figure 5C:
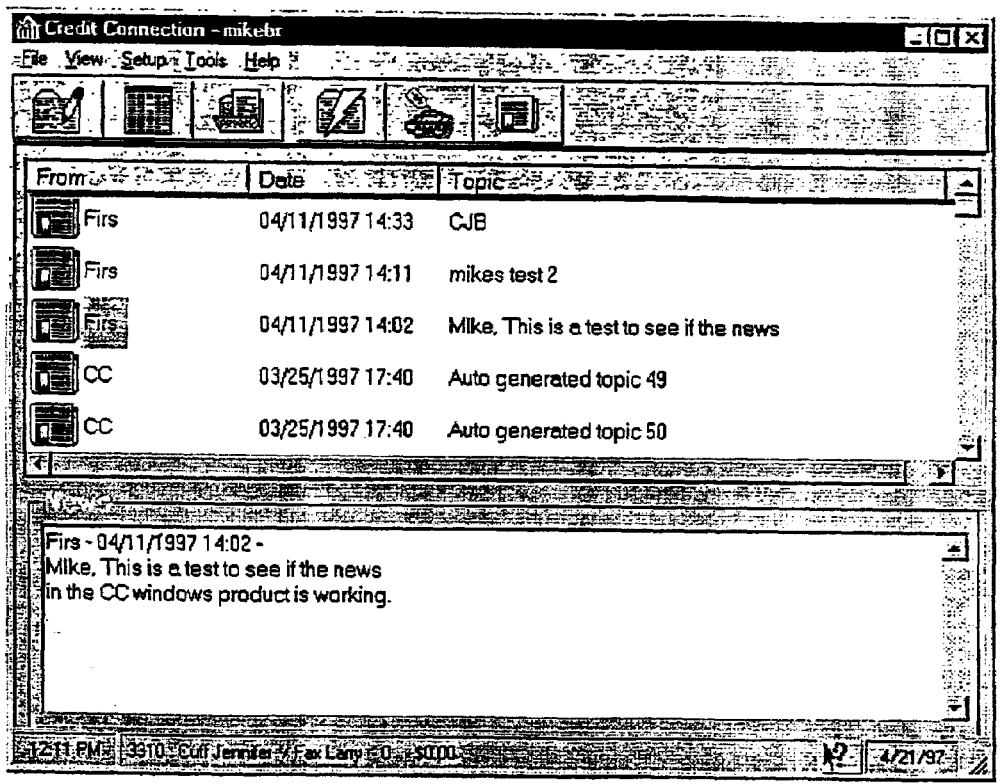

FIG. 5C illustrates a news screen by which news can be entered into the system, displayed and edited news item by news item.

Figure 6:
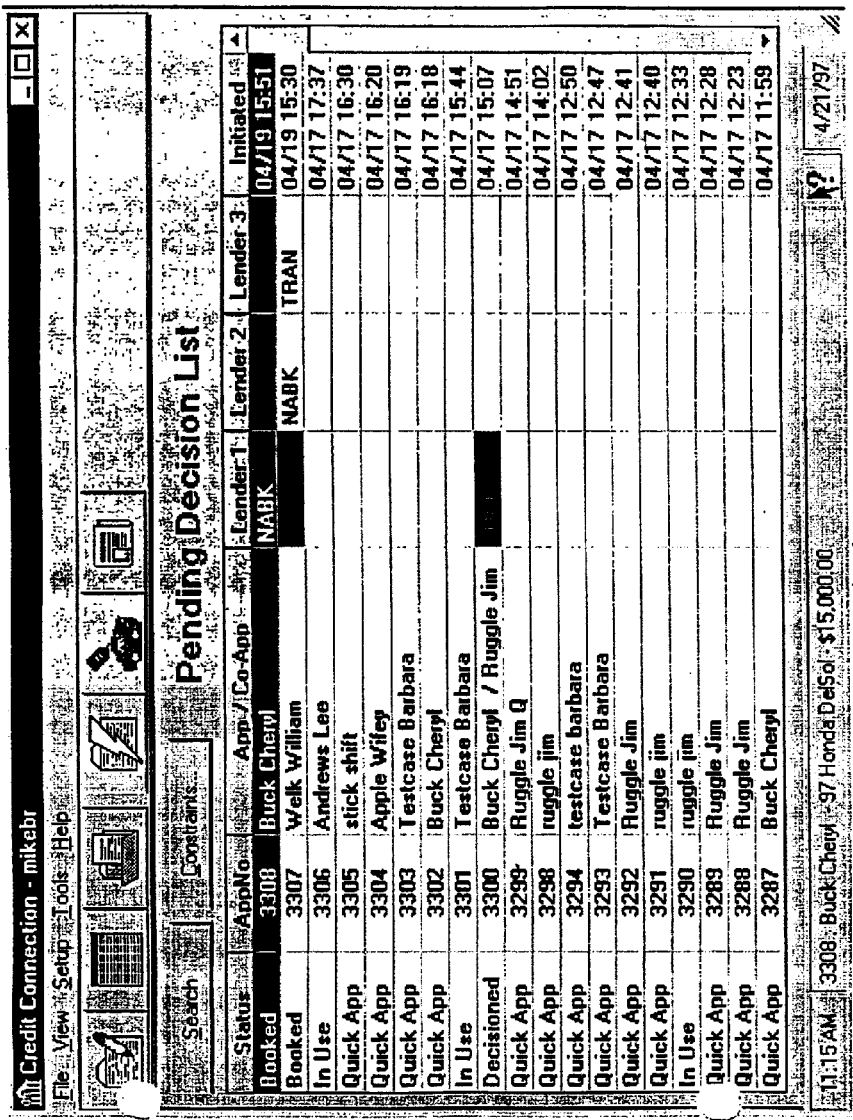
FIG. 6 is an exemplary graphical user interface pending decision list screen according to an exemplary embodiment of the invention.

FIG. 6 illustrates a decision list screen in which pending decisions are listed. The list is fully searchable according to specified parameters (constraints).

Figure 8A:
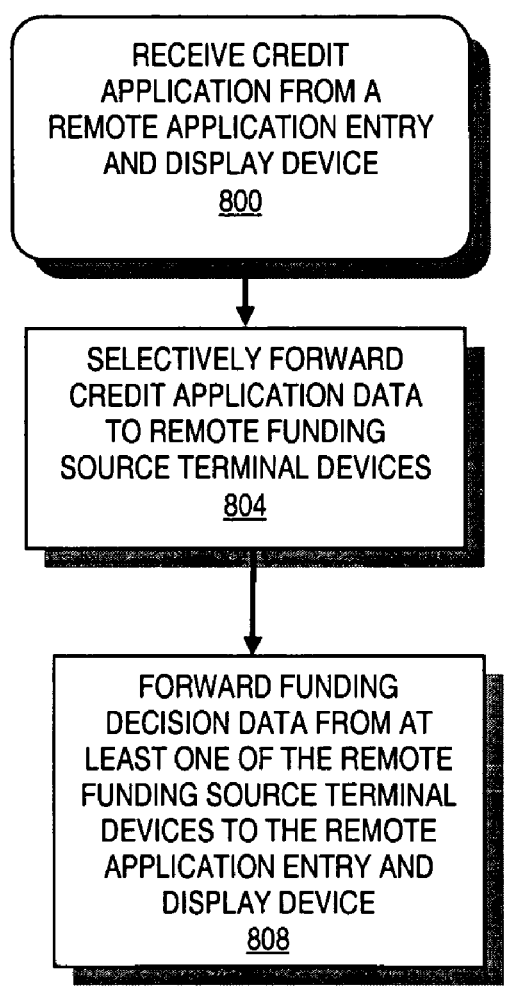
FIG. 8A is a flowchart illustrating the steps involved in managing a credit application.
Figure 8B:
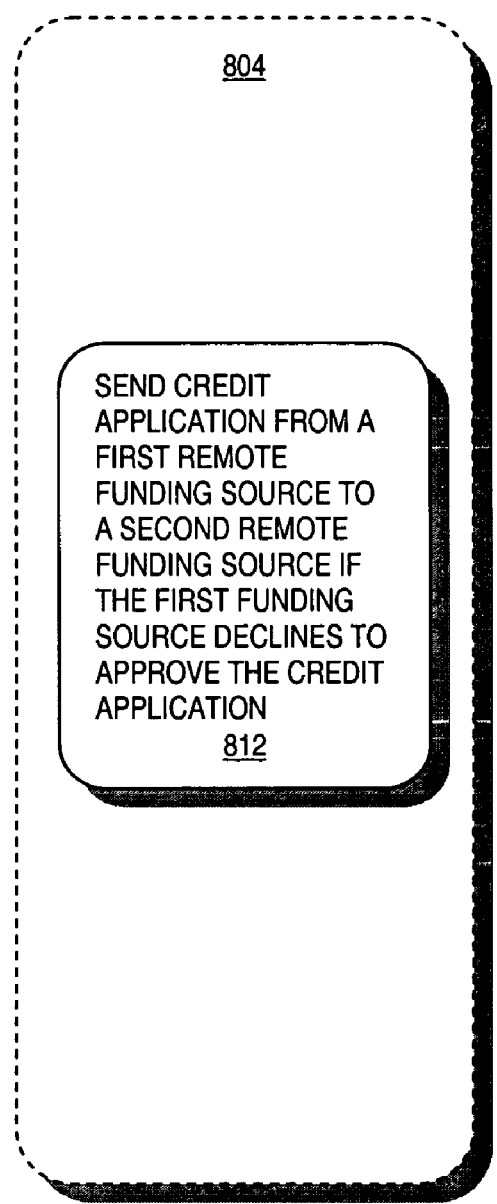
FIG. 8B illustrates one embodiment of selectively forwarding credit application data to remote funding source terminal devices as depicted in FIG. 8A.

FIG. 8A is a flowchart illustrating the steps involved in managing a credit application, and FIG. 8B illustrates one embodiment of selectively forwarding credit application data to remote funding source terminal devices as depicted in FIG. 8A.

As mentioned above, various icons and icon button are used with the GUI (CCWIN) system in order to select a desired function or display. The ornamental design of these icons is the subject of a number of co-pending design patent applications. Some icons are also used to indicate that an operation is taking place. For example, shown in FIG. 7 is a series of sixteen icons (A–P) forming an animation. In the animation, the two C's change shape and position in front of the lender icon (the Federal Reserve Bank) indicating that a lender is being contacted through the Credit Connection system. Other icon series are possible within the spirit of the invention.

Enhanced mega-dealer reporting is provided. Mega-dealers are dealers that have multiple dealerships. The system previously disclosed in the co-pending application can aggregate the data from all of the mega-dealer dealerships into consolidated reports, giving them statistics based on all their dealerships. This gives the capability for a large dealership group to view reports, for example, turnaround and lender lookup, from a dealership level or a group level, for example. The dealer may select to see reports on an individual store, or all of their stores at one time. This allows large dealerships to better manage relationships with lenders from a corporate level, not only a store level. The Credit Connection system is unique in the fact that it is the only service provider capable of producing reports at a multi-store level. In the enhanced system, these reports have been enhanced for better graphics, layout, format, display, and the like, in accordance with the GUI capabilities.

The so-called "AutoFinance" feature allows a user connected to a dealer web site 114 (see FIG. 1), e.g., an AutoConnect web site, to apply for a loan with any lender 108 which subscribes to the web site 114. With this AutoFinance web site feature, the system is able to provide a closed loop credit decision process for a consumer at a web site 114 the Internet. This feature provides an application process where consumers apply for credit through the dealership web site 114 (e.g., AutoConnect) for financing for a vehicle. After filling out an application screen at the web site 114, the consumer is then provided a response electronically at the web site 114, and/or through e-mail, as to the disposition of their credit application. Should the decision not be returned immediately, AutoFinance has a "review status" page on the web site 114 where a consumer may enter a password to learn the disposition of their application.

From a processing perspective, the application from the web site 114 is routed through the Credit Connection system to a lender 108 with the information about the consumer along with information about the dealer web site 114 from where the consumer application originated. The application is loaded into the lender credit processing (decisioning) system, e.g., Credit Revue, which subsequently reaches a decision. The decision is then sent back to the consumer at the web site 114 with the proper disclosures. A decision is also sent to the dealer 106 about the consumer. This decision could be faxed to a dealer 106 or stored in the Credit Connection system host 102 as a lead from where the dealer 106 may view on-line data about the deal. The Credit Connection system will also generated a lead for the dealer 106 if the consumer decides to opt-out of the application process at any point before completion.

There are two types of leads: Incomplete (the consumer did not complete the application process) and Complete. Leads are provided when a user shops for an automobile through the web site 114, e.g., AutoConnect, and looks up a vehicle on a dealer web site. The system provides the dealer 106 with the name and phone number of the browser/user so that the dealer 106 can follow up on the lead. Of course, the dealer web site could have a link to a lender web site at which the credit application could be entered into the Credit Connection system.

Integration of the Credit Connection system with in-house dealer Finance and Insurance (F&I) systems, e.g., from ADP or UCS, is also provided according to an embodiment of the invention. Elite is the name of ADP's F&I software that is used within a number of automobile dealerships. To eliminate the need for duplicate data entry in each system, a particular interface and functionality was developed that allows the dealers 106 to originate an application on their in-house software and load it to the Credit Connection system host 102. Dealers 106 can then "toggle" over to the Credit Connection system where the Credit Connection application screen is then available to the user. In the case of Elite users, technically the application is routed from within the dealership to ADP's mainframe in Ann Arbor Mich., however this path is not illustrated for the sake of simplicity.

The ADP mainframe then communicates through an interfacing system (a gateway computer) to the Credit Connection system host 102. In the process, the information from ADP's system is converted into a form useable by Credit Connection. The integration provides a stream of data from ADP to the Credit Connection system. A two-way sharing of data is also possible, that is, from Credit Connection to the ADP system, through a reverse conversion process, as would be apparent to one skilled in the art. (The same data sharing would apply to other in-house F&I software systems.) The implementation provides for the loading of application data, and can accommodate other data as well. The integration works with both the CCWIN and the character based Credit Connection systems.

The Credit Connection system provides the ability to perform what-if calculations, including a manipulation of a consumer's debt ratio. Manipulation of debt ratio allows dealers to modify consumer data to "work with" consumer debt, car price, loan amount, etc., to help the consumer qualify for a loan. The Credit Connection system has the ability to identify all the unique trades associated with a credit bureau report (see trades folder of FIG. 2D). In the screens that present individual trade lines are displayed debt ratio calculations, providing the dealers the capability to change a current payment amount ("Change Curr Pmt") to determine what the new debt ratio will be. Dealers are not actually manipulating bureau data and this is just a "what-if" scenario. Other similar what-if manipulations of consumer data are possible within the spirit and scope of the invention, as would be readily apparent to one skilled in the art. For example, the loan to value ratio on the vehicle being sold can be checked against different lenders' criteria and policies.

Automatic software updating is provided in the CCWIN version. Each time a dealer, for example, using the system connects to the host, by means of the Internet, for example, this being the method of communication for dealers using the Windows product (CCWIN), the host checks to make sure that the dealer is using the most recent version of the Credit Connection software. If not, the host automatically sends a program to the dealer to automatically update the software. Since the executable code for the Windows product resides locally at each remote installation, i.e., remote from the Credit Connection host, new software must be periodically downloaded to dealers running the Windows product to keep their software up to date. Therefore, when a customer logs into the Credit Connection system (CCWIN) application, it checks the version of software they are running. If that version is different from the current version of the application, the user will then be asked to update their software, and the download of the new version will be initiated for the dealer.

A dedicated front end lender gateway CPU is provided. This is the CPU that is placed at a lender site on which data conversion software for interfacing with the Credit Connection system resides. The gateway CPU may be connected to the Credit Connection host by a dedicated telecommunications line, e.g., Sprint. Data passes from the Credit Connection host 102 through the line to the gateway CPU and is processed by the software so as to be converted into a format which the lender credit processing system recognizes. In this way, Credit Connection data is transported to the lender system. It also receives data back from the lender system, converts it into a format that Credit Connection recognizes and sends it back to the host 102. This gateway computer (CPU) would typically be an HP computer system running the UNIX operating system. However, depending on system requirements and user preferences, other commercially available computer systems could readily be used as would be apparent to one skilled in the art.

The GUI aspect of the invention is primarily contemplated to be most useful to the automobile dealers or other sales facilities in the system. However, the scope of the invention defined by the claims is not intended to be so limited.

It will be apparent to one of ordinary skill in the art that the manner of making and using the claimed invention has been adequately disclosed in the above-written description of the preferred embodiments taken together with the drawings.

It will be understood that the above description of the preferred embodiments of the present invention is susceptible to various modifications, changes, and adaptations, and the same are intended to be comprehended within the meaning and range of equivalents of the appended claims.

The present invention has been described with reference to auto dealers, however as would be readily appreciated by one skilled in the art, the invention is applicable to non-automotive customers.

What is claimed is:

1. A computer aided method of managing a credit application, the method comprising the steps of:
   receiving credit application data from a remote application entry and display device;
   selectively forwarding the credit application data to remote funding source terminal devices;
   forwarding funding decision data from at least one of the remote funding source terminal devices to the remote application entry and display device;
   wherein the selectively forwarding the credit application data step further comprises:
   sending at least a portion of a credit application to more than one of said remote funding sources substantially at the same time;

sending at least a portion of a credit application to more than one of said remote funding sources sequentially until a finding source returns a positive funding decision;

sending at least a portion of a credit application to a first one of said remote funding sources, and then, after a predetermined time, sending to at least one other remote funding source, until one of the finding sources returns a positive funding decision or until all funding sources have been exhausted; or;

sending the credit application from a first remote funding source to a second remote finding source if the first funding source declines to approve the credit application.

2. The method according to claim 1, wherein the remote application entry and display device includes a data entry terminal for manual entry of the credit application data.

3. The method according to claim 1, further comprising the steps of:

aggregating data for a dealer having a plurality of dealerships located at different locations; and providing the dealer with a consolidated report using the aggregated data.

4. The method according to claim 1 also including the step of: obtaining credit report data from at least one remote credit bureau terminal device.

5. A computer aided method of managing a credit application, the method comprising the steps of:

receiving credit application data from a remote application entry and display device;

selectively forwarding the credit application data to a first remote funding source terminal device;

wherein the selectively forwarding the credit application data step further comprises:

facilitating the first remote finding source terminal device to selectively forward the credit application to a second remote funding source terminal device if the funding source associated with the first remote finding source terminal declines to approve the credit application; and;

forwarding funding decision data from at least one of the first and second remote funding source terminal devices to the remote application entry and display device.

6. The method according to claim 5, wherein the remote application entry and display device includes a data entry terminal for manual entry of the credit application data.

7. The method according to claim 5, further comprising the steps of:

aggregating data for a dealer having a plurality of dealerships located at different locations; and providing the dealer with a consolidated report using the aggregated data.

8. The method according to claim 5 also including the step of: obtaining credit report data from at least one remote credit bureau terminal device.

* * * * *

UNITED STATES PATENT AND TRADEMARK OFFICE
CERTIFICATE OF CORRECTION

| | | |
|---|---|---|
| PATENT NO. | : 7,181,427 B1 | Page 1 of 1 |
| APPLICATION NO. | : 08/922462 | |
| DATED | : February 20, 2007 | |
| INVENTOR(S) | : James R. DeFrancesco et al. | |

It is certified that error appears in the above-identified patent and that said Letters Patent is hereby corrected as shown below:

On the Title Page, Item (73) Assignee should read --DealerTrack, Inc.--.

Signed and Sealed this

Sixth Day of May, 2008

JON W. DUDAS
*Director of the United States Patent and Trademark Office*